(12) United States Patent
Harada et al.

(10) Patent No.: US 9,625,689 B2
(45) Date of Patent: Apr. 18, 2017

(54) OPTICAL SYSTEM, OPTICAL APPARATUS EQUIPPED THEREWITH, AND METHOD FOR MANUFACTURING OPTICAL SYSTEM

(75) Inventors: Hiroki Harada, Zushi (JP); Issei Tanaka, Yokohama (JP)

(73) Assignee: Nikon Corporation, Tokyo (JP)

( * ) Notice: Subject to any disclaimer, the term of this patent is extended or adjusted under 35 U.S.C. 154(b) by 166 days.

(21) Appl. No.: 13/234,516

(22) Filed: Sep. 16, 2011

(65) Prior Publication Data

US 2012/0069440 A1    Mar. 22, 2012

(30) Foreign Application Priority Data

| Sep. 17, 2010 | (JP) | 2010-208867 |
| Sep. 17, 2010 | (JP) | 2010-208868 |
| Sep. 17, 2010 | (JP) | 2010-208869 |
| Jun. 27, 2011 | (JP) | 2011-141797 |
| Jun. 27, 2011 | (JP) | 2011-141811 |
| Jul. 8, 2011 | (JP) | 2011-151505 |
| Jul. 8, 2011 | (JP) | 2011-151506 |
| Jul. 8, 2011 | (JP) | 2011-151507 |
| Aug. 9, 2011 | (JP) | 2011-173866 |

(51) Int. Cl.
*G02B 27/64* (2006.01)
*G02B 15/177* (2006.01)
*G03B 19/12* (2006.01)

(52) U.S. Cl.
CPC ......... *G02B 15/177* (2013.01); *G02B 27/646* (2013.01); *G03B 19/12* (2013.01); *Y10T 29/49885* (2015.01)

(58) Field of Classification Search
CPC .. G02B 6/03666; G02B 6/03672; G02B 9/14; G02B 15/28; G02B 15/173; G02B 13/009; G02B 15/00; G02B 15/14–15/16; G02B 27/64–27/648
USPC ................ 359/691, 692, 695, 748, 785–790, 359/689–690
See application file for complete search history.

(56) References Cited

U.S. PATENT DOCUMENTS

| 4,764,000 A * | 8/1988 | Tokumaru | G02B 13/02 359/745 |
| 5,715,088 A | 2/1998 | Suzuki | |
| 6,384,975 B1 | 5/2002 | Hayakawa | |

(Continued)

FOREIGN PATENT DOCUMENTS

| JP | 05-232410 A | 9/1993 |
| JP | 07-027977 A | 1/1995 |

(Continued)

*Primary Examiner* — Bumsuk Won
*Assistant Examiner* — Jeffrey Madonna
(74) *Attorney, Agent, or Firm* — Shapiro, Gabor and Rosenberger, PLLC

(57) ABSTRACT

An optical system SL installed in a single-lens reflex camera includes, in order from an object side, a first lens group G1, a second lens group G2 having negative refractive power, and a third lens group G3 having positive refractive power. The second lens group G2 is disposed movably in a direction including a component perpendicular to an optical axis, and a given conditional expression is satisfied, thereby providing an optical system having excellent optical performance with excellent vibration reduction performance, an optical apparatus equipped with the optical system, and a method for manufacturing the optical system.

27 Claims, 35 Drawing Sheets

(56) References Cited

U.S. PATENT DOCUMENTS

| | | | |
|---|---|---|---|
| 6,728,033 B2 | 4/2004 | Hayakawa | |
| 6,844,989 B1* | 1/2005 | Jo | G02B 13/0035 359/689 |
| 7,256,948 B2 | 8/2007 | Tanaka et al. | |
| 7,471,462 B2 | 12/2008 | Hatada | |
| 7,583,441 B2 | 9/2009 | Taki | |
| 8,238,039 B2 | 8/2012 | Yamagami | |
| 8,498,065 B2* | 7/2013 | Obama | G02B 13/26 359/785 |
| 2002/0041452 A1* | 4/2002 | Ozaki | G02B 9/14 359/745 |
| 2002/0126383 A1 | 9/2002 | Hayakawa | |
| 2003/0095341 A1* | 5/2003 | Sato | 359/785 |
| 2004/0179274 A1* | 9/2004 | Amanai | G02B 9/16 359/785 |
| 2005/0225878 A1 | 10/2005 | Tanaka et al. | |
| 2006/0007342 A1 | 1/2006 | Taki | |
| 2006/0126193 A1* | 6/2006 | Noda | G02B 13/0035 359/785 |
| 2006/0140622 A1* | 6/2006 | Isono | G02B 9/34 396/439 |
| 2008/0084618 A1* | 4/2008 | Chen | G02B 13/0035 359/784 |
| 2008/0112063 A1* | 5/2008 | Hatada | G02B 27/646 359/690 |
| 2009/0052051 A1* | 2/2009 | Hayakawa | G02B 15/177 359/683 |
| 2009/0251589 A1 | 10/2009 | Taki | |
| 2010/0290129 A1* | 11/2010 | Nishio et al. | 359/645 |
| 2010/0321792 A1 | 12/2010 | Yamagami | |

FOREIGN PATENT DOCUMENTS

| | | |
|---|---|---|
| JP | 08-304698 A | 11/1996 |
| JP | 09-218349 A | 8/1997 |
| JP | 11-030743 A | 2/1999 |
| JP | 11-202202 A | 7/1999 |
| JP | 2000-356704 A | 12/2000 |
| JP | 2005-284040 A | 10/2005 |
| JP | 2006-171432 A | 6/2006 |
| JP | 2007-003600 A | 1/2007 |
| JP | 2008-122775 A | 5/2008 |
| JP | 2008-233585 A | 10/2008 |
| JP | 2009-198854 A | 9/2009 |
| JP | 2009-251116 A | 10/2009 |
| JP | 2009-300993 A | 12/2009 |
| JP | 2011-150196 A | 8/2011 |

* cited by examiner

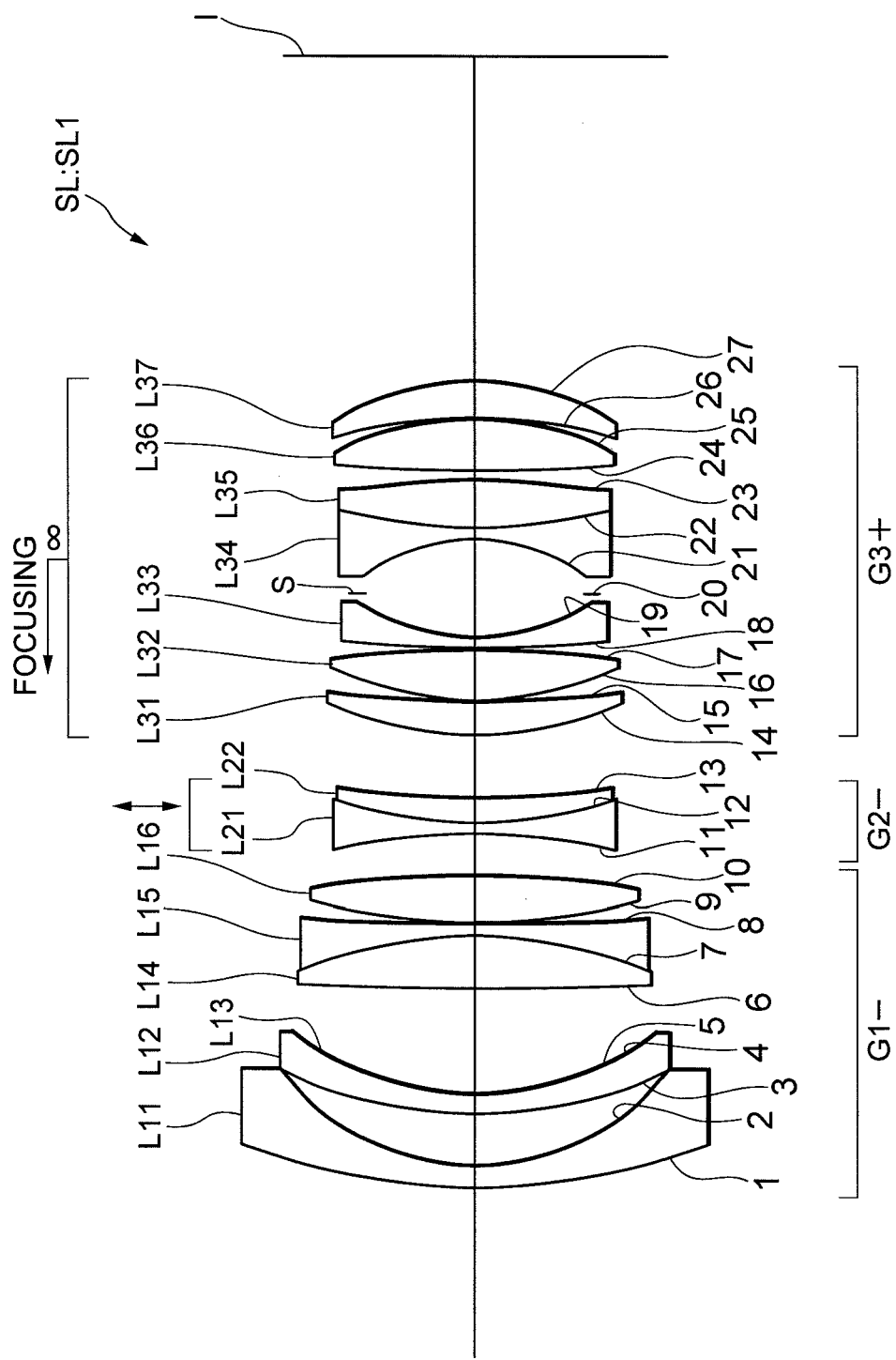

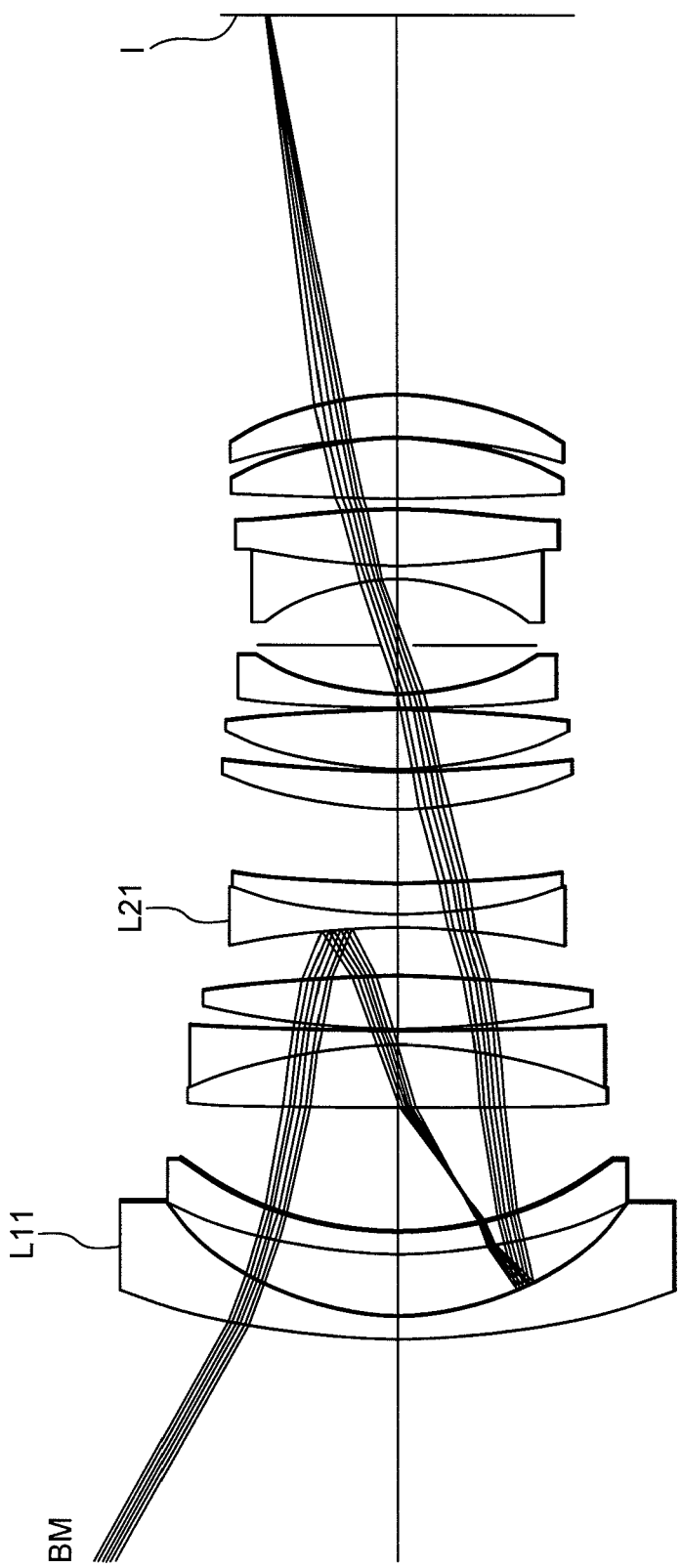

FIG. 6A
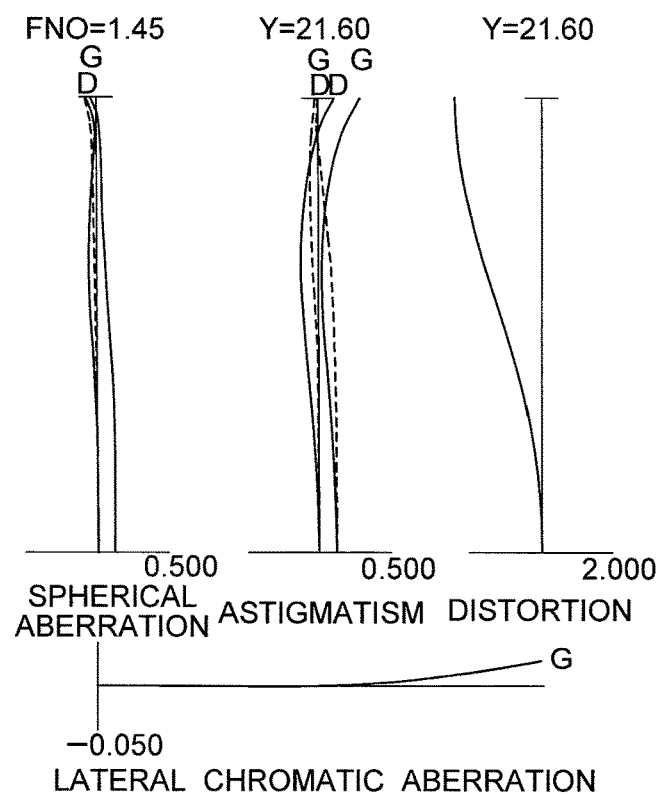
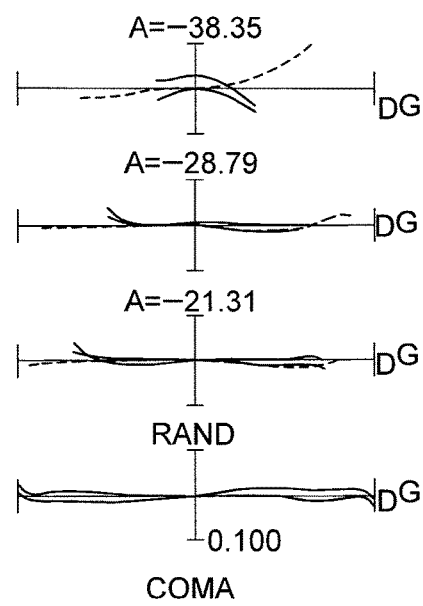
FIG. 6B
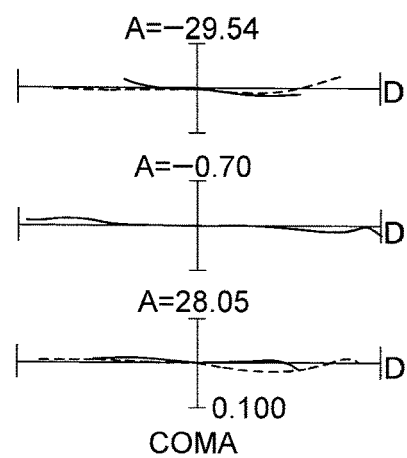

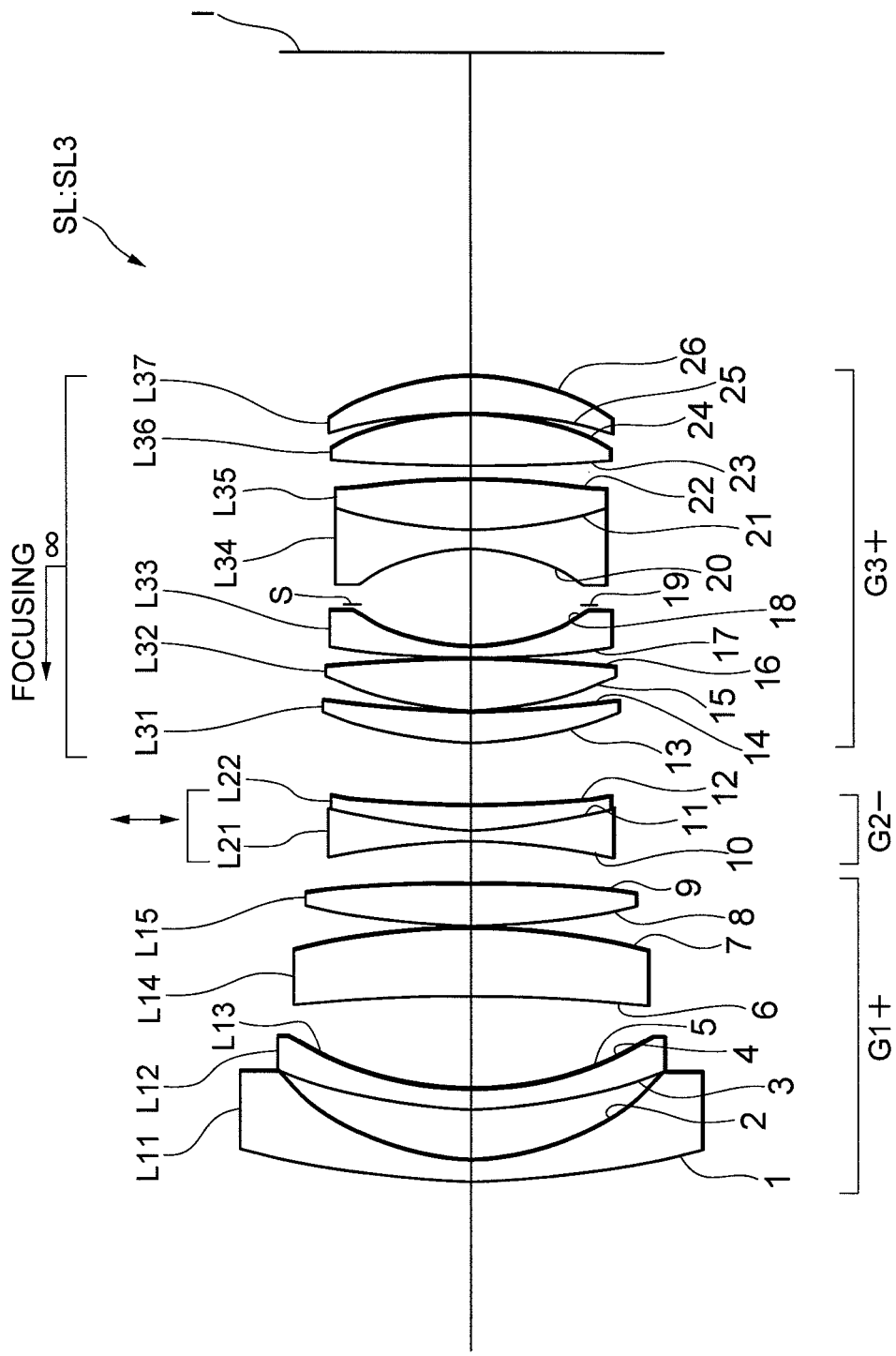

FIG. 9A
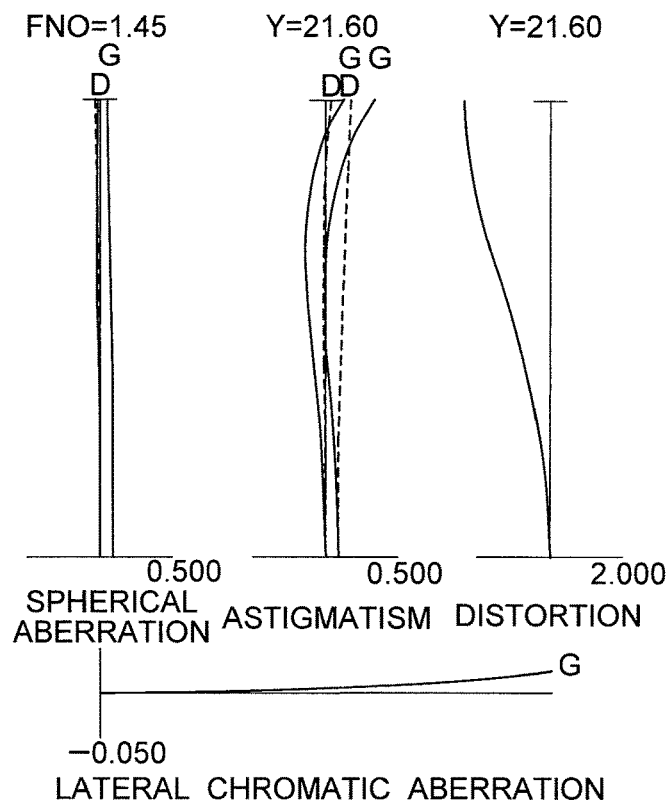
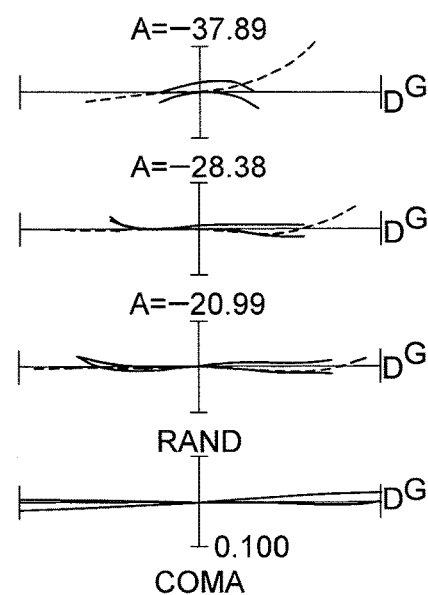
FIG. 9B
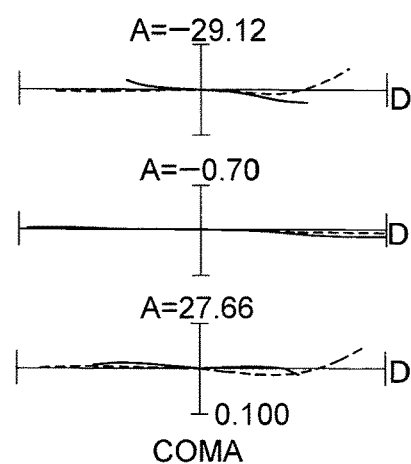

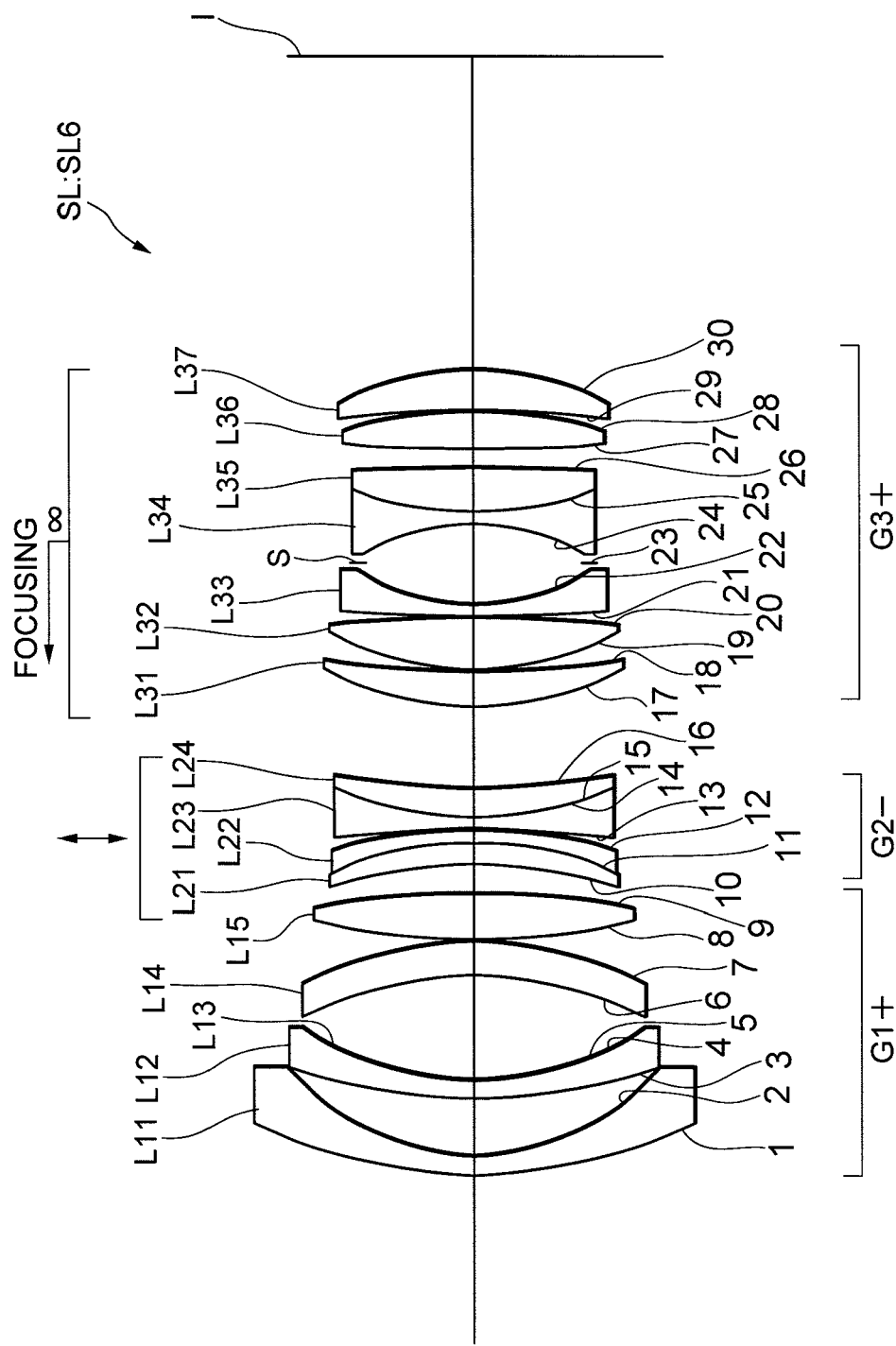

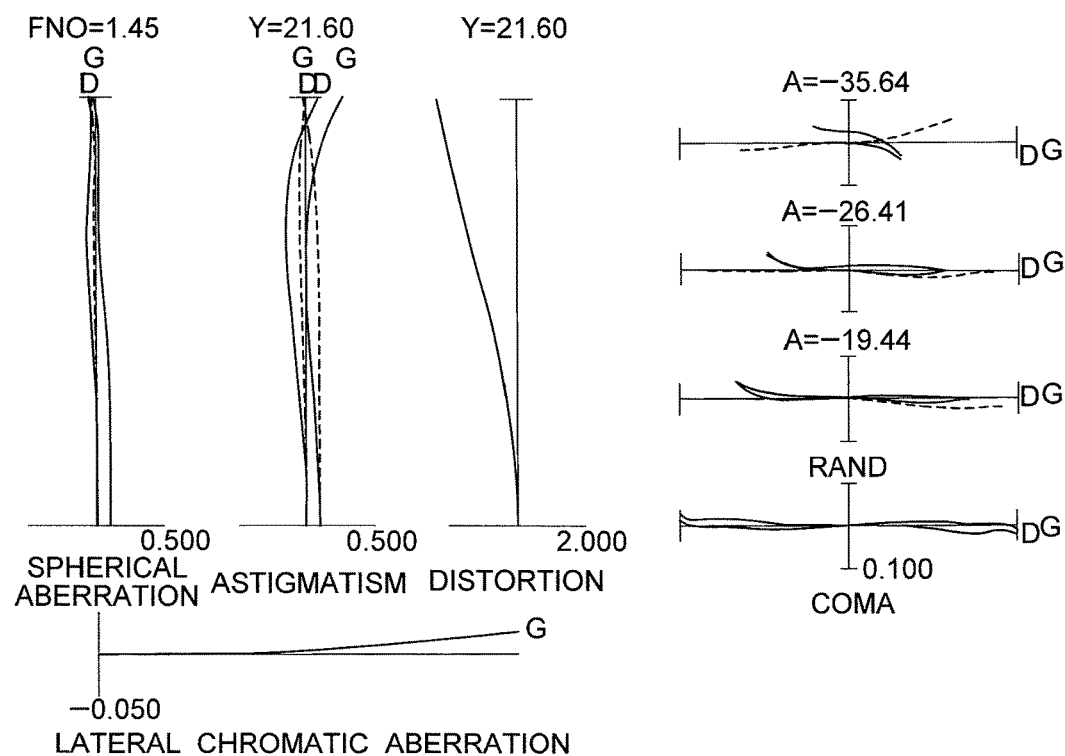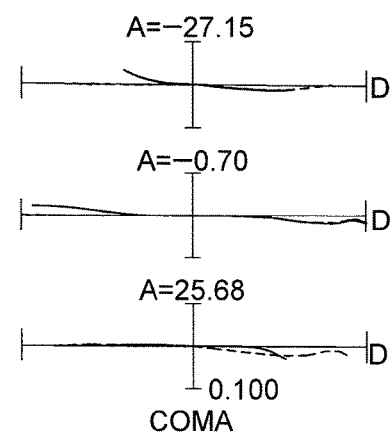

OPTICAL SYSTEM, OPTICAL APPARATUS EQUIPPED THEREWITH, AND METHOD FOR MANUFACTURING OPTICAL SYSTEM

The disclosure of the following priority applications are herein incorporated by reference:

Japanese Patent Application No. 2010-208867 filed on Sep. 17, 2010;
Japanese Patent Application No. 2010-208868 filed on Sep. 17, 2010;
Japanese Patent Application No. 2010-208869 filed on Sep. 17, 2010;
Japanese Patent Application No. 2011-141797 filed on Jun. 27, 2011;
Japanese Patent Application No. 2011-141811 filed on Jun. 27, 2011;
Japanese Patent Application No. 2011-151505 filed on Jul. 8, 2011;
Japanese Patent Application No. 2011-151506 filed on Jul. 8, 2011;
Japanese Patent Application No. 2011-151507 filed on Jul. 8, 2011; and
Japanese Patent Application No. 2011-173866 filed on Aug. 9, 2011.

BACKGROUND OF THE INVENTION

Field of the Invention

The present invention relates to an optical system, an optical apparatus equipped therewith, and a method for manufacturing the optical system.

Related Background Art

A retrofocus lens having a leading lens group with negative refractive power has been known as a wide-angle optical system securing a back focal length sufficient for a single-lens reflex camera and a digital camera in spite of a short focal length. In such a lens type, there has been known a one having a large aperture of an f-number of 1.4 (for example, see Japanese Patent Application Laid-Open No. 11-030743). Regarding such an optical system, request for suppressing ghost images and flare, which deteriorate optical performance, as well as aberrations become increasingly strong. Accordingly, a higher optical performance is required to antireflection coatings applied to a lens surface, so that in order to meet such request, multilayer design technology and multilayer coating technology are continuously progressing (for example, see Japanese Patent Application Laid-Open No. 2000-356704).

However, when a vibration reduction mechanism is applied to a conventional wide-angle optical system, correction of aberration upon vibration reduction is not sufficient. In addition, there is a problem that reflection light producing ghost images and flare is liable to be generated from optical surfaces in such an optical system.

SUMMARY OF THE INVENTION

The present invention is made in view of the above-described problems, and has an object to provide an optical system having excellent vibration reduction performance with suppressing variations in various aberrations, and ghost images and flare, an optical apparatus equipped therewith, and a method for manufacturing the optical system.

According to a first aspect of the present invention, there is provided an optical system comprising, in order from an object side: a first lens group; a second lens group having negative refractive power; and a third lens group having positive refractive power, the second lens group being disposed movably in a direction including a component perpendicular to an optical axis, and the following conditional expression (1) being satisfied:

$$0.30 < f/f23 < 0.95 \qquad (1)$$

where f denotes a focal length of the optical system upon focusing on an infinitely distant object, and f23 denotes a combined focal length of the second lens group and the third lens group upon focusing on an infinitely distant object.

According to a second aspect of the present invention, there is provided an optical apparatus equipped with the optical system according to the first aspect.

According to a third aspect of the present invention, there is provided an optical system comprising: a first lens group; a second lens group having negative refractive power, disposed to an image side of the first lens group movably in a direction including a component perpendicular to an optical axis; a third lens group having positive refractive power, disposed to the image side of the second lens group; and an aperture stop disposed to the image side of the second lens group, the second lens group including a positive lens with a convex surface facing an object side.

According to a fourth aspect of the present invention, there is provided an optical apparatus equipped with the optical system according to the third aspect.

According to a fifth aspect of the present invention, there is provided an optical system comprising, in order from an object side: a first lens group; a second lens group having negative refractive power; and a third lens group having positive refractive power, the second lens group being disposed movably in a direction including a component perpendicular to an optical axis, and the following conditional expression (8) being satisfied:

$$2.00 < \Sigma dvr/f < 5.00 \qquad (8)$$

where $\Sigma dvr$ denotes a distance between the most image side lens surface of the second lens group and the paraxial focal plane of the optical system upon focusing on an infinitely distant object, and f denotes a focal length of the optical system upon focusing on an infinitely distant object.

According to a sixth aspect of the present invention, there is provided an optical apparatus for forming an image of an object on a given image plane equipped with the optical system according to the fifth aspect.

According to a seventh aspect of the present invention, there is provided a method for manufacturing an optical system including, in order from an object side, a first lens group, a second lens group having negative refractive power, and a third lens group having positive refractive power, the method comprising steps of: disposing the second lens group movably in a direction including a component perpendicular to an optical axis; and disposing each lens group with satisfying the following conditional expression (1):

$$0.30 < f/f23 < 0.95 \qquad (1)$$

where f denotes a focal length of the whole of the optical system upon focusing on an infinitely distant object, and f23 denotes a combined focal length of the second lens group and the third lens group upon focusing on an infinitely distant object.

According to an eighth aspect of the present invention, there is provided a method for manufacturing an optical system comprising steps of: disposing a first lens group; disposing a second lens group having negative refractive power to an image side of the first lens group movably in a direction including a component perpendicular to an optical axis; disposing a third lens group having positive refractive power to the image side of the second lens group; disposing an aperture stop to the image side of the second lens group; and disposing the second lens group including a positive lens with a convex surface facing an object side.

According to an ninth aspect of the present invention, there is provided a method for manufacturing an optical system including, in order from an object side, a first lens group, a second lens group having negative refractive power, and a third lens group having positive refractive power, the method comprising steps of: disposing the second lens group movably in a direction including a component perpendicular to an optical axis; disposing each lens group with satisfying the following conditional expression (8):

$$2.00 < \Sigma dvr/f < 5.00 \tag{8}$$

where Σdvr denotes a distance between the most image side lens surface of the second lens group and the paraxial focal plane of the optical system upon focusing on an infinitely distant object, and f denotes a focal length of the optical system upon focusing on an infinitely distant object.

With constructing an optical system, an optical apparatus equipped therewith, and a method for manufacturing the optical system according to the present invention as described above, it becomes possible to realize an optical system having excellent vibration reduction performance zoom lens having excellent optical performance.

BRIEF DESCRIPTION OF THE DRAWINGS

FIG. 1 is a sectional view showing a lens configuration of an optical system according to Example 1 of the present application.

FIGS. 2A and 2B are graphs showing various aberrations of the optical system according to Example 1 upon focusing on an infinitely distant object, in which FIG. 2A shows various aberrations, and FIG. 2B shows coma upon correcting rotational camera shake of 0.7 degrees.

FIGS. 3A and 3B are graphs showing various aberrations of the optical system according to Example 1 upon focusing on an intermediately distant object, in which FIG. 3A shows various aberrations, and FIG. 3B shows coma upon correcting rotational camera shake of 0.7 degrees.

FIG. 4 is a sectional view showing the lens configuration of the optical system according to Example 1 and is an explanatory view, in which light rays reflected from a first-reflection-generating surface are reflected by a second-reflection-generating surface.

FIGS. 6A and 6B are graphs showing various aberrations of the optical system according to Example 2 upon focusing on an infinitely distant object, in which FIG. 6A shows various aberrations, and FIG. 6B shows coma upon correcting rotational camera shake of 0.7 degrees.

FIGS. 7A and 7B are graphs showing various aberrations of the optical system according to Example 2 upon focusing on an intermediately distant object, in which FIG. 7A shows various aberrations, and FIG. 7B shows coma upon correcting rotational camera shake of 0.7 degrees.

FIG. 8 is a sectional view showing a lens configuration of an optical system according to Example 3 of the present application.

FIGS. 9A and 9B are graphs showing various aberrations of the optical system according to Example 3 upon focusing on an infinitely distant object, in which FIG. 9A shows various aberrations, and FIG. 9B shows coma upon correcting rotational camera shake of 0.7 degrees.

FIGS. 10A and 10B are graphs showing various aberrations of the optical system according to Example 3 upon focusing on an intermediately distant object, in which FIG. 10A shows various aberrations, and FIG. 10B shows coma upon correcting rotational camera shake of 0.7 degrees.

FIGS. 12A and 12B are graphs showing various aberrations of the optical system according to Example 4 upon focusing on an infinitely distant object, in which FIG. 12A shows various aberrations, and FIG. 12B shows coma upon correcting rotational camera shake of 0.7 degrees.

FIGS. 13A and 13B are graphs showing various aberrations of the optical system according to Example 4 upon focusing on an intermediately distant object, in which FIG. 13A shows various aberrations, and FIG. 13B shows coma upon correcting rotational camera shake of 0.7 degrees.

FIGS. 15A and 15B are graphs showing various aberrations of the optical system according to Example 5 upon focusing on an infinitely distant object, in which FIG. 15A shows various aberrations, and FIG. 15B shows coma upon correcting rotational camera shake of 0.7 degrees.

FIGS. 16A and 16B are graphs showing various aberrations of the optical system according to Example 5 upon focusing on an intermediately distant object, in which FIG. 16A shows various aberrations, and FIG. 16B shows coma upon correcting rotational camera shake of 0.7 degrees.

FIG. 17 is a sectional view showing a lens configuration of an optical system according to Example 6 of the present application.

FIGS. 18A and 18B are graphs showing various aberrations of the optical system according to Example 6 upon focusing on an infinitely distant object, in which FIG. 18A shows various aberrations, and FIG. 18B shows coma upon correcting rotational camera shake of 0.7 degrees.

FIGS. 19A and 19B are graphs showing various aberrations of the optical system according to Example 6 upon focusing on an intermediately distant object, in which FIG. 19A shows various aberrations, and FIG. 19B shows coma upon correcting rotational camera shake of 0.7 degrees.

FIGS. 21A and 21B are graphs showing various aberrations of the optical system according to Example 7 upon focusing on an infinitely distant object, in which FIG. 21A shows various aberrations, and FIG. 21B shows coma upon correcting rotational camera shake of 0.7 degrees.

FIGS. 22A and 22B are graphs showing various aberrations of the optical system according to Example 7 upon focusing on an intermediately distant object, in which FIG. 22A shows various aberrations, and FIG. 22B shows coma upon correcting rotational camera shake of 0.7 degrees.

FIGS. 24A and 24B are graphs showing various aberrations of the optical system according to Example 8 upon focusing on an infinitely distant object, in which FIG. 24A shows various aberrations, and FIG. 24B shows coma upon correcting rotational camera shake of 0.7 degrees.

FIGS. 25A and 25B are graphs showing various aberrations of the optical system according to Example 8 upon focusing on an intermediately distant object, in which FIG. 25A shows various aberrations, and FIG. 25B shows coma upon correcting rotational camera shake of 0.7 degrees.

Figure 2A:
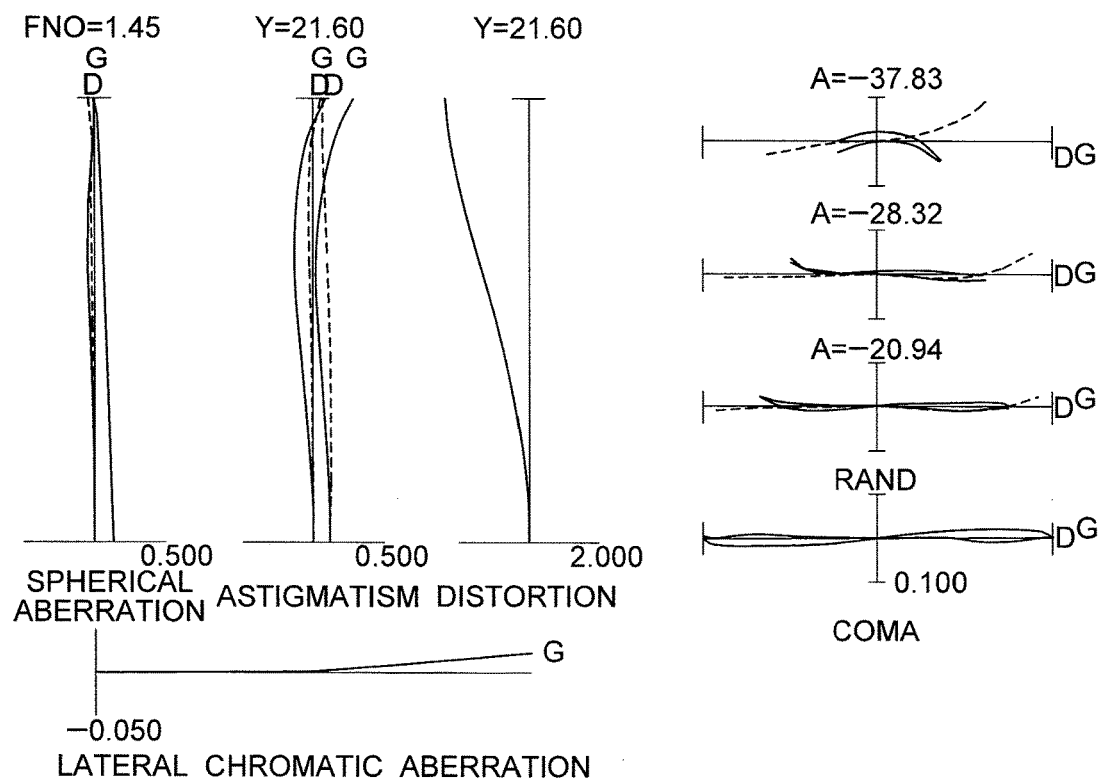

DESCRIPTION OF THE MOST PREFERRED EMBODIMENT (First Embodiment)

An optical system according to a first embodiment of the present application is explained below.

An optical system according to the first embodiment of the present application includes, in order from an object side, a first lens group, a second lens group having negative refractive power, and a third lens group having positive refractive power. The second lens group is movable in a direction including a component perpendicular to an optical axis. The optical system satisfies the following conditional expression (1):

$$0.30 < f/f23 < 0.95 \quad (1)$$

where f denotes a focal length of the optical system upon focusing on an infinitely distant object, and f23 denotes a combined focal length of the second lens group and the third lens group upon focusing on an infinitely distant object.

In a short focal length lens, in order to secure the back focal length sufficiently for a single-lens reflex camera and a digital camera, it has been known to be effective to take a construction having a so-called wide-converter in which pupil magnification can be larger than 1 by making the height of marginal ray higher upon exit than upon incidence. Incidentally, the marginal ray is the farthest ray from the optical axis among rays reaching the image height of 0.

Even if there is no restriction of the back focal length, the above described wide-converter is effective for compensating insufficient light amount on the periphery, which becomes conspicuous upon widening the angle of view. As described above, an optical system having the so-called retrofocus type with a large aperture of an f-number of about 1.4 has been proposed.

When an vibration reduction mechanism is introduced in such a wide-angle optical system, it becomes a problem whether the vibration reduction lens is to be introduced in which portion. In a retrofocus lens, since unsymmetrical refractive power distribution, in which the object side of the optical system has strong negative refractive power while the image side of the optical system has strong positive refractive power, aberrations cannot be canceled between lens groups, so that, in particular, negative distortion and coma become difficult to be corrected. Accordingly, aberrations have to be corrected within a single lens group as much as possible. However, when correction of aberrations within a single lens group is not sufficient, spherical aberration, coma, decentering coma and curvature of field are generated largely upon carrying out vibration reduction or focusing on a close object by the following lens groups. In order to correct these aberrations, it is effective to weaken refractive power of the first lens group that has an effect of enlarging the pupil magnification. In that case, the back focal length becomes short for a single-lens reflex camera.

In an optical system according to the first embodiment, the above-described conditional expression (1) defines the most effective range for balancing aberration correction, a pupil magnification and a back focal length. Moreover, with disposing the vibration reduction lens group, which is hereinafter called as a second lens group, to the image side of the first lens group, it becomes possible to excellently correct aberrations.

When the ratio f/f23 is equal to or exceeds the upper limit of conditional expression (1), the effect of the first lens group as a wide-converter becomes excessively weak, so that lens groups disposed to the image side of the first lens group have to have strong positive refractive power. As a result, it becomes difficult to sufficiently correct positive curvature of field and negative distortion on the periphery of the image, so that it is undesirable. In order to secure the effect of the first embodiment, it is preferable to set the upper limit of conditional expression (1) to 0.80. In order to secure the effect of the first embodiment, it is preferable to set the upper limit of conditional expression (1) to 0.75. In order to further secure the effect of the first embodiment, it is most preferable to set the upper limit of conditional expression (1) to 0.72.

On the other hand, when the ratio f/f23 is equal to or falls below the lower limit of conditional expression (1), the effect of the first lens group as a wide-converter becomes excessively strong, so that light rays passes through lens groups disposed to the image side of the first lens group at higher position from the optical axis. Accordingly, it becomes difficult to correct spherical aberration and coma, so that it is undesirable. In order to secure the effect of the first embodiment, it is preferable to set the lower limit of conditional expression (1) to 0.40. In order to secure the effect of the first embodiment, it is preferable to set the lower limit of conditional expression (1) to 0.45. In order to further secure the effect of the first embodiment, it is greatly preferable to set the lower limit of conditional expression (1) to 0.47. In order to further secure the effect of the first embodiment, it is greatly preferable to set the lower limit of conditional expression (1) to 0.50. In order to still further secure the effect of the first embodiment, it is most preferable to set the lower limit of conditional expression (1) to 0.53.

Moreover, as described above, in an optical system according to the first embodiment, the second lens group as the vibration reduction lens group has negative refractive power. This means that a lens system composed of the second lens group and the third lens group has a retrofocus lens configuration. With this lens configuration, it becomes possible to lengthen the back focal length, and to make the upper limit of conditional expression (1) large. As a result, it becomes possible to excellently correct spherical aberration and coma. Moreover, with disposing negative refractive power to the second lens group, it becomes possible to effectively correct coma, in particular, sagittal coma to the peripheral light rays. As a result, excellent aberration correction can be achieved without enlarging the diameter of the lens. When the most object side lens surface of the second lens group has a concave surface facing the object side, the above-described effect can further be shown.

In an optical system according to the first embodiment, the following conditional expression (2) is preferably satisfied:

$$-0.4 < f/f1 < 0.4 \quad (2)$$

where f1 denotes a focal length of the first lens group.

Conditional expression (2) is for defining the focal length of the first lens group with respect to the focal length of the whole system of the optical system. In an optical system according to the first embodiment, correction of decentering coma generated in the vibration reduction lens group upon moving the vibration reduction lens group in a direction substantially perpendicular to the optical axis becomes a big problem. In an optical system according to the first embodiment, with satisfying conditional expression (2), an incident angle of the marginal ray, exit from the lens group disposed to the object side of the vibration reduction lens group (the second lens group), incident on the vibration reduction lens group can be made nearly parallel to the optical axis, so that generation of decentering coma can be suppressed as much as possible. Moreover, in the retrofocus lens, since the first lens group includes a lot of lens element having negative refractive power, it becomes difficult to correct aberrations generated in the first lens group with good balance by lens groups following the first lens group. Accordingly, sufficient aberration correction has to be carried out within each lens group. However, when correction of aberrations within a single lens group is not sufficient, spherical aberration, coma, decentering coma and curvature of field are generated largely upon carrying out vibration reduction or focusing on a close object by the following lens groups.

When the ratio f/f1 is equal to or exceeds the upper limit of conditional expression (2), the incident angle of the ray incident on the second lens group as converging light rays becomes large, so that variation in the incident angle of the marginal ray upon shifting the second lens group in a direction substantially perpendicular to the optical axis becomes large. Accordingly, decentering coma is largely generated. Moreover, strong converging light rays are incident on the second lens group. As a result, negative refractive power of the second lens group becomes excessively strong, so that spherical aberration and decentering coma become worse. With exceeding conditional expression (2), light rays on the periphery of the image is incident on the second lens group with larger incident angle than that of the marginal ray, so that curvature of field upon shifting the second lens group becomes worse, so that it is undesirable. Moreover, positive refractive power in the first lens group becomes excessively strong, so that correction of aberration in the first lens group alone is not sufficient. Accordingly, large negative curvature of field tends to be generated. Furthermore, light rays including a large amount of aberrations are incident on the second lens group, so that curvature of field, astigmatism upon vibration reduction and decentering coma become worse. Accordingly, it is undesirable. With exceeding conditional expression (2), light rays on the periphery of the image are incident on the second lens group with a small incident angle. As a result, the diameter of the second lens group becomes large, and the height of the ray, reaching periphery of the image, passing through the second lens group becomes excessively high. As a result, decentering coma and curvature of field upon shifting the second lens group in a direction substantially perpendicular to the optical axis become worse, so that it is undesirable.

In order to secure the effect of the first embodiment, it is preferable to set the upper limit of conditional expression (2) to 0.35. In order to further secure the effect of the first embodiment, it is preferable to set the upper limit of conditional expression (2) to 0.30.

On the other hand, when the ratio f/f1 is equal to or falls below the lower limit of conditional expression (2), the angle of incidence of the ray incident on the second lens group as divergent light rays becomes excessively large, so that variation in the angle of incidence of the marginal ray upon shifting the second lens group in a direction substantially perpendicular to the optical axis becomes large, and decentering coma is generated largely. Moreover, negative refractive power in the first lens group becomes too large, so that aberration correction in the first lens group alone is not sufficient. Accordingly, large amount of negative distortion tends to be generated. As a result, light rays including large amount of aberrations are incident on the second lens group, so that curvature of field, astigmatism upon vibration reduction, and decentering coma become worse. Accordingly, it is undesirable.

In order to secure the effect of the first embodiment, it is preferable to set the lower limit of conditional expression (2) to −0.35. In order to further secure the effect of the first embodiment, it is preferable to set the lower limit of conditional expression (2) to −0.30.

In an optical system according to the first embodiment, the following conditional expression (3) is preferably satisfied:

$$-0.35 < f/f2 < -0.07 \quad (3)$$

where f2 denotes a focal length of the second lens group.

Conditional expression (3) is for defining the focal length of the second lens group.

When the ratio f/f2 is equal to or exceeds the upper limit of conditional expression (3), refractive power of the second lens group becomes excessively weak, so that the moving amount of the second lens group upon vibration reduction becomes larger than a proper amount. As a result, variations in decentering coma and astigmatism in the second lens group upon vibration reduction become difficult to be corrected. Accordingly, it is undesirable. Moreover, a driving mechanism such as an actuator for driving the second lens group becomes large. As a result, the distances between lens groups become tighter than proper amounts, so that refractive power of each lens group becomes large. Accordingly, spherical aberration and coma become worse, so that it is undesirable.

In order to secure the effect of the first embodiment, it is preferable to set the upper limit of conditional expression (3) to −0.10. In order to secure the effect of the first embodiment, it is preferable to set the upper limit of conditional expression (3) to −0.12.

On the other hand, when the ratio f/f2 is equal to or falls below the lower limit of conditional expression (3), refractive power of the second lens group becomes excessively strong. As a result, it becomes difficult to correct variations in coma and astigmatism upon vibration reduction, so that it is undesirable.

In order to secure the effect of the first embodiment, it is preferable to set the lower limit of conditional expression (3) to −0.31. In order to further secure the effect of the first embodiment, it is preferable to set the lower limit of conditional expression (3) to −0.28.

In an optical system according to the first embodiment, the following conditional expression (4) is preferably satisfied:

$$1.2 < H2in/H1in < 3.0 \quad (4)$$

where H1in denotes a height of a marginal ray incident on the most object side lens surface of the first lens group, and H2in denotes a height of a marginal ray incident on the most object side lens surface of the second lens group.

Conditional expression (4) defines the most effective range for balancing aberration correction, a pupil magnification and a back focal length. Moreover, with disposing the vibration reduction lens group to the image side of the first lens group, it becomes possible to excellently correct aberrations.

When the ratio H2in/H1in is equal to or exceeds the upper limit of conditional expression (4), the effect of the first lens group as a wide-converter becomes excessively strong, so that light rays passes through lens groups disposed to the image side of the first lens group at higher position from the optical axis. Accordingly, it becomes difficult to correct spherical aberration and coma.

In order to secure the effect of the first embodiment, it is preferable to set the upper limit of conditional expression (4) to 2.5. In order to further secure the effect of the first embodiment, it is preferable to set the upper limit of conditional expression (4) to 2.2.

On the other hand, when the ratio H2in/H1in is equal to or falls below the lower limit of conditional expression (4), the effect of the first lens group as a wide-converter becomes excessively weak, strong negative refractive power is necessary to lens groups disposed to the image side of the first lens group. As a result, it becomes difficult to sufficiently correct positive curvature of field and negative distortion on the periphery of the image, so that it is undesirable.

In order to secure the effect of the first embodiment, it is preferable to set the lower limit of conditional expression (4) to 1.3. In order to further secure the effect of the first embodiment, it is preferable to set the lower limit of conditional expression (4) to 1.4.

As described above, an optical system according to the first embodiment is characterized by the second lens group, which is the vibration reduction lens group, having negative refractive power. In this case, with disposing the negative lens component on top of the configuration, the combined lens group composed of the second lens group and the third lens group has a retrofocus lens configuration. With this lens configuration, it becomes possible to lengthen the back focal length, and to make the lower limit of conditional expression (4) small. As a result, spherical aberration and coma can be excellently corrected. Moreover, with disposing negative refractive power to the second lens group, it becomes possible to effectively correct coma, in particular, sagittal coma to the peripheral light rays. As a result, excellent aberration correction can be achieved without enlarging the diameter of the lens. When the most object side lens surface of the second lens group has a concave surface facing the object side, the above-described effect can further be shown.

Generally, it has been known that concentric optical surfaces with respect to an aperture stop are difficult to generate astigmatism. When a vibration reduction mechanism is introduced to a wide-angle optical system, astigmatism and variation in astigmatism upon vibration reduction have been known as big problems. The reason is as follows. Angle of incidence of the ray, which reaches periphery of the image, incident on each refractive surface of the vibration reduction lens group largely varies upon vibration reduction. As a result, the balance between astigmatism and coma drastically loses to become difficult to be corrected. Accordingly, an optical system according to the first embodiment has concentric optical surfaces with respect to the aperture stop, so that the angle of incidence of the ray, which reaches periphery of the image, incident on each refractive surface of the vibration reduction lens group (the second lens group) does not vary drastically upon vibration reduction. As a result, variations in astigmatism and coma upon vibration reduction are excellently corrected.

In this manner, in an optical system according to the first embodiment, the aperture stop is preferably disposed to the image side of the second lens group. Moreover, the aperture stop is preferably disposed in the third lens group. In this case, a lens component of the third lens group is preferably disposed before and after the aperture stop. With this lens configuration, spherical aberration and coma can be excellently corrected. Here, light rays come out from the second lens group, which is the vibration reduction lens group, become divergent rays. Accordingly, when a lens component is not disposed between the second lens group and the aperture stop, the ray passed through the aperture stop has a higher incident height to the lens component disposed to the image side of the aperture stop. As a result, spherical aberration and coma become worse, so that a lens component is preferably disposed between the second lens group and the aperture stop. In the above-described point of view, the lens component disposed between the second lens group and the aperture stop preferably has positive refractive power. Moreover, since with disposing a lens component to the image side of the aperture stop, aberrations can be corrected before and after the aperture stop, the third lens group preferably has lens components before and after the aperture stop. With this lens configuration, spherical aberration and coma can be excellently corrected. In the above-described point of view, the lens component disposed to the image side of the aperture stop preferably has positive refractive power. Incidentally, the function of the aperture stop may be substituted by a lens frame without disposing a member as an aperture stop.

In an optical system according to the first embodiment, the third lens group is preferably moved to the object side upon carrying out focusing to a close object. As a focusing method for a wide-angle optical system, it has been known to move only optical members disposed to the image side of the aperture stop. However, in a large aperture, wide-angle optical system, variations in spherical aberration, coma and curvature of field become large, so that it is undesirable. Accordingly, in an optical system according to the first embodiment, with disposing lens components before and after the aperture stop in the third lens group, variations in spherical aberration, coma and curvature of field can be suppressed even upon focusing on a close object. Moreover, in this manner, lens components are disposed before and after the aperture stop, it becomes possible to excellently correct spherical aberration and coma.

Then, an optical system seen from another point of view according to the first embodiment is explained below.

An optical system seen from another point of view according to the first embodiment includes, in order from an object side, a first lens group, a second lens group having negative refractive power, and a third lens group having positive refractive power. The first lens group is fixed along an optical axis with respect to an image plane. The second lens group is movable in a direction including a component perpendicular to the optical axis.

Moreover, an optical system according to the first embodiment satisfies the following conditional expression (1):

$$0.30 < f/f23 < 0.95 \qquad (1)$$

where f denotes a focal length of the optical system upon focusing on an infinitely distant object, and f23 denotes a combined focal length of the second lens group and the third lens group upon focusing on an infinitely distant object.

Conditional expression (1) defines an optimum range for balancing aberration correction, a pupil magnification and a back focal length. However, conditional expression (1) has already been explained above, so that duplicated explanations are omitted.

In an optical system seen from another point of view according to the first embodiment of the present application, at least one optical surface among the first lens group and the second lens group is applied with an antireflection coating, and the antireflection coating includes at least one layer that is formed by a wet process. With this configuration, an optical system seen from another point of view according to the first embodiment of the present application makes it possible to suppress ghost images and flare generated by the light rays from the object reflected from the optical surfaces, thereby realizing excellent optical performance.

Moreover, in an optical system seen from another point of view according to the first embodiment of the present application, the antireflection coating is a multilayered film, and the layer formed by the wet process is preferably the outermost layer among the layers composing the multilayered film. With this configuration, since difference in refractive index with respect to the air can be small, reflection of light can be small, so that ghost images and flare can further be suppressed.

In an optical system seen from another point of view according to the first embodiment of the present application, when a refractive index at d-line of the layer formed by the wet process is denoted by nd, the refractive index nd is preferably 1.30 or less. With this configuration, since difference in refractive index with respect to the air can be small, reflection of light can be small, so that ghost images and flare can further be suppressed.

Moreover, in an optical system seen from another point of view according to the first embodiment of the present application, the optical surface on which the antireflection coating is applied is preferably a concave surface seen from an aperture stop among optical surfaces in the first lens group and the second lens group. Since reflection light rays are liable to be generated on a concave surface seen from the aperture stop among optical surfaces in the first lens group and the second lens group, with applying the antireflection coating on such an optical surface, ghost images and flare can effectively be suppressed.

In an optical system seen from another point of view according to the first embodiment, it is desirable that, the concave surface on which the antireflection coating is applied as seen from the aperture stop is an image side lens surface. Since the image side concave surface as seen from the aperture stop among optical surfaces in the first lens group and the second lens group tends to generate reflection light, with applying the antireflection coating on such an optical surface, ghost images and flare can effectively be suppressed.

In an optical system seen from another point of view according to the first embodiment, it is preferable that, the concave surface on which the antireflection coating is applied as seen from the aperture stop is an object side lens surface. Since the object side concave surface as seen from the aperture stop among optical surfaces in the first lens group and the second lens group tends to generate reflection light, with applying the antireflection coating on such an optical surface, ghost images and flare can effectively be suppressed.

Moreover, in an optical system seen from another point of view according to the first embodiment of the present application, among optical surfaces in the first lens group and the second lens group, the optical surface on which the antireflection coating is formed is preferably a concave surface seen from an object. Since reflection light rays are liable to be generated on a concave surface seen from the object among optical surfaces in the first lens group and the second lens group, with applying the antireflection coating on such an optical surface, ghost images and flare can effectively be suppressed.

Moreover, in an optical system seen from another point of view according to the first embodiment of the present application, the concave surface seen from the object side on which the antireflection coating is formed is preferably an image side lens surface. Since reflection light rays are liable to be generated on the image side concave lens surface seen from the object side among optical surfaces in the first lens group and the second lens group, with applying the antireflection coating on such an optical surface, ghost images and flare can effectively be suppressed.

Moreover, in an optical system seen from another point of view according to the first embodiment of the present application, the concave surface seen from the object side on which the antireflection coating is formed is preferably an object side lens surface. Since reflection light rays are liable to be generated on the object side concave lens surface seen from the object side among optical surfaces in the first lens group and the second lens group, with applying the antireflection coating on such an optical surface, ghost images and flare can effectively be suppressed.

In an optical system seen from another point of view according to the first embodiment, the antireflection coating may also be formed by a dry process etc without being limited to the wet process. On this occasion, it is preferable that the antireflection coating contains at least one layer of which the refractive index is equal to 1.30 or less. Thus, the same effects as in the case of using the wet process can be obtained by forming the antireflection coating based on the dry process etc. Note that at this time the layer of which the refractive index is equal to 1.30 or less is preferably the layer of the outermost surface of the layers composing the multilayered film.

In an optical system seen from another point of view according to the first embodiment of the present application, the following conditional expression (2) is preferably satisfied:

$$-0.4 < f/f1 < 0.4 \qquad (2)$$

where f denotes a focal length of the whole of the optical system upon focusing of an infinitely distant object, and f1 denotes a focal length of the first lens group.

Conditional expression (2) is for defining the focal length of the first lens group with respect to the focal length of the whole system of the optical system. However, conditional expression (2) has already been explained above, so that duplicated explanations are omitted.

In an optical system seen from another point of view according to the first embodiment of the present application, the following conditional expression (3) is preferably satisfied:

$$-0.35 < f/f2 < -0.07 \qquad (3)$$

where f denotes a focal length of the whole of the optical system upon focusing on an infinitely distant object, f2 denotes a focal length of the second lens group.

Conditional expression (3) is for defining the focal length of the second lens group. However, conditional expression (3) has already been explained above, so that duplicated explanations are omitted.

In an optical system seen from another point of view according to the first embodiment of the present application, the following conditional expression (4) is preferably satisfied:

$$1.2 < H2in/H1in < 3.0 \qquad (4)$$

where H1in denotes a height of the marginal ray incident on the most object side lens surface of the first lens group, and H2in denotes a height of the marginal ray incident on the most object side lens surface of the second lens group.

Conditional expression (4) defines the most effective range for balancing aberration correction, a pupil magnification and a back focal length. However, conditional expression (4) has already been explained above, so that duplicated explanations are omitted.

Figure 27:
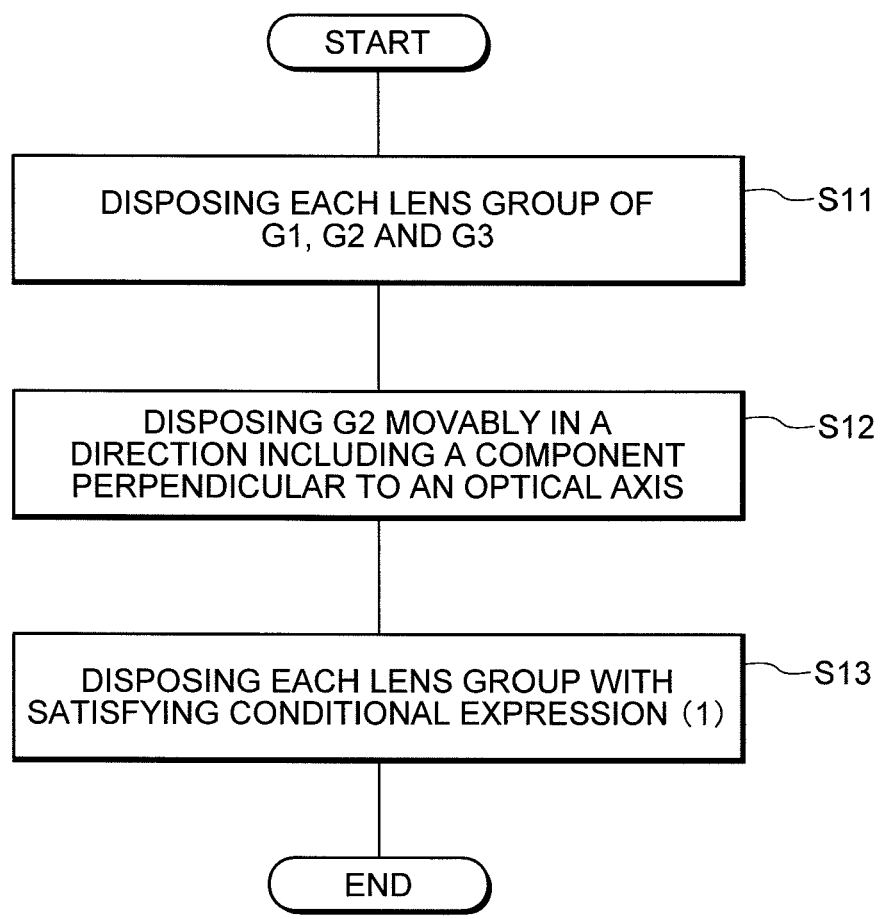
FIG. 27 is a flowchart schematically explaining a method for manufacturing the optical system according to the first embodiment.

Then, an outline of a method for manufacturing an optical system according to the first embodiment of the present application is explained with reference to FIG. 27.

Step S11: disposing each lens group. In the first embodiment, specifically, the first lens group G1 is prepared by disposing, in order from the object side, a negative meniscus lens L11 having a convex surface facing the object side, a cemented lens constructed by a negative meniscus lens L12 having a convex surface facing the object side cemented with an aspherical negative lens L13 having a negative meniscus shape with a convex surface facing the object side, a cemented lens constructed by a double convex lens L14 cemented with a double concave lens L15, and a double convex lens L16. The second lens group G2 is prepared by disposing a cemented lens constructed by, in order from the object side, a double concave lens L21 cemented with a positive meniscus lens L22 having a convex surface facing the object side. The third lens group G3 is prepared by disposing, in order from the object side, a positive meniscus lens L31 having a convex surface facing the object side, a double convex lens L32, a negative meniscus lens L33 having a convex surface facing the object side, an aperture stop S, a cemented lens constructed by a double concave lens L34 cemented with an aspherical positive lens L35 having a double convex shape, a double convex lens L36, and a positive meniscus lens L37 having a convex surface facing the image side.

Step S12: disposing the second lens group G2 movably in a direction including a component perpendicular to the optical axis.

Step S13: Disposing each lens group with satisfying the above-described conditional expression (1).

Incidentally, numerical examples are common in the first through third embodiments, and are shown after explanation of the third embodiment.

(Second Embodiment)

Then, an optical system according to a second embodiment of the present application is explained below. An optical system according to the second embodiment includes a first lens group, a second lens group having negative refractive power disposed to an image side of the first lens group and disposed movably in a direction including a component perpendicular to the optical axis, a third lens group having positive refractive power disposed to the image side of the second lens group, and an aperture stop disposed to the image side of the second lens group. The second lens group includes a positive lens having a convex surface facing the object side.

In an optical system according to the second embodiment of the present application, with disposing a vibration reduction lens group, which is the second lens group, to the image side of the first lens group, it becomes possible to realize excellent aberration correction.

Upon carrying out vibration reduction, the vibration reduction lens group tends to generate decentering coma and astigmatism. Among them, it has been difficult to suppress variation in astigmatism in a wide-angle optical system upon carrying out vibration reduction. In an optical system according to the second embodiment, with disposing the vibration reduction lens group, which is the second lens group, to the object side of the aperture stop, and disposing a convex shape to the object side of the positive lens in the vibration reduction lens group, which is the second lens group, the object side surface of the positive lens becomes concentric distribution with respect to the aperture stop.

When a vibration reduction lens group is introduced in a wide-angle optical system, astigmatism and variation in astigmatism upon carrying out vibration reduction have been big problems. The reason is that an angle of incidence of light ray reaching on the periphery of the image varies largely with respect to each refractive surface of the vibration reduction lens group upon carrying out vibration reduction, as a result, balance between astigmatism and coma is lost considerably, so that it becomes impossible to correct such aberrations. In an optical system according to the second embodiment of the present application, optical surfaces are concentric with respect to the aperture stop, so that an angle of incidence of the ray reaching on the periphery of the image with respect to each refractive surface of the vibration reduction lens group, which is the second lens group, does not vary largely upon carrying out vibration reduction. As a result, it becomes possible to excellently correct astigmatism and variation in coma upon carrying out vibration reduction.

In an optical system according to the second embodiment of the present application, the aperture stop is preferably disposed in the third lens group. Moreover, the third lens group preferably includes lens groups disposed before and after the aperture stop. With this configuration, it becomes possible to excellently correct spherical aberration and coma.

Here, light rays come out from the vibration reduction lens group, which is the second lens group, become divergent rays. Accordingly, when a lens component is not disposed between the vibration reduction lens group and the aperture stop, the ray passed through the aperture stop has a higher incident height to the lens component disposed to the image side of the aperture stop. As a result, spherical aberration and coma become worse, so that it is undesirable. Accordingly, a lens component is preferably disposed between the vibration reduction lens group, which is the second lens group, and the aperture stop. In the above-described point of view, the lens component disposed between the vibration reduction lens group, which is the second lens group, and the aperture stop preferably has positive refractive power. Moreover, since with disposing a lens component to the image side of the aperture stop, aberrations can be corrected before and after the aperture stop, the third lens group preferably has lens components before and after the aperture stop. With this lens configuration, spherical aberration and coma can be excellently corrected. In the above-described point of view, the lens component disposed to the image side of the aperture stop preferably has positive refractive power. Incidentally, the function of the aperture stop may be substituted by a lens frame without disposing a member as an aperture stop.

In an optical system according to the second embodiment of the present application, the following conditional expression (5) is preferably satisfied:

$$0.15 < |Dvr/Rvr| < 1.20 \quad (5)$$

where Dvr denotes a distance between the aperture stop and the object side lens surface of the positive lens in the second lens group upon focusing on an infinitely distant object, and Rvr denotes a radius of curvature of the object side lens surface of the positive lens in the second lens group.

Conditional expression (5) defines a ratio of the distance between the first surface, which is the object side surface, of the positive lens in the second lens group, which is the vibration reduction lens group, and the aperture stop to the radius of curvature of the first surface.

When the ratio $|Dvr/Rvr|$ is equal to or exceeds the upper limit of conditional expression (5), the radius of curvature of the first surface of the second lens group becomes excessively small with respect to the distance between the aperture stop and the first surface of the positive lens in the second lens group. As a result, correction of aberrations of the first surface of the positive lens in the second lens group, in particular, corrections of curvature of field of the ray reaching the periphery of the image and coma become excessive, so that it becomes difficult to excellently correct aberrations.

In order to secure the effect of the present application, it is preferable to set the upper limit of conditional expression (5) to 1.05. In order to secure the effect of the present application, it is preferable to set the upper limit of conditional expression (5) to 0.95. In order to further secure the effect of the present application, it is greatly preferable to set the upper limit of conditional expression (5) to 0.80. In order to further secure the effect of the present application, it is greatly preferable to set the upper limit of conditional expression (5) to 0.75. In order to still further secure the effect of the present application, it is most preferable to set the upper limit of conditional expression (5) to 0.70.

On the other hand, when the ratio $|Dvr/Rvr|$ is equal to or falls below the lower limit of conditional expression (5), the radius of curvature of the first surface of the positive lens in the second lens group becomes excessively long with respect to the distance between the aperture stop and the first surface of the positive lens in the second lens group. As a result, correction of aberration by the first surface of the positive lens in the second lens group, in particular, corrections of curvature of field on the periphery of the image and coma become insufficient, so that it becomes difficult to excellently correct aberrations. Accordingly, it is undesirable.

In order to secure the effect of the present application, it is preferable to set the lower limit of conditional expression (5) to 0.18. In order to secure the effect of the present application, it is preferable to set the lower limit of conditional expression (5) to 0.20. In order to further secure the effect of the present application, it is greatly preferable to set the lower limit of conditional expression (5) to 0.28. In order to further secure the effect of the present application, it is greatly preferable to set the lower limit of conditional expression (5) to 0.30. In order to still further secure the effect of the present application, it is most preferable to set the lower limit of conditional expression (5) to 0.33.

In an optical system according to the second embodiment of the present application, the following conditional expression (6) is preferably satisfied:

$$0.8 < (RL+RS)/(RL-RS) < 7.0 \quad (6)$$

where RS denotes a radius of curvature of the surface having smaller absolute value among radii of curvature of both surfaces of the positive lens in the second lens group, and RL denotes a radius of curvature of the larger absolute value among radii of curvature of the both surfaces of the positive lens in the second lens group.

Conditional expression (6) is a so-called shape factor. The degree of meniscus becomes stronger when the value becomes positive and larger. When the difference in deviation angles of the ray incident on the positive lens in the second lens group from the object side between the first surface and the second surface composing the positive lens becomes small as much as possible, it is convenient to excellently correct decentering coma and astigmatism upon vibration reduction. As a result, aberrations generated in the first and second surfaces become easy to be cancelled. In other words, when the degree of meniscus is stronger as much as possible, it is convenient to excellently correct decentering coma and astigmatism upon vibration reduction. With satisfying conditional expression (6), it becomes possible to excellently correct decentering coma and astigmatism upon vibration reduction.

When the ratio $(RL+RS)/(RL-RS)$ is equal to or falls below the lower limit of conditional expression (6), difference in deviation angles of the ray between the first and second surfaces of the positive lens becomes too large, so that it is undesirable.

In order to secure the effect of the present application, it is preferable to set the lower limit of conditional expression (6) to 0.9. In order to further secure the effect of the present application, it is most preferable to set the lower limit of conditional expression (6) to 1.0.

On the other hand, when the ratio $(RL+RS)/(RL-RS)$ is equal to or exceeds the upper limit of conditional expression (6), difference in deviation angles of the ray between the first and second surfaces of the positive lens becomes too small. As a result, contribution to correction of aberration becomes small, so that it is undesirable.

In order to secure the effect of the present application, it is preferable to set the upper limit of conditional expression (6) to 5.0. In order to further secure the effect of the present application, it is most preferable to set the upper limit of conditional expression (6) to 4.0.

In an optical system according to the second embodiment of the present application, the following conditional expression (7) is preferably satisfied:

$$0.10 < Np - Nn < 0.45 \quad (7)$$

where Np denotes a refractive index at d-line of the medium of the positive lens in the second lens group, and Nn denotes a refractive index at d-line of the medium of the negative lens in the second lens group.

Conditional expression (7) is a preferable condition for enhancing the effect of conditional expression (5). Conditional expression (7) is for defining the effect of aberration correction of the first surface of the positive lens in the second lens group and a second surface of a negative lens disposed closest to the object side of the first surface. With satisfying conditional expression (7), relatively strong positive refractive power is included by the first surface of the positive lens in the second lens group and the second surface of the negative lens disposed closest to the object side of the first surface. As a result, positive curvature of field of the ray reaching a high image height and outer coma conspicuous to a wide-angle optical system and a large aperture lens become easy to be corrected. Moreover, from the view point of Petzval sum, it is effective for correcting curvature of field to keep a higher refractive index of the lens having strong positive refractive power than that of the lens having negative refractive power. With satisfying conditional expression (7), it becomes possible to control Petzval sum, which tends to become excessive in a large aperture lens, to the optimum value, so that correction of negative curvature of field of the ray reaching the small image height becomes easy.

When the value Np−Nn is equal to or exceeds the upper limit of conditional expression (7), positive refractive power in the second lens group having negative refractive power becomes excessive. As a result, it becomes difficult to correct negative curvature of field and inner coma with respect to the ray reaching periphery of the image, so that it is undesirable.

In order to secure the effect of the present application, it is preferable to set the upper limit of conditional expression (7) to 0.42. In order to further secure the effect of the present application, it is preferable to set the upper limit of conditional expression (7) to 0.38.

On the other hand, when the value Np−Nn is equal to or falls below the lower limit of conditional expression (7), positive refractive power in the second lens group having negative refractive power becomes insufficient. As a result, it becomes difficult to correct positive curvature of field and outer coma with respect to the ray reaching a high image height, so that it is undesirable. Moreover, astigmatism upon vibration reduction becomes difficult to be corrected, so that it is undesirable. Furthermore, Petzval sum becomes excessive. As a result, negative curvature of field with respect to the ray reaching the low image height becomes large, so that it is undesirable.

In order to secure the effect of the present application, it is preferable to set the lower limit of conditional expression (7) to 0.13. In order to further secure the effect of the present application, it is most preferable to set the lower limit of conditional expression (7) to 0.15.

In an optical system according to the second embodiment of the present application, the following conditional expression (3) is preferably satisfied:

$$-0.35 < f/f2 < -0.07 \quad (3)$$

where f denotes a focal length of the whole of the optical system upon focusing on an infinitely distant object, and f2 denotes a focal length of the second lens group.

Conditional expression (3) is for defining the focal length of the second lens group. However, conditional expression (3) has already been explained before, so that duplicated explanations are omitted.

In an optical system according to the second embodiment of the present application, the third lens group is preferably moved to the object side upon carrying out focusing to a close object. As a focusing method for a wide-angle optical system, it has been known to move only optical members disposed to the image side of the aperture stop. However, in a large aperture, wide-angle optical system, variations in spherical aberration, coma and curvature of field become large, so that it is undesirable. Accordingly, in an optical system according to the second embodiment, with disposing lens components before and after the aperture stop in the third lens group, variations in spherical aberration, coma and curvature of field can be suppressed even upon focusing on a close object. Moreover, in this manner, lens components are disposed before and after the aperture stop, it becomes possible to excellently correct spherical aberration and coma.

Then, an optical system seen from another point of view according to the second embodiment of the present application is explained below. An optical system seen from another point of view according to the second embodiment includes a first lens group fixed in an optical axis direction, a second lens group having negative refractive power disposed to an image side of the first lens group, fixed in the optical axis direction, and disposed movably in a direction including a component perpendicular to the optical axis, a third lens group having positive refractive power disposed to the image side of the second lens group, and an aperture stop disposed to the image side of the second lens group. The second lens group includes a positive lens having a convex surface facing the object side.

In an optical system seen from another point of view according to the second embodiment of the present application, at least one optical surface among the first lens group and the second lens group is applied with an antireflection coating, and the antireflection coating includes at least one layer that is formed by a wet process. With this configuration, an optical system seen from another point of view according to the second embodiment of the present application makes it possible to suppress ghost images and flare generated by the light rays from the object reflected from the optical surfaces, thereby realizing excellent optical performance.

Moreover, in an optical system seen from another point of view according to the second embodiment of the present application, the antireflection coating is a multilayered film, and the layer formed by the wet process is preferably the outermost layer among the layers composing the multilayered film. With this configuration, since difference in refractive index with respect to the air can be small, reflection of light can be small, so that ghost images and flare can further be suppressed.

In an optical system seen from another point of view according to the second embodiment of the present application, when a refractive index at d-line of the layer formed by the wet process is denoted by nd, the refractive index nd is preferably 1.30 or less. With this configuration, since difference in refractive index with respect to the air can be small, reflection of light can be small, so that ghost images and flare can further be suppressed.

Moreover, in an optical system seen from another point of view according to the second embodiment of the present application, among optical surfaces in the first lens group and the second lens group the optical surface on which the antireflection coating is applied is preferably a concave surface seen from an aperture stop. Since reflection light rays are liable to be generated on a concave surface seen from the aperture stop among optical surfaces in the first lens group and the second lens group, with applying the antireflection coating on such an optical surface, ghost images and flare can effectively be suppressed.

In an optical system seen from another point of view according to the second embodiment, among optical surfaces in the first lens group and the second lens group, it is desirable that the concave surface on which the antireflection coating is applied as seen from the aperture stop is an image side lens surface. Since the image side concave surface as seen from the aperture stop among optical surfaces in the first lens group and the second lens group tends to generate reflection light, with applying the antireflection coating on such an optical surface, ghost images and flare can effectively be suppressed.

In an optical system seen from another point of view according to the second embodiment, among optical surfaces in the first lens group and the second lens group, it is preferable that the concave surface on which the antireflection coating is applied as seen from the aperture stop is an object side lens surface. Since the object side concave surface as seen from the aperture stop among optical surfaces in the first lens group and the second lens group tends to generate reflection light, with applying the antireflection coating on such an optical surface, ghost images and flare can effectively be suppressed.

Moreover, in an optical system seen from another point of view according to the second embodiment of the present application, among optical surfaces in the first lens group and the second lens group, the optical surface on which the antireflection coating is formed is preferably a concave surface seen from an object side. Since reflection light rays are liable to be generated on a concave surface seen from the object among optical surfaces in the first lens group and the second lens group, with applying the antireflection coating on such an optical surface, ghost images and flare can effectively be suppressed.

Moreover, in an optical system seen from another point of view according to the second embodiment of the present application, among optical surfaces in the first lens group and the second lens group, the concave surface seen from the object side on which the antireflection coating is formed is preferably an image side lens surface. Since reflection light rays are liable to be generated on the image side concave lens surface seen from the object side among optical surfaces in the first lens group and the second lens group, with applying the antireflection coating on such an optical surface, ghost images and flare can effectively be suppressed.

Moreover, in an optical system seen from another point of view according to the second embodiment of the present application, among optical surfaces in the first lens group and the second lens group, the concave surface seen from the object side on which the antireflection coating is formed is preferably an object side lens surface. Since reflection light rays are liable to be generated on the object side concave lens surface seen from the object side among optical surfaces in the first lens group and the second lens group, with applying the antireflection coating on such an optical surface, ghost images and flare can effectively be suppressed.

In an optical system seen from another point of view according to the second embodiment, the antireflection coating may also be formed by a dry process etc without being limited to the wet process. On this occasion, it is preferable that the antireflection coating contains at least one layer of which the refractive index is equal to 1.30 or less. Thus, the same effects as in the case of using the wet process can be obtained by forming the antireflection coating based on the dry process etc. Note that at this time the layer of which the refractive index is equal to 1.30 or less is preferably the layer of the outermost surface of the layers composing the multi-layered film.

In an optical system seen from another point of view according to the second embodiment, the following conditional expression (5) is preferably satisfied:

$$0.15 < |Dvr/Rvr| < 1.20 \qquad (5)$$

where Dvr denotes a distance between the aperture stop and the object side lens surface of the positive lens in the second lens group upon focusing on an infinitely distant object, and Rvr denotes a radius of curvature of the object side lens surface of the positive lens in the second lens group.

Conditional expression (5) defines a ratio of the distance between the first surface, which is the object side surface, of the positive lens in the second lens group, which is the vibration reduction lens group, and the aperture stop to the radius of curvature of the first surface. However, conditional expression (5) has already been explained above, so that duplicated explanations are omitted.

Moreover, in an optical system seen from another point of view according to the second embodiment, the following conditional expression (6) is preferably satisfied:

$$0.8 < (RL+RS)/(RL-RS) < 7.0 \qquad (6)$$

where RS denotes a radius of curvature of the surface having smaller absolute value among radii of curvature of both surfaces of the positive lens in the second lens group, and RL denotes a radius of curvature of the larger absolute value among radii of curvature of the both surfaces of the positive lens in the second lens group.

Conditional expression (6) is a so-called shape factor. However, conditional expression (6) has already been explained above, so that duplicated explanations are omitted.

Moreover, in an optical system seen from another point of view according to the second embodiment, the following conditional expression (7) is preferably satisfied:

$$0.10 < Np-Nn < 0.45 \qquad (7)$$

where Np denotes a refractive index at d-line of the medium of the positive lens in the second lens group, and Nn denotes a refractive index at d-line of the medium of the negative lens in the second lens group.

Conditional expression (7) is a preferable condition for enhancing the effect of conditional expression (5). However, conditional expression (7) has already been explained above, so that duplicated explanations are omitted.

In an optical system seen from another point of view according to the second embodiment, the following conditional expression (3) is preferably satisfied:

$$-0.35 < f/f2 < -0.07 \qquad (3)$$

where f denotes a focal length of the whole of the optical system upon focusing on an infinitely distant object, and f2 denotes a focal length of the second lens group.

Conditional expression (3) is for defining the focal length of the second lens group. However, conditional expression (3) has already been explained above, so that duplicated explanations are omitted.

Figure 28:
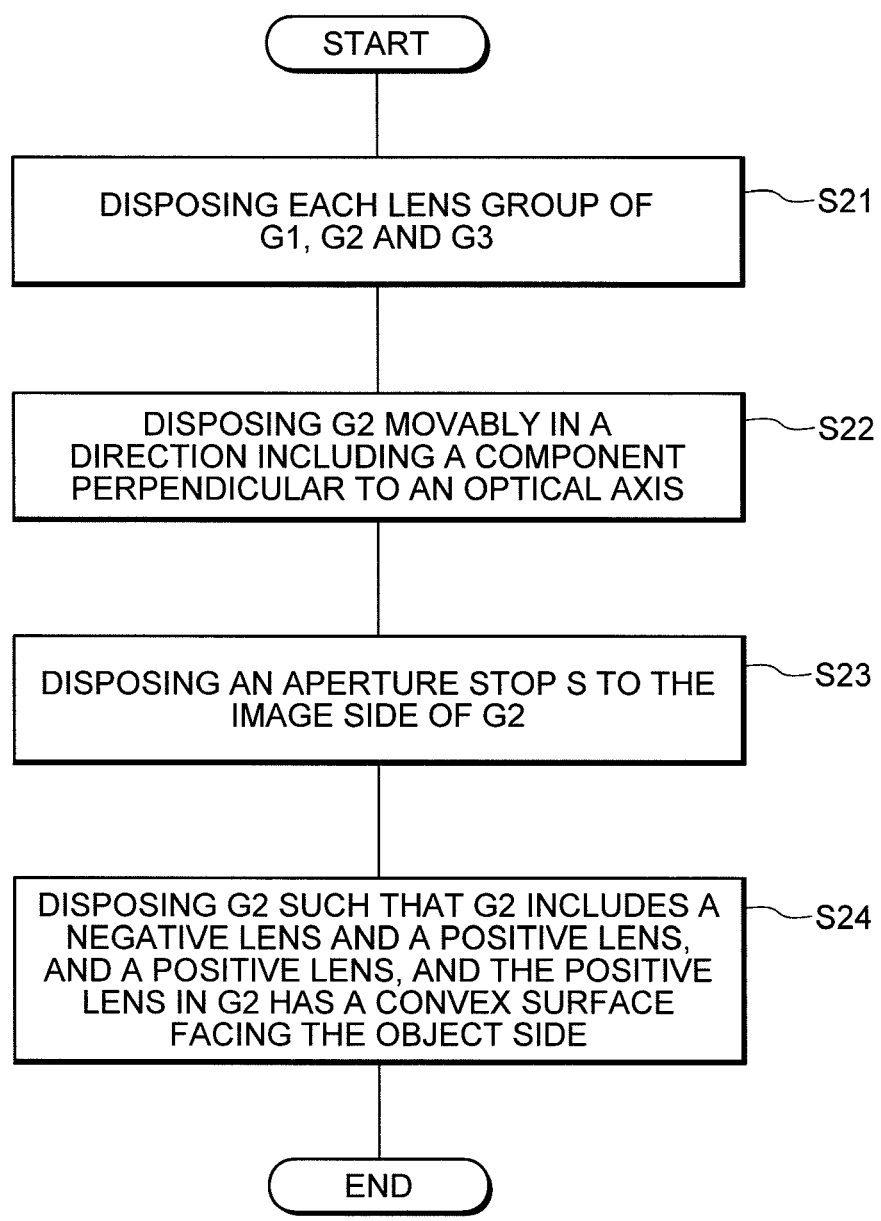
FIG. 28 is a flowchart schematically explaining a method for manufacturing the optical system according to a second embodiment.

Then, an outline of a method for manufacturing an optical system according to the second embodiment is explained below with reference to FIG. 28.

Step S21: disposing each lens group. In the second embodiment, specifically, the first lens group G1 is prepared by disposing, in order from the object side, a negative meniscus lens L11 having a convex surface facing the object side, a cemented lens constructed by a negative meniscus lens L12 having a convex surface facing the object side cemented with an aspherical negative lens L13 having a negative meniscus shape with a convex surface facing the object side, a cemented lens constructed by a double convex lens L14 cemented with a double concave lens L15, and a double convex lens L16. The second lens group G2 is prepared by disposing a cemented lens constructed by, in order from the object side, a double concave lens L21 cemented with a positive meniscus lens L22 having a convex surface facing the object side. The third lens group G3 is prepared by disposing, in order from the object side, a positive meniscus lens L31 having a convex surface facing the object side, a double convex lens L32, a negative meniscus lens L33 having a convex surface facing the object side, an aperture stop S, a cemented lens constructed by a double concave lens L34 cemented with an aspherical positive lens L35 having a double convex shape, a double convex lens L36, and a positive meniscus lens L37 having a convex surface facing the image side.

Step S22: disposing the second lens group G2 movably in a direction including a component perpendicular to an optical axis.

Step S23: disposing an aperture stop S to the image side of the second lens group G2.

Step S24: disposing the second lens group G2 such that the second lens group G2 includes a negative lens and a positive lens, and the positive lens in the second lens group G2 has a convex surface facing the object side.

Incidentally, numerical examples are common in the first through third embodiments, and are shown after explanation of the third embodiment.

(Third Embodiment)

Then, a third embodiment according to the present application is explained below. An optical system according to the third embodiment of the present application includes, in order from an object side, a first lens group, a second lens group having negative refractive power, and a third lens group having positive refractive power. The second lens group is a vibration reduction lens group that is moved in a direction including a component perpendicular to an optical axis, thereby moving an image.

Moreover, an optical system according to the third embodiment of the present application satisfies the following conditional expression (8):

$$2.00 < \Sigma dvr/f < 5.00 \quad (8)$$

where $\Sigma dvr$ denotes a distance between the most image side lens surface of the second lens group and the paraxial focal plane of the optical system upon focusing on an infinitely distant object, and f denotes a focal length of the whole of the optical system upon focusing on an infinitely distant object.

In a short focal length lens, in order to secure the back focal length sufficiently for a single-lens reflex camera and a digital camera, it has been known to be effective to take a construction having a so-called wide-converter in which pupil magnification can be larger than 1 by making the height of marginal ray higher upon exit than upon incidence. Even if there is no restriction of the back focal length, the above described wide-converter is effective for compensating insufficient light amount on the periphery, which becomes conspicuous upon widening the angle of view. As described above, an optical system having the so-called retrofocus type with a large aperture of an f-number of about 1.4 has been proposed. When a vibration reduction mechanism is introduced in such a wide-angle optical system, it becomes a problem whether the vibration reduction lens is to be introduced in which portion.

In a retrofocus lens, since unsymmetrical refractive power distribution, in which the object side of the optical system has strong negative refractive power while the image side of the optical system has strong positive refractive power, aberrations cannot be canceled between lens groups, so that, in particular, negative distortion and coma become difficult to be corrected. Accordingly, aberrations have to be corrected within a single lens group as much as possible. However, when correction of aberrations within a single lens group is not sufficient, spherical aberration, coma, decentering coma and curvature of field are generated largely upon carrying out vibration reduction or focusing on a close object by the following lens groups.

Accordingly, an optical system according to the third embodiment adopts a lens configuration that includes, in order from the object side, a first lens group having positive or negative refractive power, a second lens group having negative refractive power, and a third lens group having positive refractive power. With this configuration, the first lens group is considered as the above-described wide-converter, and optimum aberration correction is carried out. Moreover, since the vibration reduction lens group, which is hereinafter called as a second lens group, has negative refractive power, the combination with the third lens group is refractive power distribution of a retrofocus lens, so that it becomes easy to optimize the back focal length and the angle of incidence of a ray incident on the imaging device. With this configuration, spherical aberration and coma can be excellently corrected. Moreover, regarding rays reaching periphery of the image, since the second lens group has negative refractive power, coma, in particular, sagittal coma can be effectively corrected. As a result, excellent aberration correction can be realized without enlarging the lens diameter. Moreover, with disposing the most object side lens surface having a concave shape facing the object side, the above-described effect can fully be exhibited.

In an optical system according to the third embodiment, conditional expression (8) defines an effective range for exhibiting excellent performance even upon vibration reduction with balancing aberration correction. In conditional expression (8), how much amount the second lens group as the vibration reduction lens group is separated from the image plane is defined by a ratio with respect to the focal length of the optical system. Conditional expression (8) means that when the second lens group is disposed excessively close to or away from the image plane, sufficient optical performance cannot be obtained, in particular, upon carrying out vibration reduction.

When a vibration reduction lens group is introduced into a conventional wide-angle lens, there has been a big problem that correction of variation in astigmatism upon decentering the second lens group, which is the vibration reduction lens group is difficult. Moreover, when the lens has a large aperture, correction of decentering coma generated upon decentering the vibration reduction lens group also becomes difficult. The reason is that the angle of incidence of the ray reaching periphery of the image incident on each refractive surface of the second lens group, which is the vibration reduction lens group, varies largely upon decentering, so that balance between astigmatism and coma becomes worse, and cannot be corrected. Accordingly, when the vibration reduction lens group, which is the second lens group, is disposed in the vicinity of a portion where relatively large number of lens groups having similar refractive power as refractive power of the vibration reduction lens group are gathered, necessity for exchanging high order aberrations between the vibration reduction lens group and lens groups disposed in the vicinity thereof becomes small. As a result, it becomes effective to correct aberrations generated upon decentering the vibration reduction lens group. Therefore, in an optical system according to the third embodiment, the vibration reduction lens group is disposed in the vicinity of the first lens group where relatively large number of lens groups having similar refractive power as the vibration reduction lens group are gathered. As a result, with separating the vibration reduction lens group from the image plane by an amount satisfying conditional expression (8), excellent aberration correction can be accomplished.

Moreover, in a retrofocus lens, when the vibration reduction lens group is disposed near to the image plane, it tends to be difficult to dispose a focusing mechanism. The reason is that in consideration of burden on the focusing portion capable of autofocus, the focusing portion is effective to be disposed closer to the image plane in the optical system. Accordingly, when the vibration reduction lens group, which is the second lens group, is tried to be dispose closer to the image plane, the position must be close to the focusing portion. As a result, upon focusing on a close object, the moving amount has to be small. Otherwise, refractive power of the third lens group has to be strong. As a result, it becomes difficult to correct spherical aberration and coma, so that it is undesirable. Similarly, when the vibration reduction lens group tries to obtain sufficient vibration reduction effect with a small amount of decentering, strong refractive power is necessary to the vibration reduction lens group. As a result, it becomes difficult to correct variations in decentering coma and astigmatism, so that it is undesirable.

When the ratio $\Sigma dvr/f$ is equal to or exceeds the upper limit of conditional expression (8), the position of the vibration reduction lens group, which is the second lens group, comes closer to the object with respect to the whole of the optical system, the total lens length tends to become long. As a result, in order to prevent a light fall-off around a corner, refractive power of the first lens group has to be stronger than an optimum value for correcting aberrations, thereby worsening distortion and curvature of field, so that it is undesirable. In order to secure the effect of the present application, it is preferable to set the upper limit of conditional expression (8) to 4.50. In order to secure the effect of the present application, it is preferable to set the upper limit of conditional expression (8) to 4.00. In order to further secure the effect of the present application, it is greatly preferable to set the upper limit of conditional expression (8) to 3.60. In order to further secure the effect of the present application, it is greatly preferable to set the upper limit of conditional expression (8) to 3.50. In order to still further secure the effect of the present application, it is most preferable to set the upper limit of conditional expression (8) to 3.40. On the other hand, when the ratio $\Sigma dvr/f$ is equal to or falls below the lower limit of conditional expression (8), the position of the vibration reduction lens group, which is the second lens group, comes closer to the image with respect to the whole of the optical system. Accordingly, as described above, the vibration reduction lens group and the third lens group have to have strong refractive power, so that it becomes difficult to correct coma and variation in astigmatism upon decentering the vibration reduction lens group. Accordingly, it is undesirable. In order to secure the effect of the present application, it is preferable to set the lower limit of conditional expression (8) to 2.20. In order to secure the effect of the present application, it is preferable to set the lower limit of conditional expression (8) to 2.40. In order to further secure the effect of the present application, it is greatly preferable to set the lower limit of conditional expression (8) to 2.60. In order to further secure the effect of the present application, it is greatly preferable to set the lower limit of conditional expression (8) to 2.70. In order to still further secure the effect of the present application, it is most preferable to set the lower limit of conditional expression (8) to 2.80.

In an optical system according to the third embodiment of the present application, the following conditional expression (9) is preferably satisfied:

$$0.15 < |(1-\beta vr) \times \beta 3| < 0.50 \tag{9}$$

where $\beta vr$ denotes a lateral magnification of the second lens group upon focusing on an infinitely distant object, $\beta 3$ denotes a lateral magnification of the third lens group upon focusing on an infinitely distant object.

Conditional expression (9) defines a ratio of a moving amount of the image on the image plane in a direction including a component perpendicular to the optical axis to a moving amount of the vibration reduction lens group, which is the second lens group, in a direction including a component perpendicular to the optical axis. When the value $|(1-\beta vr) \times \beta 3|$ is equal to or exceeds the upper limit of conditional expression (9), refractive power of the vibration reduction lens group becomes excessively strong. As a result, it becomes difficult to correct coma and variation in astigmatism upon decentering, so that it is undesirable. Moreover, as described above, refractive power of the vibration reduction lens group, which is the second lens group, becomes excessively strong, and the lateral magnification of the third lens group becomes too strong. This means that refractive power of the third lens group is stronger than an appropriate value. As a result, spherical aberration and coma become worse, so that it is undesirable. Moreover, since the lateral magnification of the third lens group is higher than an appropriate value, decentering coma and variation in astigmatism upon decentering the vibration reduction lens group are excessively magnified. As a result, it becomes difficult to correct decentering coma and variation in astigmatism upon decentering the vibration reduction lens group, so that it is undesirable. In order to secure the effect of the present application, it is preferable to set the upper limit of conditional expression (9) to 0.45. In order to further secure the effect of the present application, it is preferable to set the upper limit of conditional expression (9) to 0.42. On the other hand, when the value $|(1-\beta pvr) \times \beta 3|$ is equal to or falls below the lower limit of conditional expression (9), the moving amount of the vibration reduction lens group for controlling vibration becomes larger than an appropriate value. As a result, decentering coma and variation in astigmatism upon decentering the vibration reduction lens group become difficult to be corrected, so that it is undesirable. Moreover, a driving member such as an actuator for driving the vibration reduction lens group, which is the second lens group, becomes large. As a result, distances between lens groups are suppressed in comparison with appropriate values, resulting in excessive increase in refractive index of each lens group. Accordingly, spherical aberration and coma become worse, so that it is undesirable. In order to secure the effect of the present application, it is preferable to set the lower limit of conditional expression (9) to 0.18. In order to further secure the effect of the present application, it is most preferable to set the lower limit of conditional expression (9) to 0.21.

In an optical system according to the third embodiment of the present application, the following conditional expression (3) is preferably satisfied:

$$-0.35 < f/f2 < -0.07 \quad (3)$$

where f denotes a focal length of the whole of the optical system upon focusing on an infinitely distant object, and f2 denotes a focal length of the second lens group.

Conditional expression (3) is for defining the focal length of the second lens group. However, conditional expression (3) has already been explained above, so that duplicated explanations are omitted.

Then, an optical system seen from another point of view according to the third embodiment of the present application is explained. An optical system seen from another point of view according to the third embodiment of the present application includes, in order from an object side, a first lens group, a second lens group having negative refractive power, and a third lens group having positive refractive power. The first lens group is fixed in an optical axis direction with respect to an image plane. The second lens group is disposed movably in a direction including a component perpendicular to the optical axis, thereby moving the image.

Moreover, an optical system seen from another point of view according to the third embodiment satisfies the following conditional expression (8):

$$2.00 < \Sigma dvr/f < 5.00 \quad (8)$$

where $\Sigma dvr$ denotes a distance between the most image side lens surface of the second lens group and the paraxial focal plane of the optical system upon focusing on an infinitely distant object, and f denotes a focal length of the whole of the optical system upon focusing on an infinitely distant object.

Conditional expression (8) defines an effective range for exhibiting excellent performance even upon vibration reduction with balancing aberration correction. However, conditional expression (8) has already been explained above, so that duplicated explanations are omitted.

In an optical system seen from another point of view according to the third embodiment of the present application, at least one optical surface among the first lens group and the second lens group is applied with an antireflection coating, and the antireflection coating includes at least one layer that is formed by a wet process. With this configuration, an optical system seen from another point of view according to the third embodiment of the present application makes it possible to suppress ghost images and flare generated by the light rays from the object reflected from the optical surfaces, thereby realizing excellent optical performance.

Moreover, in an optical system seen from another point of view according to the third embodiment of the present application, the antireflection coating is a multilayered film, and the layer formed by the wet process is preferably the outermost layer among the layers composing the multilayered film. With this configuration, since difference in refractive index with respect to the air can be small, reflection of light can be small, so that ghost images and flare can further be suppressed.

In an optical system seen from another point of view according to the third embodiment of the present application, when a refractive index at d-line of the layer formed by the wet process is denoted by nd, the refractive index nd is preferably 1.30 or less. With this configuration, since difference in refractive index with respect to the air can be small, reflection of light can be small, so that ghost images and flare can further be suppressed.

Moreover, in an optical system seen from another point of view according to the third embodiment of the present application, among optical surfaces in the first lens group and the second lens group the optical surface on which the antireflection coating is applied is preferably a concave surface seen from an aperture stop. Since reflection light rays are liable to be generated on a concave surface seen from the aperture stop among optical surfaces in the first lens group and the second lens group, with applying the antireflection coating on such an optical surface, ghost images and flare can effectively be suppressed.

In an optical system seen from another point of view according to the third embodiment, among optical surfaces in the first lens group and the second lens group, it is desirable that the concave surface on which the antireflection coating is applied as seen from the aperture stop is an image side lens surface. Since the image side concave surface as seen from the aperture stop among optical surfaces in the first lens group and the second lens group tends to generate reflection light, with applying the antireflection coating on such an optical surface, ghost images and flare can effectively be suppressed.

In an optical system seen from another point of view according to the third embodiment, among optical surfaces in the first lens group and the second lens group, it is preferable that the concave surface on which the antireflection coating is applied as seen from the aperture stop is an object side lens surface. Since the object side concave surface as seen from the aperture stop among optical surfaces in the first lens group and the second lens group tends to generate reflection light, with applying the antireflection coating on such an optical surface, ghost images and flare can effectively be suppressed.

Moreover, in an optical system seen from another point of view according to the third embodiment of the present application, among optical surfaces in the first lens group and the second lens group, the optical surface on which the antireflection coating is formed is preferably a concave surface seen from an object side. Since reflection light rays are liable to be generated on a concave surface seen from the object among optical surfaces in the first lens group and the second lens group, with applying the antireflection coating on such an optical surface, ghost images and flare can effectively be suppressed.

Moreover, in an optical system seen from another point of view according to the third embodiment of the present application, among optical surfaces in the first lens group and the second lens group, the concave surface seen from the object side on which the antireflection coating is formed is preferably an image side lens surface. Since reflection light rays are liable to be generated on the image side concave lens surface seen from the object side among optical surfaces in the first lens group and the second lens group, with applying the antireflection coating on such an optical surface, ghost images and flare can effectively be suppressed.

Moreover, in an optical system seen from another point of view according to the third embodiment of the present application, among optical surfaces in the first lens group and the second lens group, the concave surface seen from the object side on which the antireflection coating is formed is preferably an object side lens surface. Since reflection light rays are liable to be generated on the object side concave lens surface seen from the object side among optical surfaces in the first lens group and the second lens group, with applying the antireflection coating on such an optical surface, ghost images and flare can effectively be suppressed.

In an optical system seen from another point of view according to the third embodiment, the antireflection coating may also be formed by a dry process etc without being limited to the wet process. On this occasion, it is preferable that the antireflection coating contains at least one layer of which the refractive index is equal to 1.30 or less. Thus, the same effects as in the case of using the wet process can be obtained by forming the antireflection coating based on the dry process etc. Note that at this time the layer of which the refractive index is equal to 1.30 or less is preferably the layer of the outermost surface of the layers composing the multi-layered film.

In an optical system seen from another point of view according to the third embodiment of the present application, the following conditional expression (9) is preferably satisfied:

$$0.15 < |(1-\beta vr) \times \beta 3| < 0.50 \tag{9}$$

where βvr denotes a lateral magnification of the second lens group upon focusing on an infinitely distant object, β3 denotes a lateral magnification of the third lens group upon focusing on an infinitely distant object.

Conditional expression (9) defines a ratio of a moving amount of the image on the image plane in a direction including a component perpendicular to the optical axis to a moving amount of the vibration reduction lens group, which is the second lens group, in a direction including a component perpendicular to the optical axis. However, conditional expression (9) has already been explained above, so that duplicated explanations are omitted.

In an optical system seen from another point of view according to the third embodiment of the present application, the following conditional expression (3) is preferably satisfied:

$$-0.35 < f/f2 < -0.07 \tag{3}$$

where f denotes a focal length of the whole of the optical system upon focusing on an infinitely distant object, f2 denotes a focal length of the second lens group.

Conditional expression (3) is for defining the focal length of the second lens group. However, conditional expression (3) has already been explained above, so that duplicated explanations are omitted.

Figure 29:
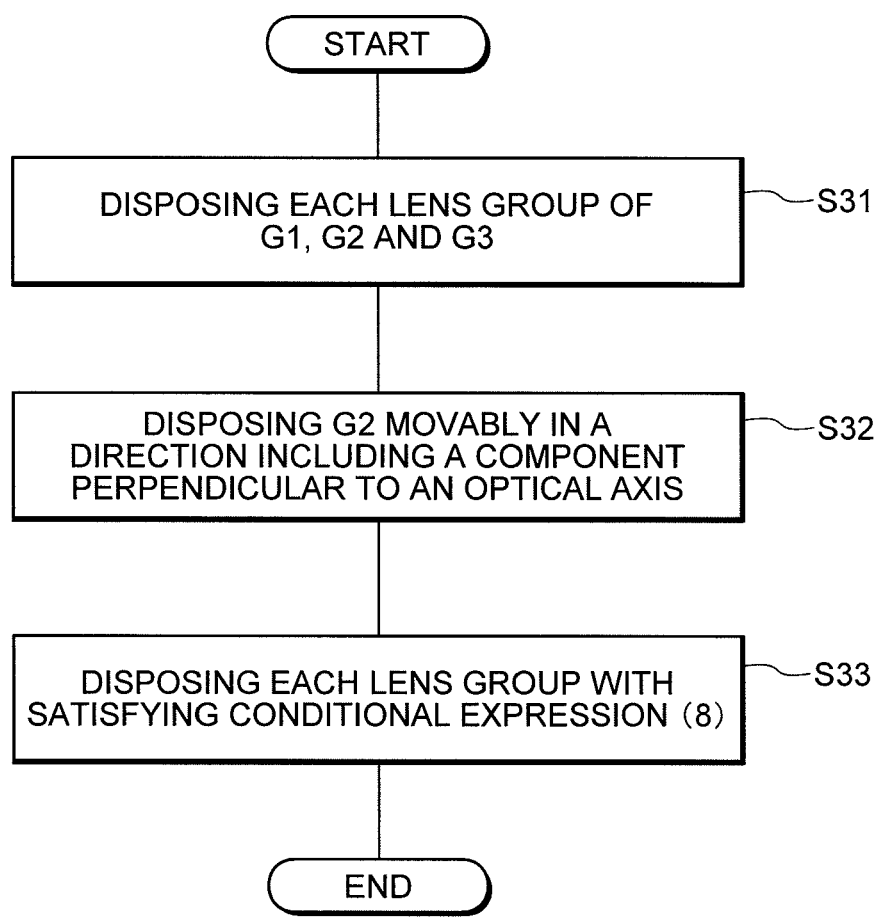
FIG. 29 is a flowchart schematically explaining a method for manufacturing the optical system according to a third embodiment.

Then, an outline of a method for manufacturing an optical system according to the third embodiment of the present application is explained with reference to FIG. 29.

Step S31: disposing each lens group. In the third embodiment, specifically, the first lens group G1 is prepared by disposing, in order from the object side, a negative meniscus lens L11 having a convex surface facing the object side, a cemented lens constructed by a negative meniscus lens L12 having a convex surface facing the object side cemented with an aspherical negative lens L13 having a negative meniscus shape with a convex surface facing the object side, a cemented lens constructed by a double convex lens L14 cemented with a double concave lens L15, and a double convex lens L16. The second lens group G2 is prepared by disposing a cemented lens constructed by, in order from the object side, a double concave lens L21 cemented with a positive meniscus lens L22 having a convex surface facing the object side. The third lens group G3 is prepared by disposing, in order from the object side, a positive meniscus lens L31 having a convex surface facing the object side, a double convex lens L32, a negative meniscus lens L33 having a convex surface facing the object side, an aperture stop S, a cemented lens constructed by a double concave lens L34 cemented with an aspherical positive lens L35 having a double convex shape, a double convex lens L36, and a positive meniscus lens L37 having a convex surface facing the image side.

Step S32: disposing the second lens group G2 movably in a direction including a component perpendicular to the optical axis.

Step S33: Disposing each lens group with satisfying the above-described conditional expression (8).

(Numerical Examples)

Then, each example according to the first through third embodiments is explained below with reference to accompanying drawings. Incidentally, each of the first through third embodiments uses the same numerical examples.

Figure 5:
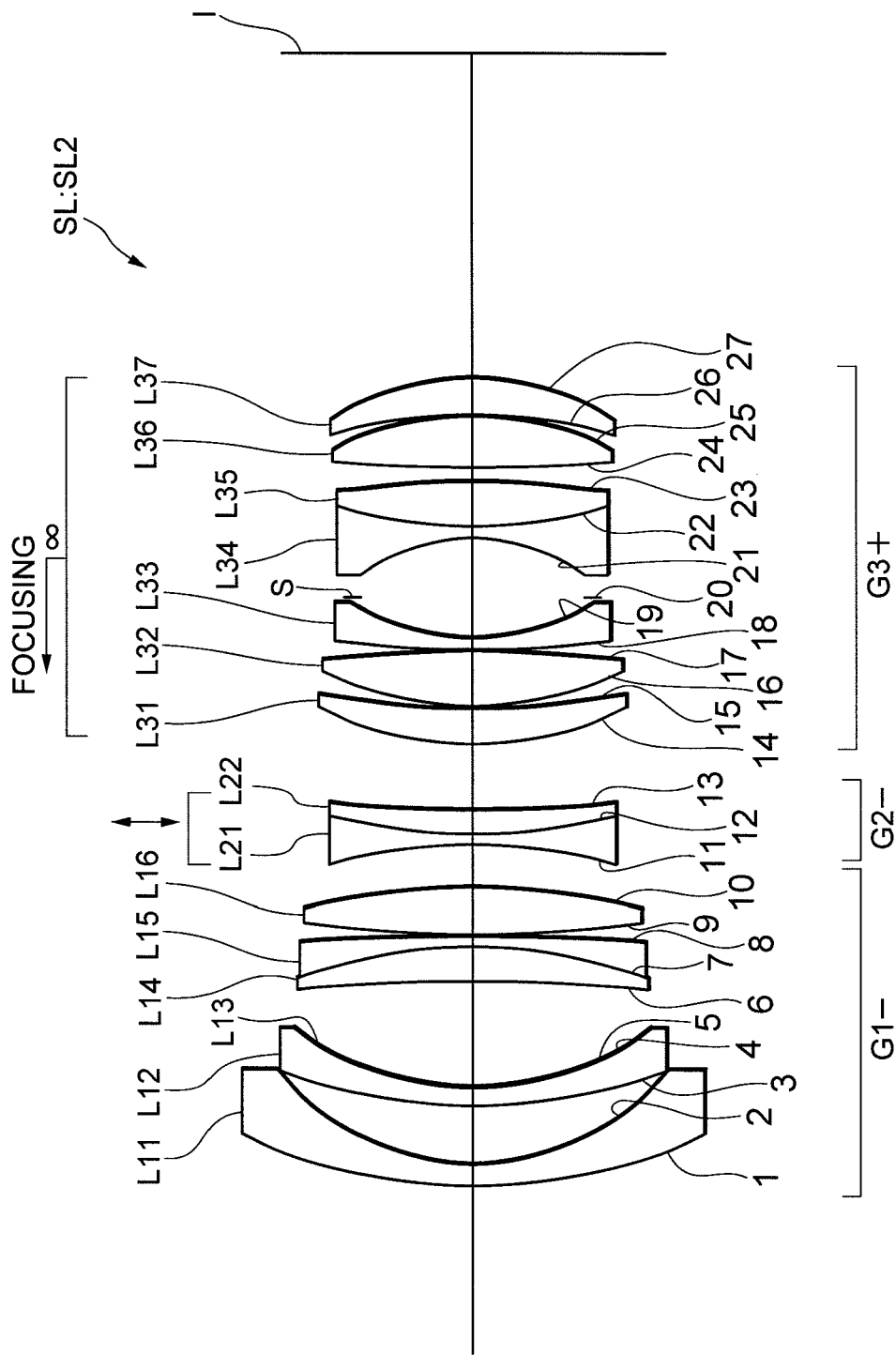
FIG. 5 is a sectional view showing a lens configuration of an optical system according to Example 2 of the present application.

FIGS. 1, 5, 8, 11, 14, 17, 20 and 23 are sectional views showing lens configurations of respective optical systems (SL1 through SL8) according to respective Examples. As shown in FIGS. 1 and 5, optical systems SL1 and SL2 according to Examples 1 and 2, respectively, include, in order from an object side, a first lens group G1 having negative refractive power, a second lens group G2 having negative refractive power, and a third lens group G3 having positive refractive power. On the other hand, as shown in FIGS. 8, 11, 14, 17, 20 and 23, optical systems SL3 through SL8 according to Example 3 through 8, respectively, include, in order from the object side, a first lens group G1 having positive refractive power, a second lens group G2 having negative refractive power, and a third lens group G3 having positive refractive power.

In each Example, the first lens group G1 is fixed in an optical axis direction with respect to an image plane. The second lens group G2 is a vibration reduction lens group that is moved in a direction including a component perpendicular to the optical axis, thereby moving an image on the image plane. An aperture stop S is disposed in the third lens group G3. Lens components having positive refractive power are disposed before and after the aperture stop S (except Example 8). Upon carrying out focusing from an infinitely distant object to a close object, the third lens group G3 is moved to the object side.

In each Example, an spherical surface is shown by the following expression (a):

$$S(y) = (y^2/r)/\left(1 + (1 - \kappa \times y^2/r^2)^{1/2}\right) + A4 \times y^4 + A6 \times y^6 + A8 \times y^8 \tag{a}$$

where y denotes a vertical height from the optical axis, S(y) denotes a distance (sag amount) along the optical axis from a tangent plane of a vertex of each aspherical surface at the height y up to each aspherical surface, r denotes a radius of curvature (paraxial radius of curvature) of a reference sphere, κ denotes a conical coefficient and An denotes an n-th order aspherical surface coefficient. Note that [E-n] represents [×10$^{-n}$] in the subsequent Examples. In each Example, second order aspherical coefficient A2 is 0. Each aspherical surface is expressed in (Lens Surface Data) by attaching "*" to the left side of the surface number.

EXAMPLE 1

FIG. 1 is a sectional view showing a lens configuration of an optical system SL1 according to Example 1 of the present application. In the optical system SL1 shown in FIG. 1, the first lens group G1 is composed of, in order from an object side, a negative meniscus lens L11 having a convex surface facing the object side, a cemented lens constructed by a negative meniscus lens L12 having a convex surface facing the object side cemented with an aspherical negative lens L13 having a negative meniscus shape with a convex surface facing the object side, a cemented lens constructed by a double convex positive lens L14 cemented with a double concave negative lens L15, and a double convex lens L16.

The second lens group G2 is composed of, in order from the object side, a cemented lens constructed by a double concave negative lens L21 cemented with a positive meniscus lens L22 having a convex surface facing the object side.

The third lens group G3 is composed of, in order from the object side, a positive meniscus lens L31 having a convex surface facing the object side, a double convex positive lens L32, a negative meniscus lens L33 having a convex surface facing the object side, an aperture stop S, a cemented lens constructed by a double concave negative lens L34 cemented with an aspherical positive lens L35 having a double convex shape, a double convex positive lens L36, and a positive meniscus lens L37 having a convex surface facing the image side.

In Example 1, an antireflection coating explained later is applied to the image plane side lens surface (surface number 2) of the negative meniscus lens L11 in the first lens group G1 and the object side lens surface (surface number 11) of the double concave negative lens L21 in the second lens group G2.

In an optical system having a focal length of f, and a vibration reduction coefficient (a ratio of a moving amount of an image on the image plane I to a moving amount of the vibration reduction lens group upon vibration reduction) of K, in order to correct rotational camera shake of θ, the vibration reduction lens group is to be moved by an amount of (f·tan θ)/K in a direction perpendicular to the optical axis.

Accordingly, in the optical system according to Example 1, the vibration reduction coefficient K is 0.306 and the focal length is 28.50 mm, so that in order to correct rotational camera shake of 0.70 degrees, the moving amount of the vibration reduction lens group becomes 1.14 mm.

Various values associated with the optical system according to Example 1 are listed in Table 1.

In (Specifications), f denotes a focal length, FNO denotes an f-number, 2ω denotes an angle of view (unit: degree), Y denotes an image height, TL denotes a total lens length that is a distance from the most object side lens surface of the first lens group G1 and the image plane I upon focusing on infinity, and Bf denotes a back focal length.

In (Lens Surface Data), "OP" denotes an object plane, "I" denotes an image plane, the left most column "i" shows optical surface number, the second column "r" shows a radius of curvature of each optical surface, the third column "d" shows a surface distance, the fourth column "nd" shows a refractive index at d-line (wavelength λ=587.6 nm), and the fifth column "vd" shows an Abbe number at d-line (wavelength λ=587.6 nm). In the fifth column "nd" refractive index of the air nd=1.000000 is omitted. In the second column "r", r=∞ indicates a plane surface.

In (Lens Group Data), a start surface number "ST" of each lens group, and a focal length of each lens group are shown. In (Values for Conditional Expressions), values for respective conditional expressions are shown.

In (Variable Distances), β denotes a shooting magnification, INF represents a state upon focusing on an infinitely distant object, and CLD represents a state where β=−0.0333, di ("i" a surface number) denotes a variable distance, and Bf denotes a back focal length.

In respective tables for various values, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used. The explanation of reference symbols is the same in the other Examples.

TABLE 1

(Specifications)

f = 28.50
FNO = 1.45
2ω = 75.6
Y = 21.6
TL = 133.3

(Lens Surface Data)

| i | r | d | nd | vd |
|---|---|---|---|---|
| OP | ∞ | | | |
| 1 | 84.252 | 2.40 | 1.74100 | 52.67 |
| 2 | 30.284 | 6.24 | | |
| 3 | 57.477 | 2.10 | 1.77250 | 49.60 |
| 4 | 36.791 | 0.20 | 1.55389 | 38.09 |
| *5 | 32.506 | 12.47 | | |
| 6 | 498.367 | 6.33 | 1.74400 | 44.79 |
| 7 | −54.700 | 1.30 | 1.52699 | 53.00 |
| 8 | 320.562 | 0.20 | | |
| 9 | 84.738 | 5.36 | 1.74806 | 50.00 |
| 10 | −139.358 | 5.00 | | |
| 11 | −75.418 | 1.30 | 1.48749 | 70.40 |
| 12 | 53.719 | 2.98 | 1.83400 | 37.16 |
| 13 | 118.654 | (d13) | | |
| 14 | 45.171 | 3.76 | 1.69680 | 55.52 |
| 15 | 121.944 | 0.20 | | |
| 16 | 39.937 | 6.09 | 1.69680 | 55.52 |
| 17 | −136.788 | 0.20 | | |
| 18 | 138.447 | 1.30 | 1.62004 | 36.30 |
| 19 | 27.404 | 5.00 | | |
| 20 | ∞ | 6.67 | Aperture Stop S | |
| 21 | −22.640 | 1.30 | 1.78472 | 25.68 |
| 22 | 65.850 | 5.67 | 1.77250 | 49.60 |
| *23 | −59.294 | 1.14 | | |
| 24 | 256.664 | 6.00 | 1.74100 | 52.67 |
| 25 | −37.599 | 0.20 | | |
| 26 | −56.322 | 4.25 | 1.77250 | 49.61 |
| 27 | −31.870 | (Bf) | | |
| I | ∞ | | | |

(Lens Group Data)

| Group | ST | Focal Length |
|---|---|---|
| G1 | 1 | 733.43 |
| G2 | 11 | −141.94 |
| G3 | 14 | 42.52 |

(Aspherical Surface Data)

Surface Number = 5

κ = 0.042900
A4 = −6.54648E−08
A6 = −1.07103E−09
A8 = −2.03329E−12

Surface Number = 23

κ = −19.496500
A4 = 2.12065E−06
A6 = 3.80233E−08
A8 = −5.28645E−11

(Variable Distances)

| | INF | CLD |
|---|---|---|
| β= | 0 | −0.0333 |
| d13= | 7.55 | 6.52 |
| Bf= | 38.11 | 39.14 |

TABLE 1-continued (Values for Conditional Expressions)

(1) f/f23 = 0.654
(2) f/f1 = 0.039
(3) f/f2 = −0.20
(4) H2in/H1in = 1.565

Figure 2B:
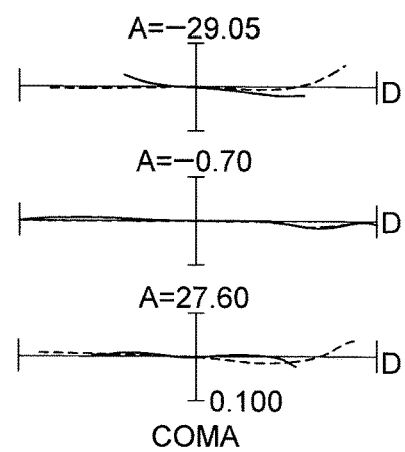
Figure 3A:
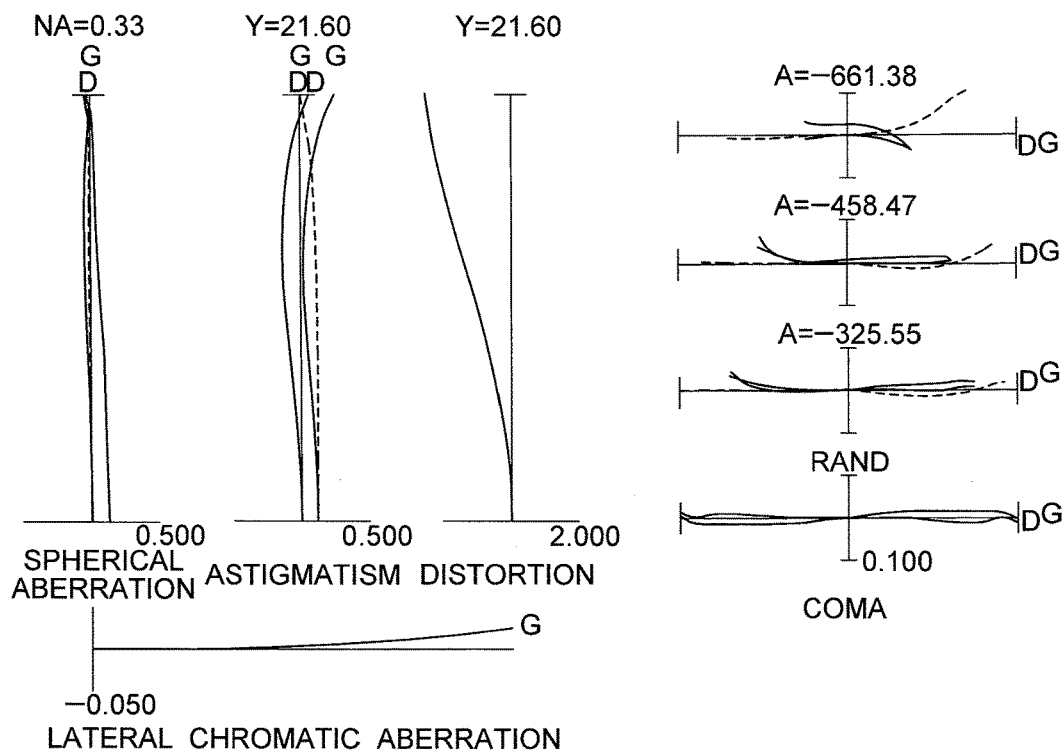
Figure 3B:
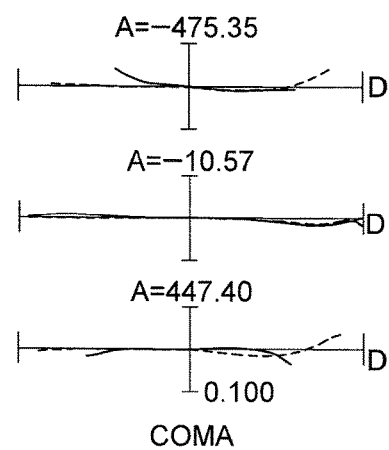

FIGS. 2A and 2B are graphs showing various aberrations of the optical system according to Example 1 upon focusing on an infinitely distant object, in which FIG. 2A shows various aberrations, and FIG. 2B shows coma upon correcting rotational camera shake of 0.7 degrees. FIGS. 3A and 3B are graphs showing various aberrations of the optical system according to Example 1 upon focusing on an intermediately distant object, in which FIG. 3A shows various aberrations, and FIG. 3B shows coma upon correcting rotational camera shake of 0.7 degrees.

In respective graphs, FNO denotes an f-number, NA denotes a numerical aperture, Y denotes an image height, A denotes an angle of incidence of a principal ray, D denotes an aberration curve at d-line (wavelength λ=587.6 nm), and G denotes an aberration curve at g-line (wavelength λ=435.8 nm). In graphs showing astigmatism, a solid line indicates a sagittal image plane, and a broken line indicates a meridional image plane. In graphs showing coma, a broken line indicates sagittal coma. The explanations of reference symbols are the same in the other Examples including Examples in the second and third embodiments.

As is apparent from various graphs, the optical system according to Example 1 shows superb optical performance as a result of good corrections to various aberrations.

FIG. 4 is a sectional view showing the lens configuration of the optical system according to Example 1 and is an explanatory view, in which light rays BM from an object generates ghost images.

As shown in FIG. 4, when light rays BM from an object are incident on the optical system SL1, the rays are reflected by the object side lens surface (a first-reflection-generating surface whose surface number is 11) of the double concave negative lens L21, and the reflected light rays are reflected again by the image plane I side lens surface (a second-reflection-generating surface whose surface number is 2) of the negative meniscus lens L11 to reach the image plane I with generating ghost images. Incidentally, the first-reflection-generating surface 11 is a concave surface seen from the object side, and the second-reflection-generating surface 2 is a concave surface seen from the aperture stop S. With applying an antireflection coating corresponding to a broad wavelength range to such lens surfaces, it becomes possible to effectively suppress ghost images and flare.

EXAMPLE 2

FIG. 5 is a sectional view showing a lens configuration of an optical system SL2 according to Example 2 of the present application. In the optical system SL2 shown in FIG. 5, the first lens group G1 is composed of, in order from an object side, a negative meniscus lens L11 having a convex surface facing the object side, a cemented lens constructed by a negative meniscus lens L12 having a convex surface facing the object side cemented with an aspherical negative lens L13 having a negative meniscus shape with a convex surface facing the object side, a cemented lens constructed by a positive meniscus lens L14 having a convex surface facing the image side cemented with a negative meniscus lens L15 having a convex surface facing the image side, and a double convex positive lens L16.

The second lens group G2 is composed of, in order from the object side, a cemented lens constructed by a double concave negative lens L21 cemented with a positive meniscus lens L22 having a convex surface facing the object side.

The third lens group G3 is composed of, in order from the object side, a positive meniscus lens L31 having a convex surface facing the object side, a double convex positive lens L32, a negative meniscus lens L33 having a convex surface facing the object side, an aperture stop S, a cemented lens constructed by a double concave negative lens L34 cemented with an aspherical positive lens L35 having a double convex shape, a double convex positive lens L36, and a positive meniscus lens L37 having a convex surface facing the image side.

In Example 2, an antireflection coating explained later is applied to the image plane side lens surface (surface number 2) of the negative meniscus lens L11 in the first lens group G1 and the image side lens surface (surface number 10) of the double convex positive lens L16 in the first lens group G1.

In the optical system according to Example 2, the vibration reduction coefficient K is 0.306 and the focal length is 27.99 mm, so that in order to correct rotational camera shake of 0.70 degrees, the moving amount of the vibration reduction lens group becomes 1.12 mm.

Various values associated with the optical system according to Example 2 are listed in Table 2.

TABLE 2

(Specifications)

f = 27.99
FNO = 1.45
2ω = 76.7
Y = 21.6
TL = 133.3

(Lens Surface Data)

| i | r | d | nd | vd |
|---|---|---|---|---|
| OP | ∞ | | | |
| 1 | 67.583 | 2.40 | 1.74100 | 52.67 |
| 2 | 30.054 | 6.93 | | |
| 3 | 68.341 | 2.10 | 1.77250 | 49.60 |
| 4 | 36.441 | 0.20 | 1.55389 | 38.09 |
| *5 | 33.585 | 12.50 | | |
| 6 | −176.482 | 3.98 | 1.74400 | 44.79 |
| 7 | −61.111 | 1.30 | 1.52599 | 53.31 |
| 8 | −288.957 | 0.20 | | |
| 9 | 150.265 | 5.50 | 1.74806 | 50.00 |
| 10 | −78.414 | 5.00 | | |
| 11 | −63.966 | 1.30 | 1.48749 | 70.40 |
| 12 | 68.577 | 2.82 | 1.83400 | 37.16 |
| 13 | 186.927 | (d13) | | |
| 14 | 39.297 | 4.23 | 1.69680 | 55.52 |
| 15 | 103.599 | 0.20 | | |
| 16 | 39.021 | 6.42 | 1.69680 | 55.52 |
| 17 | −148.831 | 0.20 | | |
| 18 | 113.771 | 1.30 | 1.61266 | 44.46 |
| 19 | 26.212 | 5.00 | | |
| 20 | ∞ | 7.01 | Aperture Stop S | |
| 21 | −22.122 | 1.30 | 1.78472 | 25.68 |
| 22 | 49.850 | 5.35 | 1.77250 | 49.60 |
| *23 | −53.784 | 1.79 | | |
| 24 | 407.632 | 6.00 | 1.75500 | 52.31 |
| 25 | −36.823 | 0.20 | | |
| 26 | −51.964 | 4.18 | 1.77250 | 49.61 |
| 27 | −31.344 | (Bf) | | |
| I | ∞ | | | |

TABLE 2-continued (Lens Group Data)

| Group | ST | Focal Length |
|---|---|---|
| G1 | 1 | −858.75 |
| G2 | 11 | −141.98 |
| G3 | 14 | 43.51 |

(Aspherical Surface Data)

Surface Number = 5

| κ = 0.016000 | A4 = 8.67227E−07 |
|---|---|
| A6 = −2.62240E−10 | A8 = −1.58840E−12 |

Surface Number = 23

| κ = −19.875800 | A4 = −9.08714E−07 |
|---|---|
| A6 = 5.51987E−08 | A8 = −7.97050E−11 |

(Variable Distances)

|  | INF | CLD |
|---|---|---|
| β = | 0 | −0.0333 |
| d13 = | 7.81 | 6.74 |
| Bf = | 38.12 | 39.18 |

(Values for Conditional Expressions)

(1) f/f23 = 0.645
(2) f/f1 = −0.033
(3) f/f2 = −0.20
(4) H2in/H1in = 1.571

Figure 7A:
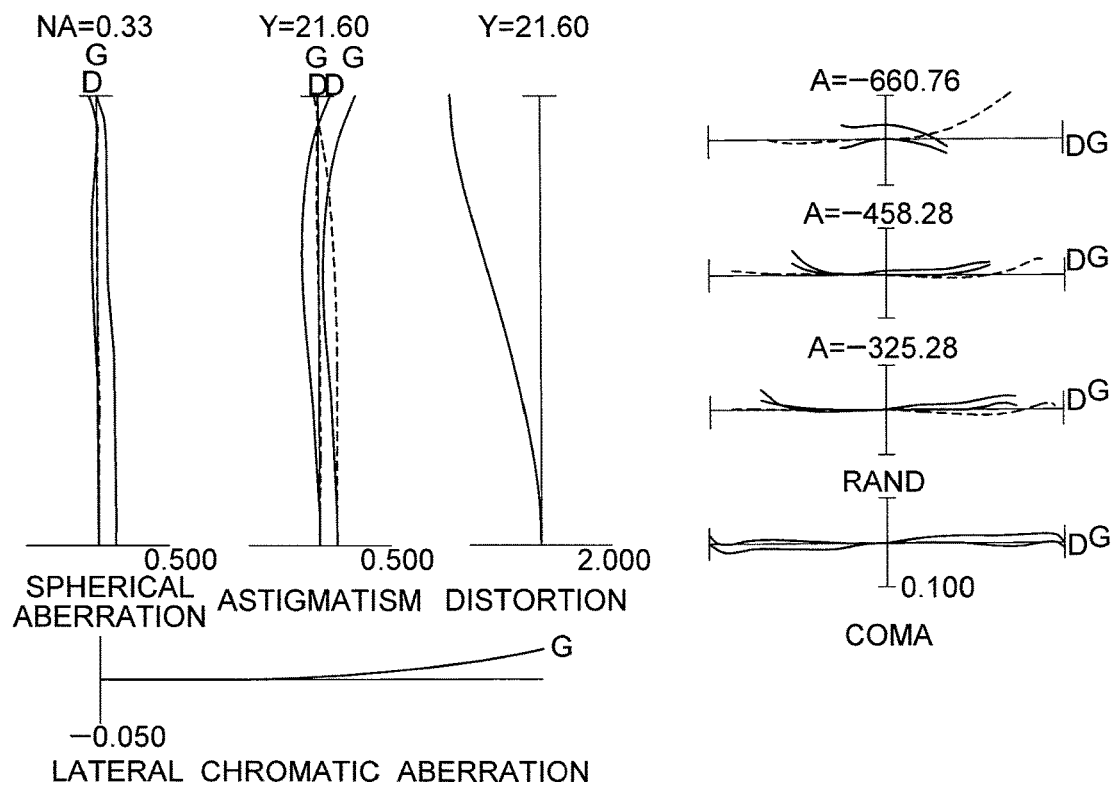
Figure 7B:
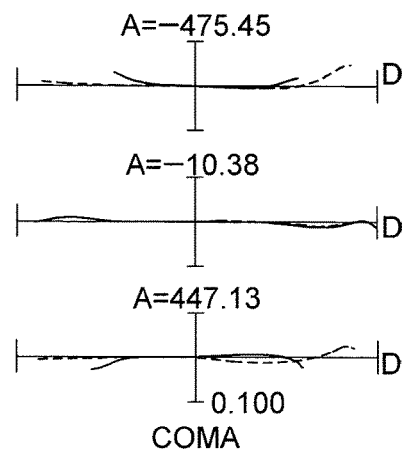

FIGS. 6A and 6B are graphs showing various aberrations of the optical system according to Example 2 upon focusing on an infinitely distant object, in which FIG. 6A shows various aberrations, and FIG. 6B shows coma upon correcting rotational camera shake of 0.7 degrees. FIGS. 7A and 7B are graphs showing various aberrations of the optical system according to Example 2 upon focusing on an intermediately distant object, in which FIG. 7A shows various aberrations, and FIG. 7B shows coma upon correcting rotational camera shake of 0.7 degrees.

As is apparent from various graphs, the optical system according to Example 2 shows superb optical performance as a result of good corrections to various aberrations.

EXAMPLE 3

FIG. 8 is a sectional view showing a lens configuration of an optical system SL3 according to Example 3 of the present application. In the optical system SL3 shown in FIG. 8, the first lens group G1 is composed of, in order from an object side, a negative meniscus lens L11 having a convex surface facing the object side, a cemented lens constructed by a negative meniscus lens L12 having a convex surface facing the object side cemented with an aspherical negative lens L13 having a negative meniscus shape with a convex surface facing the object side, a positive meniscus lens L14 having a convex surface facing the image side, and a double convex positive lens L15.

The second lens group G2 is composed of, in order from the object side, a cemented lens constructed by a double concave negative lens L21 cemented with a positive meniscus lens L22 having a convex surface facing the object side.

The third lens group G3 is composed of, in order from the object side, a positive meniscus lens L31 having a convex surface facing the object side, a double convex positive lens L32, a negative meniscus lens L33 having a convex surface facing the object side, an aperture stop S, a cemented lens constructed by a double concave negative lens L34 cemented with an aspherical positive lens L35 having a double convex shape, a double convex positive lens L36, and a positive meniscus lens L37 having a convex surface facing the image side.

In Example 3, an antireflection coating explained later is applied to the image plane side lens surface (surface number 2) of the negative meniscus lens L11 in the first lens group G1 and the object side lens surface (surface number 10) of the double concave negative lens L21 in the second lens group G2.

In the optical system according to Example 3, the vibration reduction coefficient K is 0.306 and the focal length is 28.44 mm, so that in order to correct rotational camera shake of 0.70 degrees, the moving amount of the vibration reduction lens group becomes 1.13 mm.

Various values associated with the optical system according to Example 3 are listed in Table 3.

TABLE 3

(Specifications)

f = 28.44
FNO = 1.45
2ω = 75.8
Y = 21.6
TL = 133.3

(Lens Surface Data)

| i | r | d | nd | vd |
|---|---|---|---|---|
| OP | ∞ |  |  |  |
| 1 | 100.000 | 2.40 | 1.74100 | 52.67 |
| 2 | 30.472 | 6.11 |  |  |
| 3 | 61.820 | 2.10 | 1.77250 | 49.60 |
| 4 | 40.528 | 0.20 | 1.55389 | 38.09 |
| *5 | 34.996 | 11.06 |  |  |
| 6 | −230.000 | 8.00 | 1.74397 | 44.85 |
| 7 | −85.027 | 0.20 |  |  |
| 8 | 84.290 | 4.89 | 1.74397 | 44.85 |
| 9 | −199.472 | 5.00 |  |  |
| 10 | −74.412 | 1.30 | 1.48749 | 70.41 |
| 11 | 55.716 | 2.99 | 1.80100 | 34.96 |
| 12 | 131.420 | (d12) |  |  |
| 13 | 44.605 | 3.61 | 1.69680 | 55.52 |
| 14 | 108.329 | 0.20 |  |  |
| 15 | 38.431 | 6.09 | 1.69680 | 55.52 |
| 16 | −159.242 | 0.20 |  |  |
| 17 | 116.847 | 1.30 | 1.62004 | 36.30 |
| 18 | 26.190 | 5.00 |  |  |
| 19 | ∞ | 6.56 | Aperture Stop S | |
| 20 | −23.170 | 2.29 | 1.76182 | 26.56 |
| 21 | 48.664 | 6.00 | 1.77250 | 49.60 |
| *22 | −61.350 | 1.40 |  |  |
| 23 | 298.511 | 6.00 | 1.72916 | 54.66 |
| 24 | −39.601 | 0.20 |  |  |
| 25 | −63.162 | 4.44 | 1.77250 | 49.61 |
| 26 | −33.521 | (Bf) |  |  |
| I | ∞ |  |  |  |

(Lens Group Data)

| Group | ST | Focal Length |
|---|---|---|
| G1 | 1 | 553.08 |
| G2 | 10 | −142.23 |
| G3 | 13 | 43.02 |

(Aspherical Surface Data)

Surface Number = 5

| κ = −0.116100 | A4 = −8.06560E−07 |
|---|---|
| A6 = −1.69170E−09 | A8 = −1.57780E−12 |

TABLE 3-continued

Surface Number = 22

| κ = −17.884100 | A4 = 2.86500E−06 |
| A6 = 2.91840E−08 | A8 = −3.77560E−11 |

(Variable Distances)

|  | INF | CLD |
|---|---|---|
| β = | 0 | −0.0333 |
| d13 = | 7.47 | 6.45 |
| Bf = | 38.32 | 39.34 |

(Values for Conditional Expressions)

(1) f/f23 = 0.652
(2) f/f1 = 0.053
(3) f/f2 = −0.20
(4) H2in/H1in = 1.567

Figure 10A:
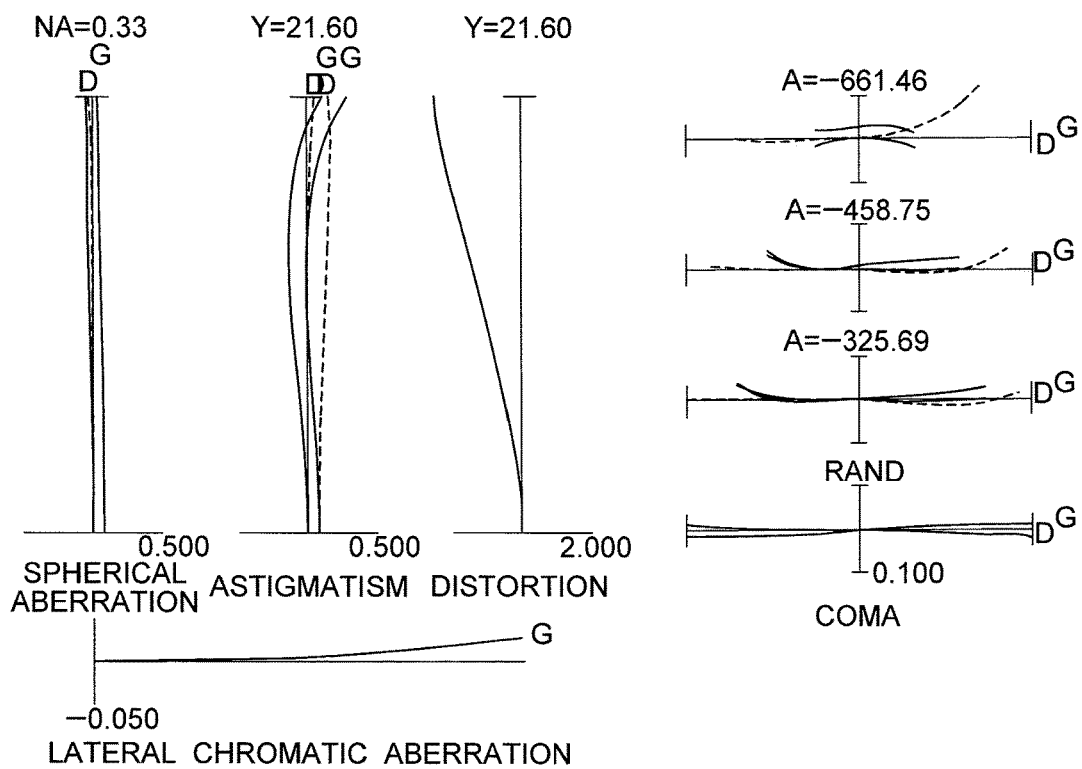
Figure 10B:
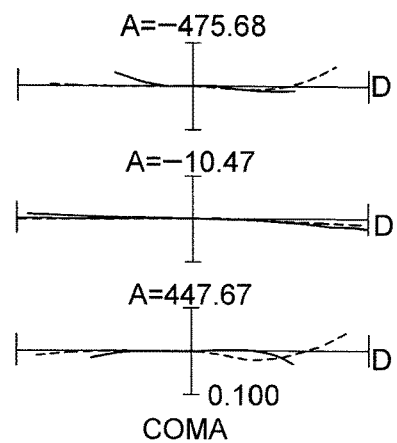

FIGS. 9A and 9B are graphs showing various aberrations of the optical system according to Example 3 upon focusing on an infinitely distant object, in which FIG. 9A shows various aberrations, and FIG. 9B shows coma upon correcting rotational camera shake of 0.7 degrees. FIGS. 10A and 10B are graphs showing various aberrations of the optical system according to Example 3 upon focusing on an intermediately distant object, in which FIG. 10A shows various aberrations, and FIG. 10B shows coma upon correcting rotational camera shake of 0.7 degrees.

As is apparent from various graphs, the optical system according to Example 3 shows superb optical performance as a result of good corrections to various aberrations.

EXAMPLE 4

Figure 11:
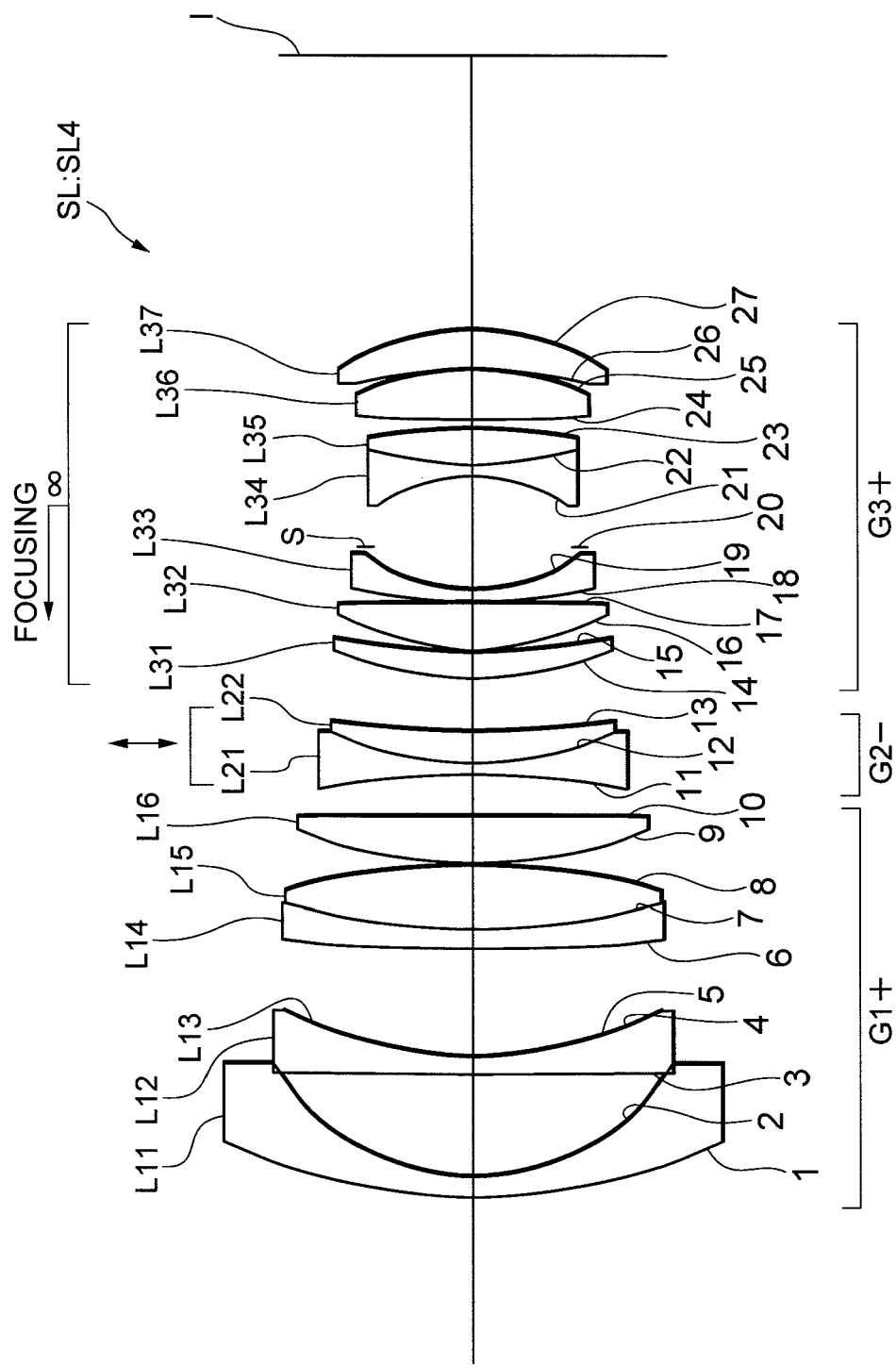
FIG. 11 is a sectional view showing a lens configuration of an optical system according to Example 4 of the present application.

FIG. 11 is a sectional view showing a lens configuration of an optical system SL4 according to Example 4 of the present application. In the optical system SL4 shown in FIG. 11, the first lens group G1 is composed of, in order from an object side, a negative meniscus lens L11 having a convex surface facing the object side, a cemented lens constructed by a negative meniscus lens L12 having a convex surface facing the object side cemented with an aspherical negative lens L13 having a negative meniscus shape with a convex surface facing the object side, a cemented lens constructed by a negative meniscus lens L14 having a convex surface facing the object side cemented with a double convex positive lens L15, and a double convex positive lens L16.

The second lens group G2 is composed of, in order from the object side, a cemented lens constructed by a double concave negative lens L21 cemented with a positive meniscus lens L22 having a convex surface facing the object side.

The third lens group G3 is composed of, in order from the object side, a positive meniscus lens L31 having a convex surface facing the object side, a double convex positive lens L32, a negative meniscus lens L33 having a convex surface facing the object side, an aperture stop S, a cemented lens constructed by a double concave negative lens L34 cemented with an aspherical positive lens L35 having a double convex shape, a double convex positive lens L36, and a positive meniscus lens L37 having a convex surface facing the image side.

In Example 4, an antireflection coating explained later is applied to the image plane side lens surface (surface number 2) of the negative meniscus lens L11 in the first lens group G1 and the image side lens surface (surface number 10) of the double convex positive lens L16 in the first lens group G1.

In the optical system according to Example 4, the vibration reduction coefficient K is 0.290 and the focal length is 24.70 mm, so that in order to correct rotational camera shake of 0.70 degrees, the moving amount of the vibration reduction lens group becomes 1.04 mm.

Various values associated with the optical system according to Example 4 are listed in Table 4.

TABLE 4

(Specifications)

f = 24.70
FNO = 1.44
2ω = 83.7
Y = 21.6
TL = 133.3

(Lens Surface Data)

| i | r | d | nd | νd |
|---|---|---|---|---|
| OP | ∞ |  |  |  |
| 1 | 70.260 | 2.40 | 1.74100 | 52.67 |
| 2 | 28.526 | 11.93 |  |  |
| 3 | 8844.268 | 2.10 | 1.77250 | 49.60 |
| 4 | 50.722 | 0.20 | 1.55389 | 38.09 |
| *5 | 41.921 | 12.50 |  |  |
| 6 | 298.509 | 2.27 | 1.75520 | 27.58 |
| 7 | 88.204 | 7.50 | 1.74397 | 44.85 |
| 8 | −82.134 | 0.20 |  |  |
| 9 | 62.241 | 5.50 | 1.77250 | 49.61 |
| 10 | −737.077 | 5.00 |  |  |
| 11 | −96.957 | 1.30 | 1.58313 | 59.38 |
| 12 | 44.004 | 3.72 | 1.83400 | 37.16 |
| 13 | 128.781 | (d13) |  |  |
| 14 | 47.455 | 3.03 | 1.69680 | 55.52 |
| 15 | 90.837 | 0.20 |  |  |
| 16 | 33.070 | 5.62 | 1.68692 | 55.00 |
| 17 | −440.765 | 0.20 |  |  |
| 18 | 66.442 | 1.30 | 1.63980 | 34.56 |
| 19 | 23.078 | 5.00 |  |  |
| 20 | ∞ | 8.45 | Aperture Stop S |  |
| 21 | −20.977 | 1.30 | 1.78472 | 25.68 |
| 22 | 51.753 | 4.09 | 1.77250 | 49.60 |
| *23 | −48.262 | 1.07 |  |  |
| 24 | 362.304 | 5.96 | 1.74100 | 52.67 |
| 25 | −34.691 | 0.20 |  |  |
| 26 | −49.773 | 4.51 | 1.77250 | 49.61 |
| 27 | −28.781 | (Bf) |  |  |
| I | ∞ |  |  |  |

(Lens Group Data)

| Group | ST | Focal Length |
|---|---|---|
| G1 | 1 | 111.53 |
| G2 | 11 | −147.13 |
| G3 | 14 | 42.48 |

(Aspherical Surface Data)

Surface Number = 5

| κ = 0.041600 | A4 = −3.01610E−06 |
| A6 = −1.30950E−10 | A8 = −1.50790E−12 |

Surface Number = 23

| κ = −23.208700 | A4 = −6.21040E−06 |
| A6 = 1.01630E−07 | A8 = −1.81570E−10 |

(Variable Distances)

|  | INF | CLD |
|---|---|---|
| β = | 0 | −0.0333 |
| d13 = | 6.30 | 5.47 |
| Bf = | 31.47 | 32.29 |

TABLE 4-continued (Values for Conditional Expressions)

(1) f/f23 = 0.570
(2) f/f1 = 0.221
(3) f/f2 = −0.17
(4) H2in/H1in = 1.823

Figure 12A:
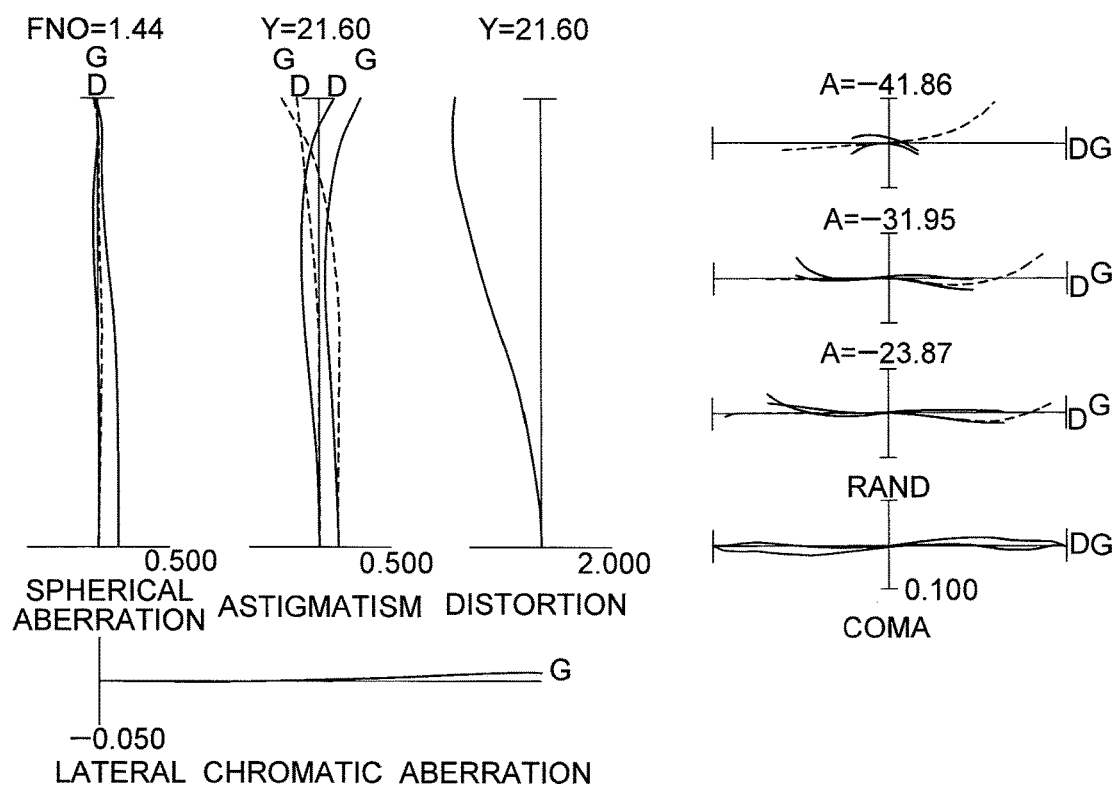
Figure 12B:
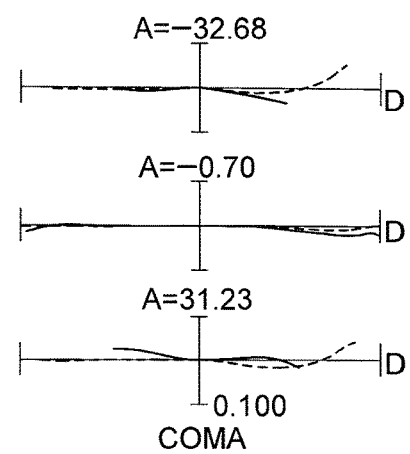
Figure 13A:
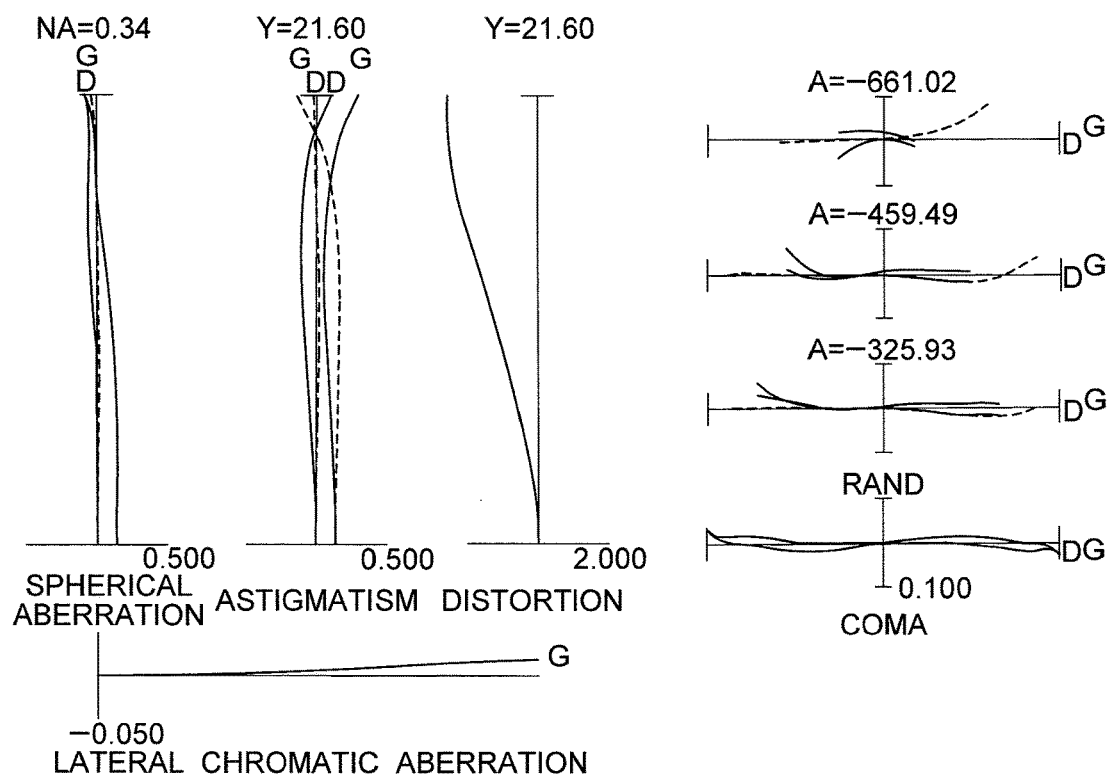
Figure 13B:
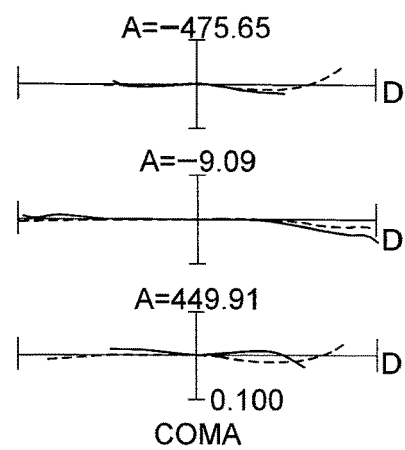

FIGS. 12A and 12B are graphs showing various aberrations of the optical system according to Example 4 upon focusing on an infinitely distant object, in which FIG. 12A shows various aberrations, and FIG. 12B shows coma upon correcting rotational camera shake of 0.7 degrees. FIGS. 13A and 13B are graphs showing various aberrations of the optical system according to Example 4 upon focusing on an intermediately distant object, in which FIG. 13A shows various aberrations, and FIG. 13B shows coma upon correcting rotational camera shake of 0.7 degrees.

As is apparent from various graphs, the optical system according to Example 4 shows superb optical performance as a result of good corrections to various aberrations.

Example 5

Figure 14:
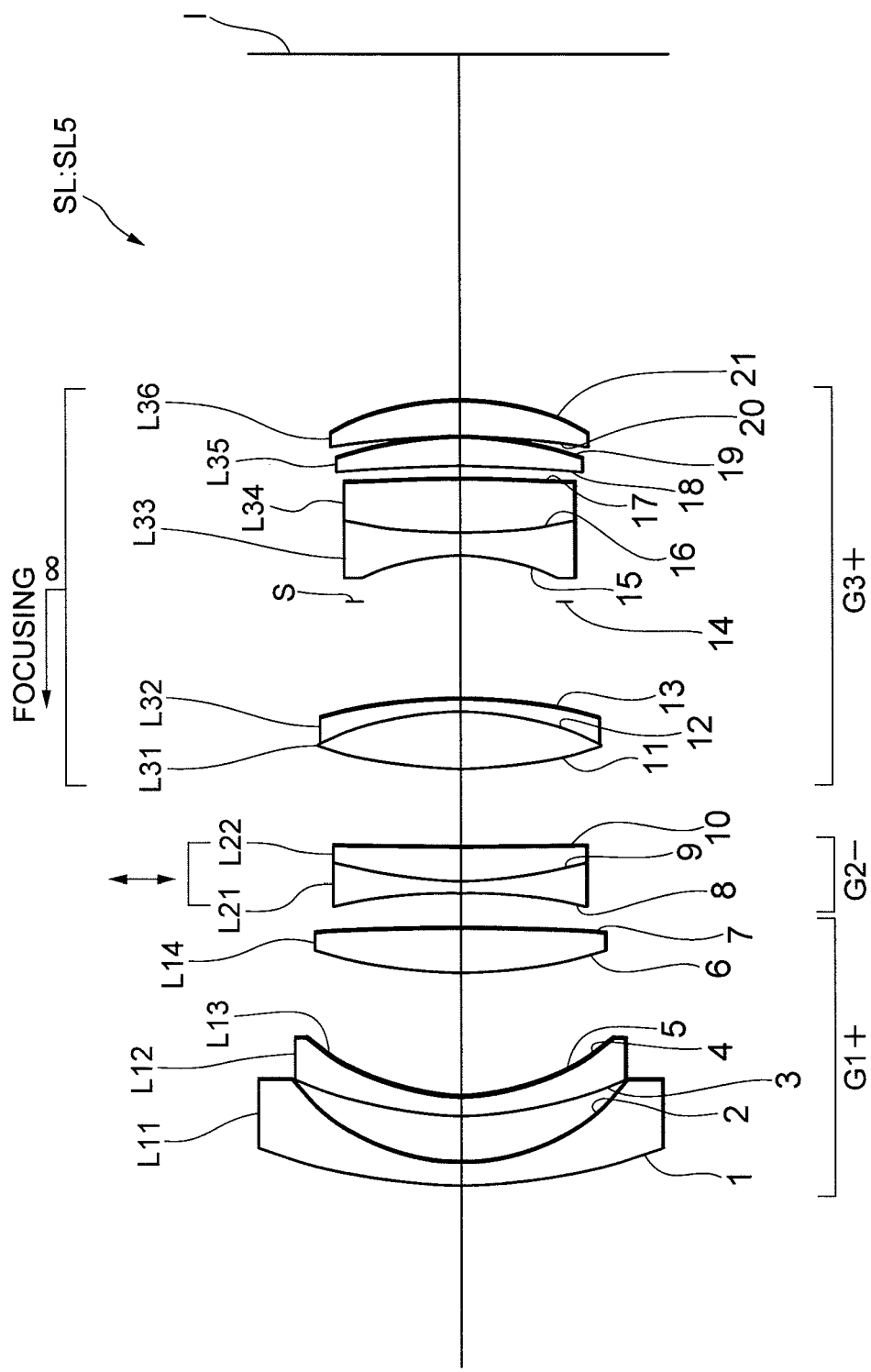
FIG. 14 is a sectional view showing a lens configuration of an optical system according to Example 5 of the present application.

FIG. 14 is a sectional view showing a lens configuration of an optical system SL5 according to Example 5 of the present application. In the optical system SL5 shown in FIG. 14, the first lens group G1 is composed of, in order from an object side, a negative meniscus lens L11 having a convex surface facing the object side, a cemented lens constructed by a negative meniscus lens L12 having a convex surface facing the object side cemented with an aspherical negative lens L13 having a negative meniscus shape with a convex surface facing the object side, and a double convex positive lens L14.

The second lens group G2 is composed of, in order from the object side, a cemented lens constructed by a double concave negative lens L21 cemented with a positive meniscus lens L22 having a convex surface facing the object side.

The third lens group G3 is composed of, in order from the object side, a cemented lens constructed by a double convex positive lens L31 cemented with a negative meniscus lens L32 having a convex surface facing the image side, an aperture stop S, a cemented lens constructed by a double concave negative lens L33 cemented with an aspherical positive lens L34 having a double convex shape, a positive meniscus lens L35 having a convex surface facing the image side, and a positive meniscus lens L36 having a convex surface facing the image side.

In Example 5, an antireflection coating explained later is applied to the image plane side lens surface (surface number 2) of the negative meniscus lens L11 in the first lens group G1 and the object side lens surface (surface number 8) of the double concave negative lens L21 in the second lens group G2.

In the optical system according to Example 5, the vibration reduction coefficient K is 0.272 and the focal length is 28.08 mm, so that in order to correct rotational camera shake of 0.70 degrees, the moving amount of the vibration reduction lens group becomes 1.26 mm.

Various values associated with the optical system according to Example 5 are listed in Table 5.

TABLE 5

(Specifications)

f = 28.08
FNO = 1.84
2ω = 76.4
Y = 21.6
TL = 124.5

(Lens Surface Data)

| i | r | d | nd | νd |
|---|---|---|---|---|
| OP | ∞ | | | |
| 1 | 69.946 | 2.40 | 1.74100 | 52.67 |
| 2 | 25.426 | 5.00 | | |
| 3 | 45.000 | 2.10 | 1.77250 | 49.60 |
| 4 | 26.915 | 0.20 | 1.55389 | 38.09 |
| *5 | 23.566 | 13.79 | | |
| 6 | 57.582 | 4.75 | 1.90366 | 31.31 |
| 7 | −391.763 | 4.00 | | |
| 8 | −65.539 | 1.30 | 1.55857 | 45.21 |
| 9 | 56.097 | 3.60 | 1.74397 | 44.85 |
| 10 | 836.329 | (d10) | | |
| 11 | 49.880 | 6.47 | 1.74100 | 52.67 |
| 12 | −37.637 | 1.30 | 2.00069 | 25.46 |
| 13 | −61.930 | 11.01 | | |
| 14 | ∞ | 5.00 | Aperture Stop S | |
| 15 | −26.632 | 2.50 | 1.76182 | 26.56 |
| 16 | 69.109 | 5.84 | 1.77250 | 49.60 |
| *17 | −110.000 | 1.44 | | |
| 18 | −148.037 | 3.02 | 1.72916 | 54.66 |
| 19 | −44.972 | 0.20 | | |
| 20 | −87.642 | 3.82 | 1.77250 | 49.60 |
| 21 | −31.772 | (Bf) | | |
| I | ∞ | | | |

(Lens Group Data)

| Group | ST | Focal Length |
|---|---|---|
| G1 | 1 | −169.53 |
| G2 | 8 | −163.95 |
| G3 | 11 | 42.15 |

(Aspherical Surface Data)

Surface Number = 5

κ = 0.043300  A4 = 8.68000E−07
A6 = −3.24000E−09  A8 = −2.56000E−12

Surface Number = 17

κ = 3.855700  A4 = 1.23000E−05
A6 = 2.12000E−09  A8 = −1.65000E−11

(Variable Distances)

| | INF | CLD |
|---|---|---|
| β = | 0 | −0.0333 |
| d13 = | 8.65 | 7.48 |
| Bf = | 38.10 | 39.27 |

(Values for Conditional Expressions)

(1) f/f23 = 0.644
(2) f/f1 = −0.166
(3) f/f2 = −0.17
(4) H2in/H1in = 1.639

Figure 15A:
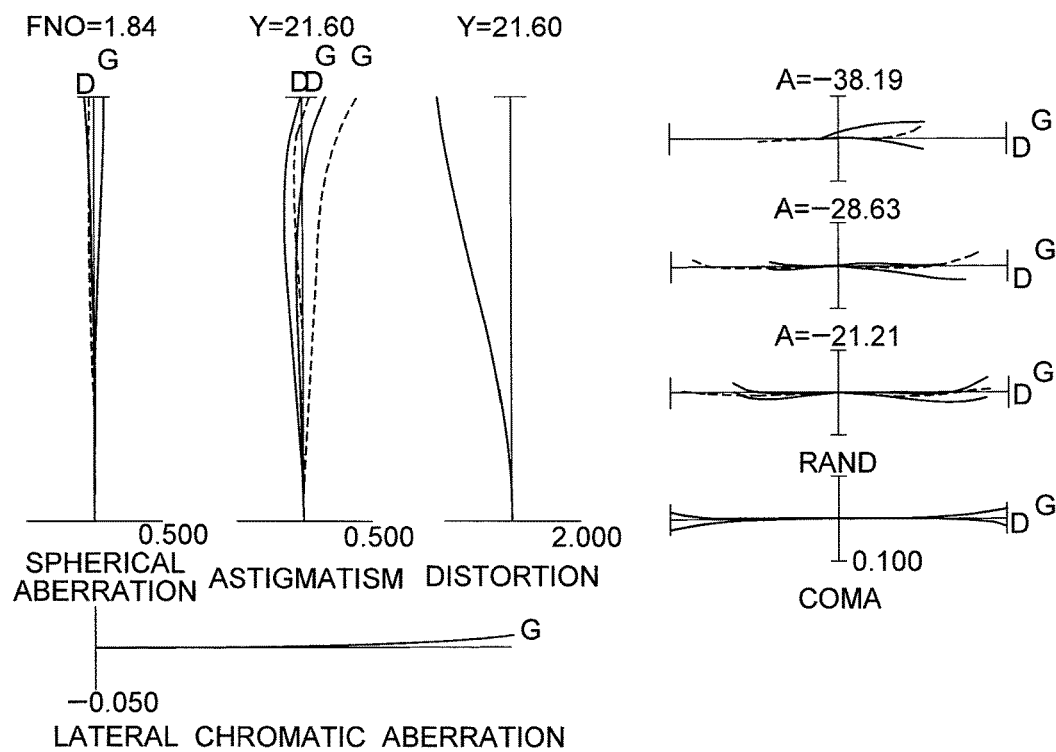
Figure 15B:
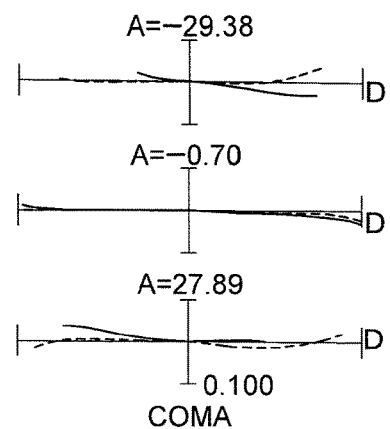

FIGS. 15A and 15B are graphs showing various aberrations of the optical system according to Example 5 upon focusing on an infinitely distant object, in which FIG. 15A shows various aberrations, and FIG. 15B shows coma upon correcting rotational camera shake of 0.7 degrees.

Figure 16A:
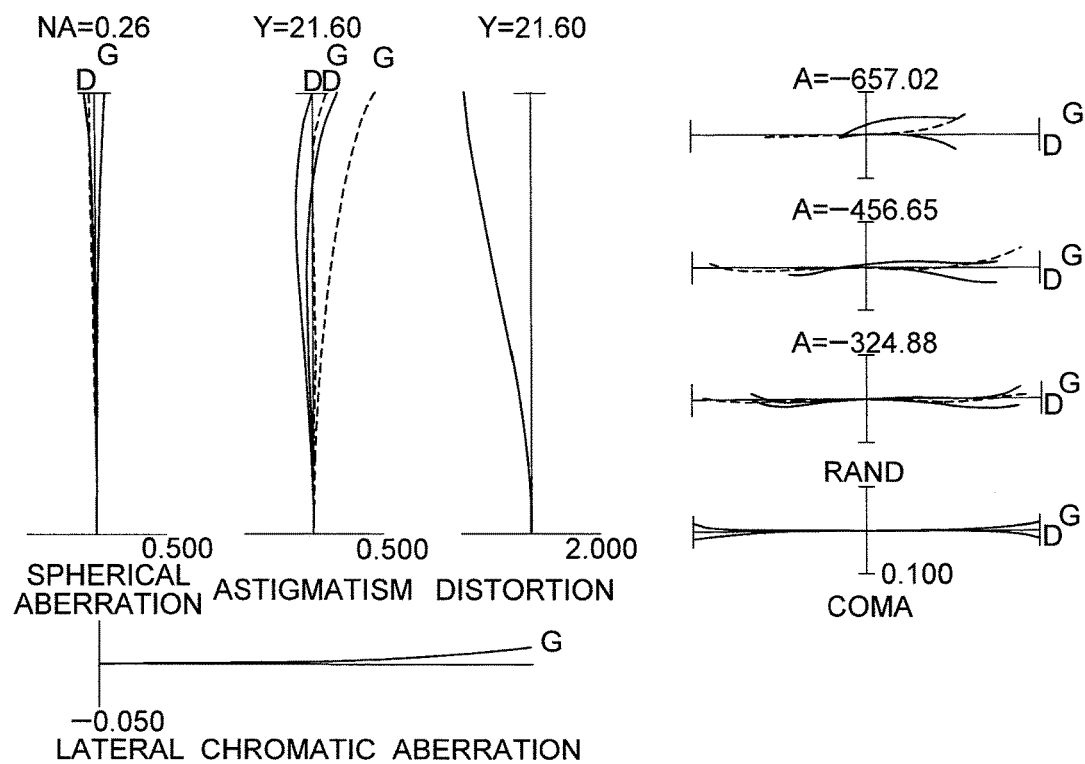
Figure 16B:
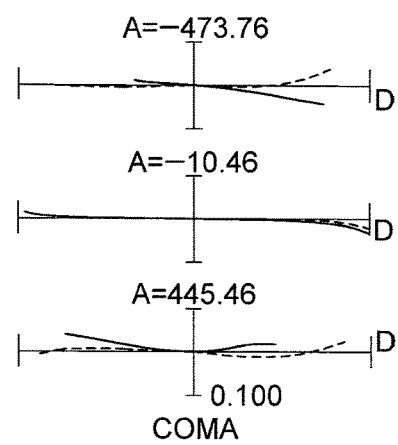

FIGS. 16A and 16B are graphs showing various aberrations of the optical system according to Example 5 upon focusing on an intermediately distant object, in which FIG. 16A shows various aberrations, and FIG. 16B shows coma upon correcting rotational camera shake of 0.7 degrees.

As is apparent from various graphs, the optical system according to Example 5 shows superb optical performance as a result of good corrections to various aberrations.

Example 6

FIG. 17 is a sectional view showing a lens configuration of an optical system SL6 according to Example 6 of the present application. In the optical system SL6 shown in FIG. 17, the first lens group G1 is composed of, in order from an object side, a negative meniscus lens L11 having a convex surface facing the object side, a cemented lens constructed by a negative meniscus lens L12 having a convex surface facing the object side cemented with an aspherical negative lens L13 having a negative meniscus shape with a convex surface facing the object side, a positive meniscus lens L14 having a concave surface facing the object side, and a double convex positive lens L15.

The second lens group G2 is composed of, in order from the object side, a cemented lens constructed by a positive meniscus lens L21 having a concave surface facing the object side cemented with a negative meniscus lens L22 having a concave surface facing the object side, and a cemented lens constructed by a double concave negative lens L23 cemented with a positive meniscus lens L24 having a convex surface facing the object side.

The third lens group G3 is composed of, in order from the object side, a positive meniscus lens L31 having a convex surface facing the object side, a double convex positive lens L32, a negative meniscus lens L33 having a convex surface facing the object side, an aperture stop S, a cemented lens constructed by a double concave negative lens L34 cemented with an aspherical positive lens L35 having a double convex shape, a double convex positive lens L36, and a positive meniscus lens L37 having a concave surface facing the object side.

In Example 6, an antireflection coating explained later is applied to the image plane side lens surface (surface number 2) of the negative meniscus lens L11 in the first lens group G1 and the object side lens surface (surface number 6) of the positive meniscus lens L14 in the first lens group G1.

In the optical system according to Example 6, the vibration reduction coefficient K is 0.290 and the focal length is 29.00 mm, so that in order to correct rotational camera shake of 0.70 degrees, the moving amount of the vibration reduction lens group becomes 1.22 mm.

Various values associated with the optical system according to Example 6 are listed in Table 6.

TABLE 6

(Specifications)

f = 29.00
FNO = 1.45
2ω = 74.7
Y = 21.6
TL = 134.1

(Lens Surface Data)

| i | r | d | nd | νd |
|---|---|---|---|---|
| OP | ∞ | | | |
| 1 | 58.989 | 2.40 | 1.74100 | 52.67 |
| 2 | 29.526 | 6.92 | | |
| 3 | 72.211 | 2.10 | 1.77250 | 49.60 |
| 4 | 38.041 | 0.20 | 1.55389 | 38.09 |
| *5 | 35.056 | 12.50 | | |
| 6 | −43.678 | 3.98 | 1.74400 | 44.78 |

TABLE 6-continued

| 7 | −43.282 | 0.20 | | |
|---|---|---|---|---|
| 8 | 91.966 | 5.50 | 1.74806 | 50.00 |
| 9 | −104.422 | 3.59 | | |
| 10 | −55.000 | 2.51 | 1.48749 | 70.40 |
| 11 | −41.353 | 1.50 | 1.51742 | 52.31 |
| 12 | −63.431 | 0.20 | | |
| 13 | −125.764 | 1.30 | 1.48749 | 70.40 |
| 14 | 41.948 | 0.33 | | |
| 15 | 43.787 | 3.35 | 1.83400 | 37.16 |
| 16 | 93.370 | (d16) | | |
| 17 | 40.425 | 4.23 | 1.69680 | 55.52 |
| 18 | 145.955 | 0.20 | | |
| 19 | 38.368 | 6.26 | 1.69680 | 55.52 |
| 20 | −160.073 | 0.20 | | |
| 21 | 263.236 | 1.30 | 1.61266 | 44.46 |
| 22 | 26.332 | 5.00 | | |
| 23 | ∞ | 5.00 | | Aperture Stop S |
| 24 | −25.587 | 1.30 | 1.78472 | 25.68 |
| 25 | 43.936 | 5.35 | 1.77250 | 49.60 |
| *26 | −83.081 | 2.23 | | |
| 27 | 344.521 | 4.42 | 1.75500 | 52.31 |
| 28 | −50.243 | 0.20 | | |
| 29 | −102.612 | 4.73 | 1.77250 | 49.61 |
| 30 | −33.734 | (Bf) | | |
| I | ∞ | | | |

(Lens Group Data)

| Group | ST | Focal Length |
|---|---|---|
| G1 | 1 | 874.69 |
| G2 | 10 | −150.04 |
| G3 | 17 | 43.27 |

(Aspherical Surface Data)

Surface Number = 5

κ = 0.155400      A4 = 2.09390E−07
A6 = −8.01120E−10   A8 = −1.97890E−12

Surface Number = 26

κ = −39.109400    A4 = 5.05950E−06
A6 = 2.86350E−08  A8 = −4.43890E−11

(Variable Distances)

| | INF | CLD |
|---|---|---|
| β = | 0 | −0.0333 |
| d16 = | 9.74 | 8.70 |
| Bf = | 37.32 | 38.36 |

(Values for Conditional Expressions)

(1) f/f23 = 0.666
(2) f/f1 = 0.033
(3) f/f2 = −0.19
(4) H2in/H1in = 1.525

Figure 18A:
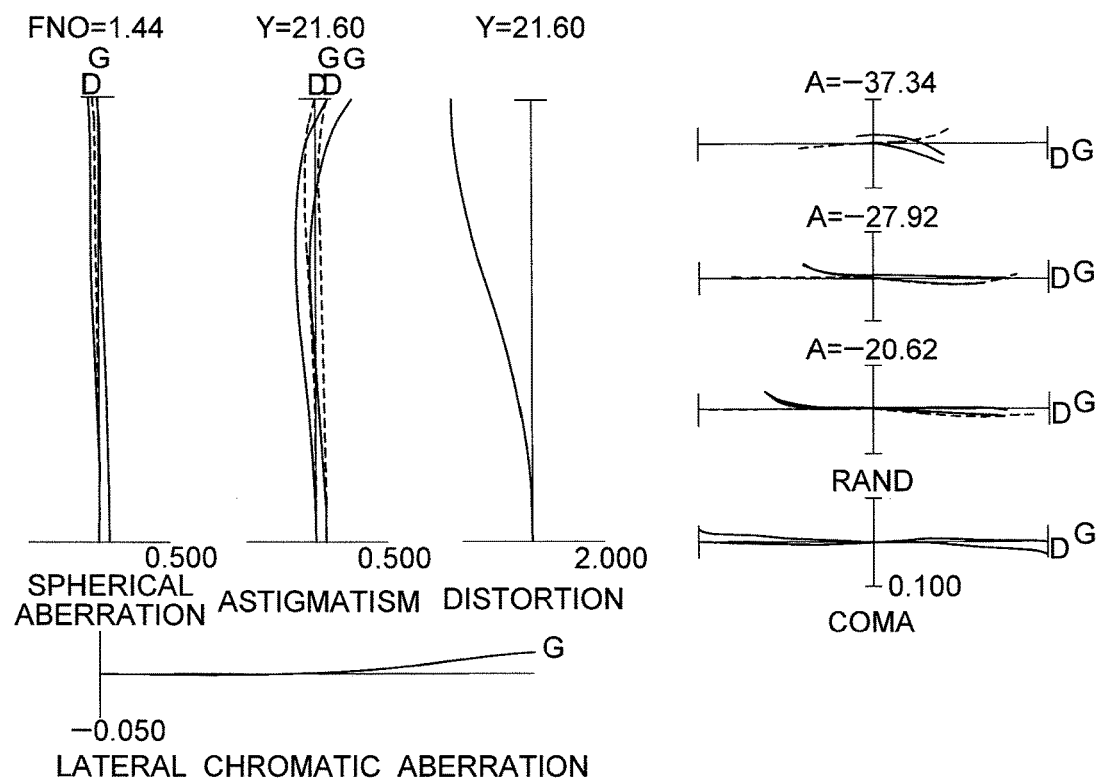
Figure 18B:
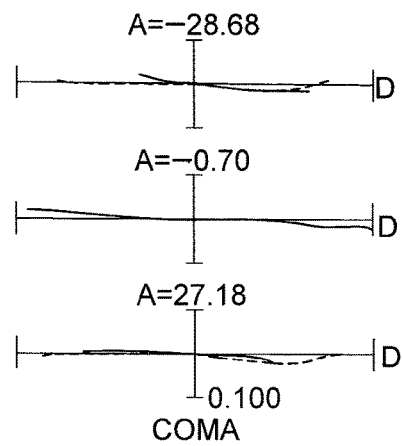
Figure 19A:
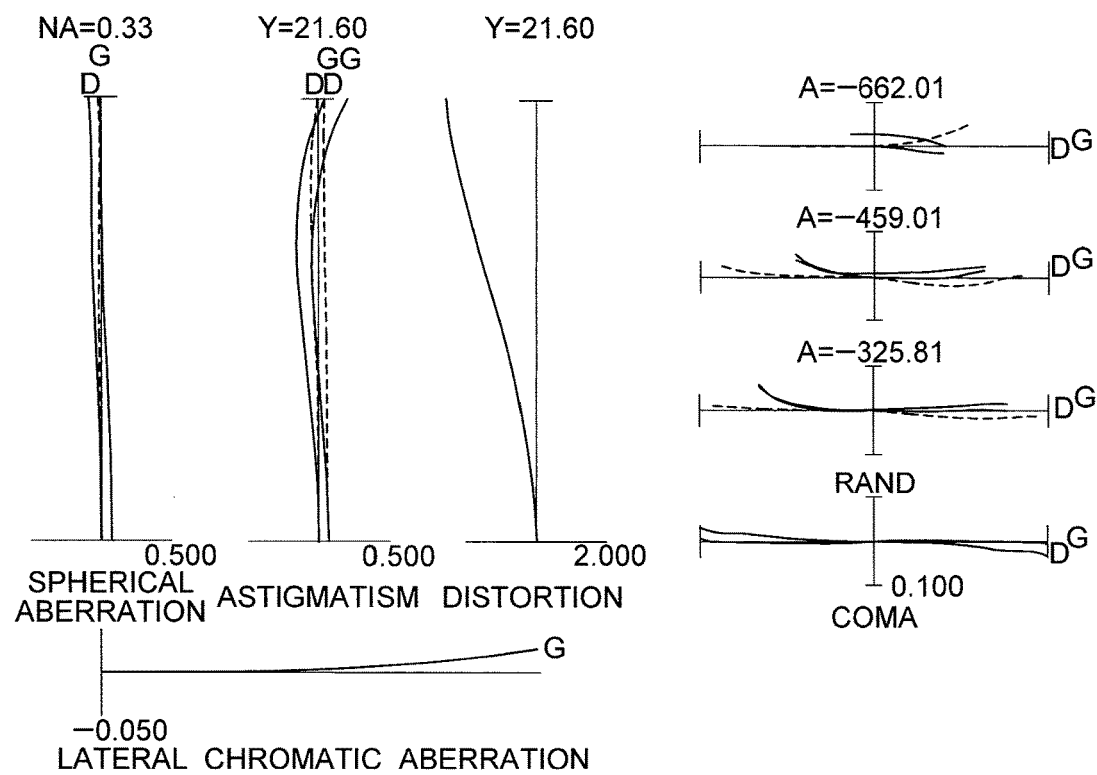
Figure 19B:
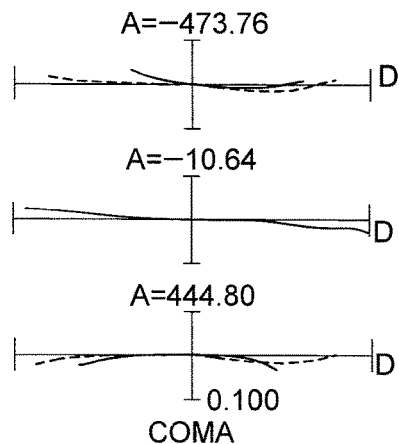

FIGS. 18A and 18B are graphs showing various aberrations of the optical system according to Example 6 upon focusing on an infinitely distant object, in which FIG. 18A shows various aberrations, and FIG. 18B shows coma upon correcting rotational camera shake of 0.7 degrees. FIGS. 19A and 19B are graphs showing various aberrations of the optical system according to Example 6 upon focusing on an intermediately distant object, in which FIG. 19A shows various aberrations, and FIG. 19B shows coma upon correcting rotational camera shake of 0.7 degrees.

As is apparent from various graphs, the optical system according to Example 6 shows superb optical performance as a result of good corrections to various aberrations.

Example 7

Figure 20:
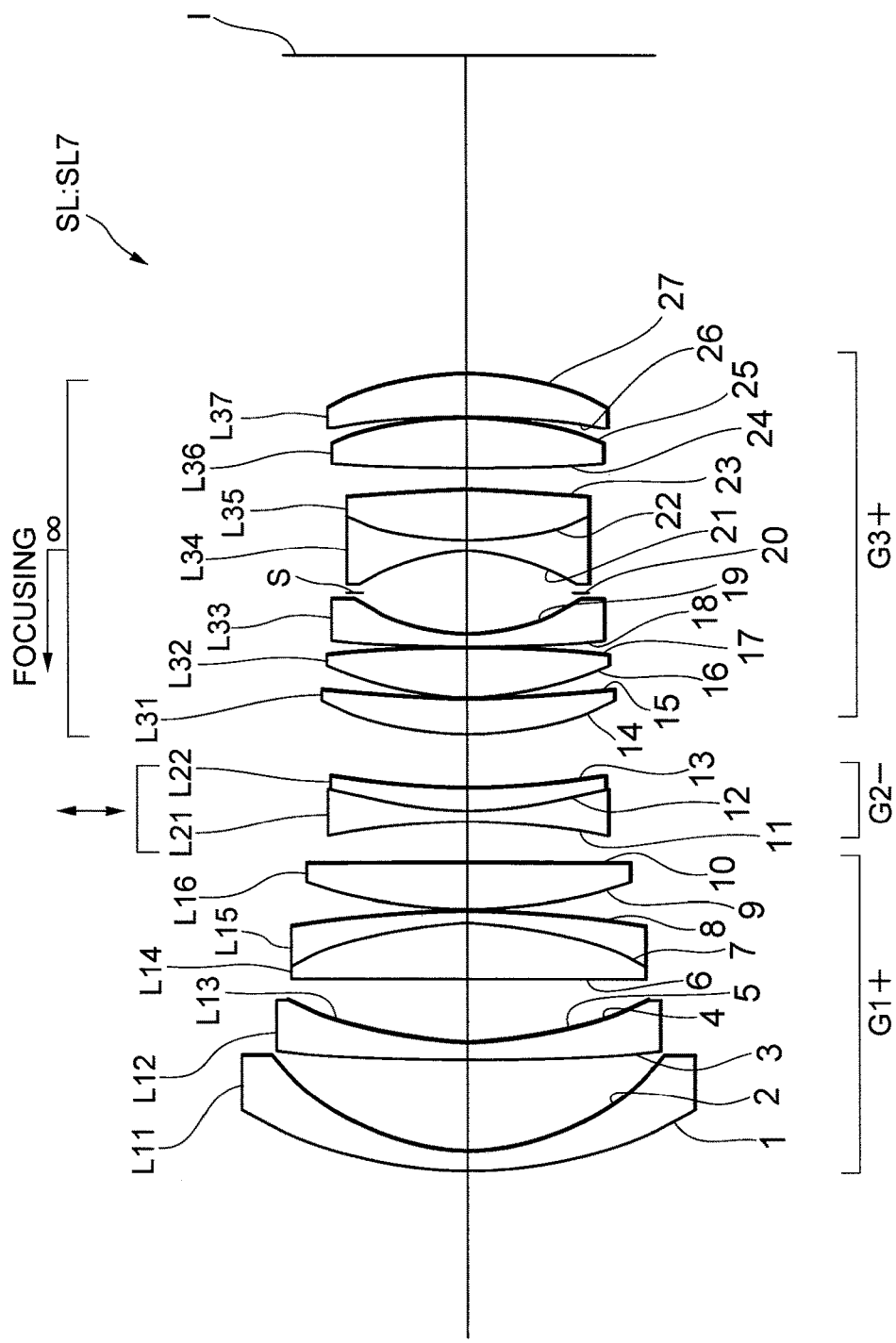
FIG. 20 is a sectional view showing a lens configuration of an optical system according to Example 7 of the present application.

FIG. 20 is a sectional view showing a lens configuration of an optical system SL7 according to Example 7 of the present application. In the optical system SL7 shown in FIG. 20, the first lens group G1 is composed of, in order from an object side, a negative meniscus lens L11 having a convex surface facing the object side, a cemented lens constructed by a negative meniscus lens L12 having a convex surface facing the object side cemented with an aspherical negative lens L13 having a negative meniscus shape with a convex surface facing the object side, a cemented lens constructed by a positive meniscus lens L14 having a concave surface facing the object side cemented with a negative meniscus lens L15 having a concave surface facing the object side, and a positive meniscus lens L16 having a convex surface facing the object side.

The second lens group G2 is composed of, in order from the object side, a cemented lens constructed by a double concave negative lens L21 cemented with a positive meniscus lens L22 having a convex surface facing the object side.

The third lens group G3 is composed of, in order from the object side, a positive meniscus lens L31 having a convex surface facing the object side, a double convex positive lens L32, a negative meniscus lens L33 having a convex surface facing the object side, an aperture stop S, a cemented lens constructed by a double concave negative lens L34 cemented with an aspherical positive lens L35 having a double convex shape, a double convex positive lens L36, and a positive meniscus lens L37 having a concave surface facing the object side.

In Example 7, an antireflection coating explained later is applied to the image plane side lens surface (surface number 2) of the negative meniscus lens L11 in the first lens group G1 and the object side lens surface (surface number 11) of the double concave negative lens L21 in the second lens group G2.

In the optical system according to Example 7, the vibration reduction coefficient K is 0.30 and the focal length is 30.87 mm, so that in order to correct rotational camera shake of 0.70 degrees, the moving amount of the vibration reduction lens group becomes 1.26 mm.

Various values associated with the optical system according to Example 7 are listed in Table 7.

TABLE 7

(Specifications)

f = 30.87
FNO = 1.45
2ω = 71.3
Y = 21.6
TL = 135.0

(Lens Surface Data)

| i | r | d | nd | νd |
|---|---|---|---|---|
| OP | ∞ | | | |
| 1 | 54.000 | 2.40 | 1.74100 | 52.67 |
| 2 | 30.057 | 11.01 | | |
| 3 | 296.733 | 2.10 | 1.77250 | 49.60 |
| 4 | 47.966 | 0.20 | 1.55389 | 38.09 |
| *5 | 42.169 | 7.57 | | |
| 6 | −26631.000 | 6.84 | 1.74400 | 44.78 |
| 7 | −46.891 | 1.30 | 1.52599 | 53.31 |
| 8 | −139.643 | 0.20 | | |
| 9 | 63.943 | 5.50 | 1.74806 | 50.00 |
| 10 | 5875.968 | 5.10 | | |
| 11 | −80.793 | 1.30 | 1.48749 | 70.40 |
| 12 | 51.576 | 3.05 | 1.83400 | 37.16 |
| 13 | 111.029 | (d13) | | |
| 14 | 39.561 | 4.26 | 1.69680 | 55.52 |
| 15 | 122.864 | 0.20 | | |
| 16 | 38.831 | 6.04 | 1.69680 | 55.52 |
| 17 | −152.489 | 0.20 | | |
| 18 | 214.322 | 1.45 | 1.61266 | 44.46 |
| 19 | 24.780 | 5.00 | | |
| 20 | ∞ | 5.07 | Aperture Stop S | |
| 21 | −23.877 | 1.30 | 1.78472 | 25.68 |
| 22 | 40.125 | 6.00 | 1.77250 | 49.60 |
| *23 | −68.316 | 2.73 | | |
| 24 | 270.446 | 6.00 | 1.75500 | 52.31 |
| 25 | −43.519 | 0.20 | | |
| 26 | −92.358 | 5.31 | 1.77250 | 49.61 |
| 27 | −35.520 | (Bf) | | |
| I | ∞ | | | |

(Lens Group Data)

| Group | ST | Focal Length |
|---|---|---|
| G1 | 1 | 688.01 |
| G2 | 11 | −146.58 |
| G3 | 14 | 43.20 |

(Aspherical Surface Data)

Surface Number = 5

κ = −0.678900   A4 = −4.81790E−07
A6 = −9.78310E−10   A8 = 1.73750E−13

Surface Number = 23

κ = −30.523200   A4 = 1.70060E−06
A6 = 4.19410E−08   A8 = −5.89620E−11

(Variable Distances)

| | INF | CLD |
|---|---|---|
| β = | 0 | −0.0333 |
| d13 = | 6.39 | 5.28 |
| Bf = | 38.32 | 39.43 |

(Values for Conditional Expressions)

(1) f/f23 = 0.700
(2) f/f1 = 0.045
(3) f/f2 = −0.21
(4) H2in/H1in = 1.459

Figure 22A:
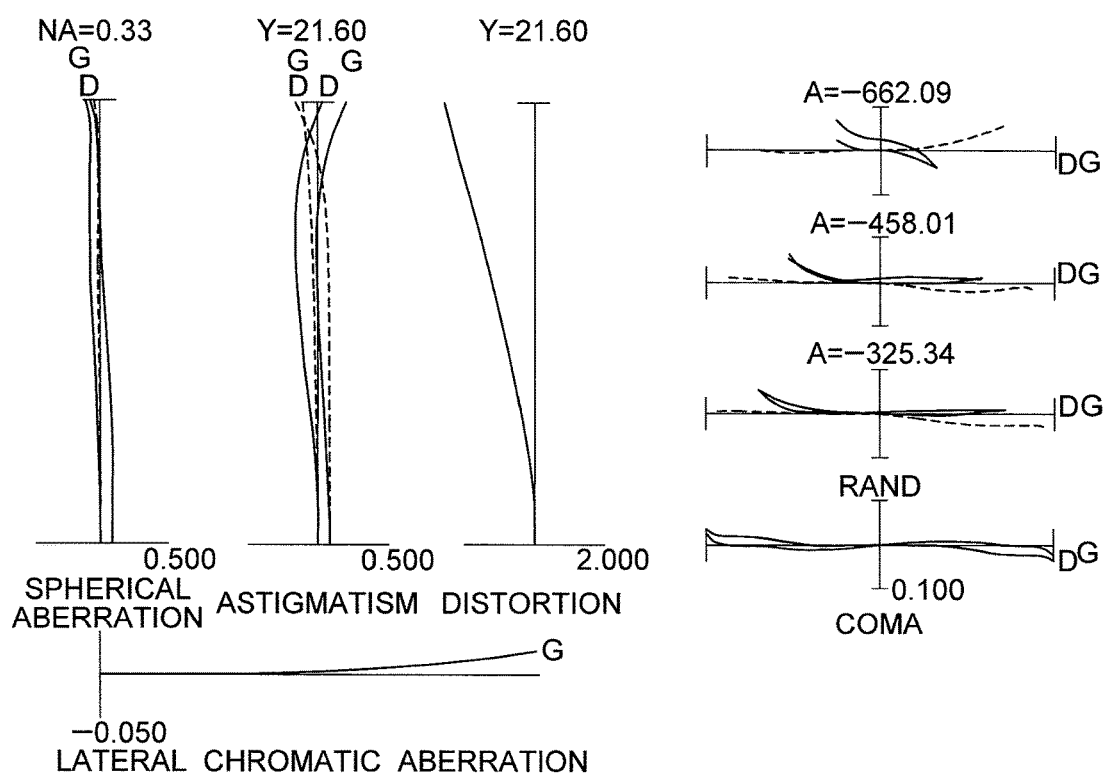
Figure 22B:
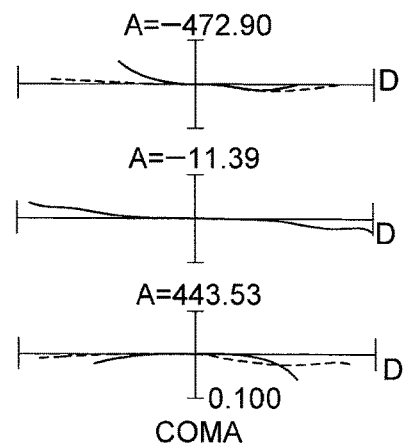

FIGS. 21A and 21B are graphs showing various aberrations of the optical system according to Example 7 upon focusing on an infinitely distant object, in which FIG. 21A shows various aberrations, and FIG. 21B shows coma upon correcting rotational camera shake of 0.7 degrees. FIGS. 22A and 22B are graphs showing various aberrations of the optical system according to Example 7 upon focusing on an intermediately distant object, in which FIG. 22A shows various aberrations, and FIG. 22B shows coma upon correcting rotational camera shake of 0.7 degrees.

As is apparent from various graphs, the optical system according to Example 7 shows superb optical performance as a result of good corrections to various aberrations.

Example 8

Figure 23:
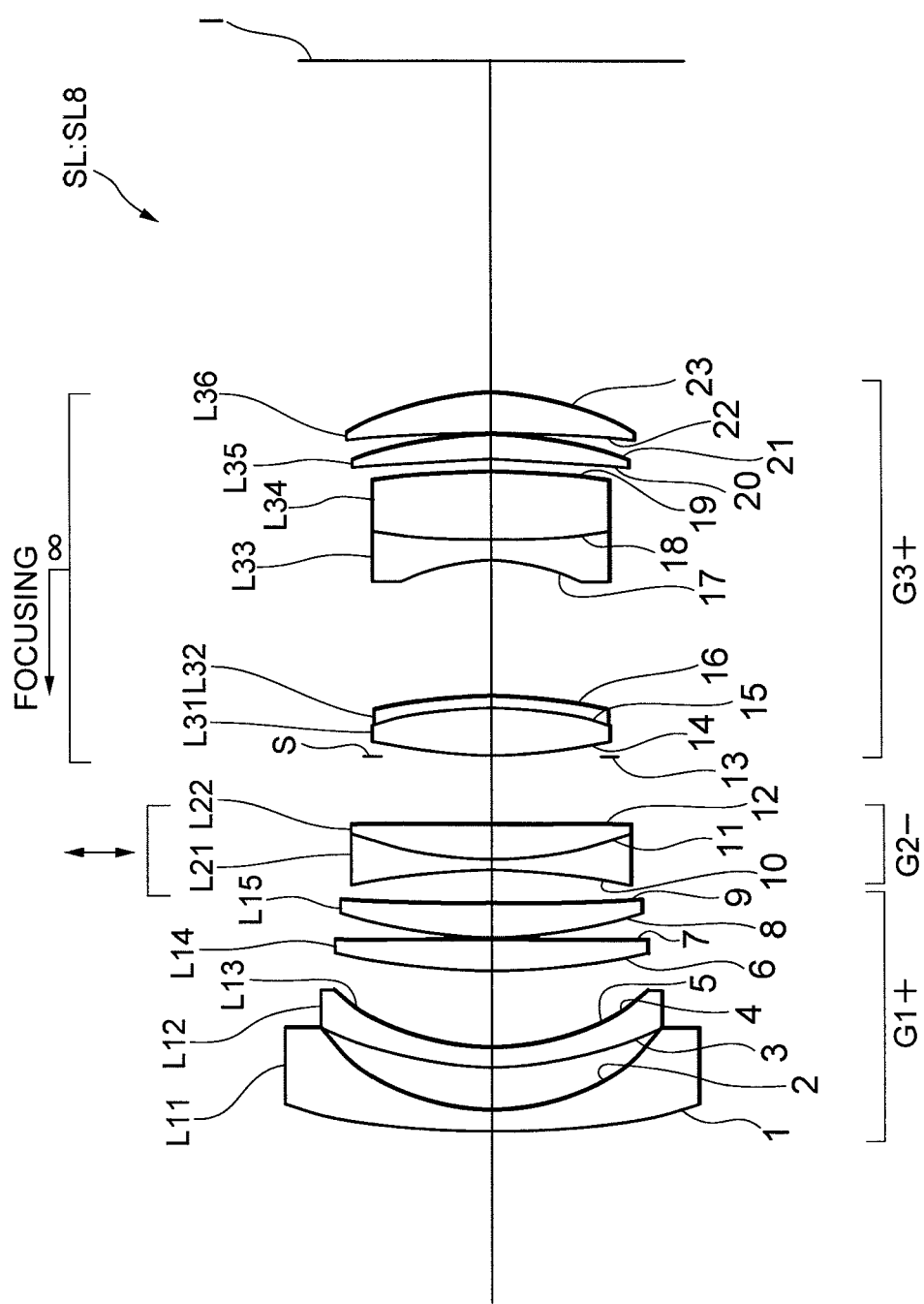
FIG. 23 is a sectional view showing a lens configuration of an optical system according to Example 8 of the present application.

FIG. 23 is a sectional view showing a lens configuration of an optical system SL8 according to Example 8 of the present application. In the optical system SL8 shown in FIG. 23, the first lens group G1 is composed of, in order from an object side, a negative meniscus lens L11 having a convex surface facing the object side, a cemented lens constructed by a negative meniscus lens L12 having a convex surface facing the object side cemented with an aspherical negative lens L13 having a negative meniscus shape with a convex surface facing the object side, a positive meniscus lens L14 having a convex surface facing the object side and a positive meniscus lens L15 having a convex surface facing the object side.

The second lens group G2 is composed of, in order from the object side, a cemented lens constructed by a double concave negative lens L21 cemented with a positive meniscus lens L22 having a convex surface facing the object side.

The third lens group G3 is composed of, in order from the object side, an aperture stop S, a cemented lens constructed by a double convex positive lens L31 cemented with a negative meniscus lens L32 having a concave surface facing the object side, a cemented lens constructed by a double concave negative lens L33 cemented with an aspherical positive lens L34 having a double convex shape, a positive meniscus lens L35 having a concave surface facing the object side, and a positive meniscus lens L36 having a concave surface facing the object side.

In Example 8, an antireflection coating explained later is applied to the image plane side lens surface (surface number 5) of the aspherical negative meniscus lens L13 having a negative meniscus shape in the first lens group G1 and the image plane side lens surface (surface number 12) of the positive meniscus lens L22 in the second lens group G2.

In the optical system according to Example 8, the vibration reduction coefficient K is 0.27 and the focal length is 28.00 mm, so that in order to correct rotational camera shake of 0.70 degrees, the moving amount of the vibration reduction lens group becomes 1.26 mm.

Various values associated with the optical system according to Example 8 are listed in Table 8.

TABLE 8

(Specifications)

f = 28.00
FNO = 1.84
2ω = 76.5
Y = 21.6
TL = 124.5

(Lens Surface Data)

| i | r | d | nd | νd |
|---|---|---|---|---|
| OP | ∞ | | | |
| 1 | 100.000 | 2.40 | 1.74100 | 52.67 |
| 2 | 25.947 | 5.00 | | |
| 3 | 46.077 | 2.10 | 1.77250 | 49.60 |
| 4 | 28.597 | 0.20 | 1.55389 | 38.09 |
| *5 | 23.872 | 9.01 | | |
| 6 | 87.112 | 3.61 | 1.90366 | 31.31 |
| 7 | 18648.952 | 0.20 | | |
| 8 | 58.326 | 3.81 | 1.90366 | 31.31 |
| 9 | 250.749 | 4.00 | | |
| 10 | −70.091 | 1.30 | 1.60614 | 37.90 |
| 11 | 48.211 | 4.02 | 1.74397 | 44.85 |
| 12 | 986.837 | (d12) | | |
| 13 | ∞ | 0.10 | Aperture Stop S | |
| 14 | 59.349 | 5.59 | 1.74100 | 52.67 |
| 15 | −45.974 | 1.30 | 2.00069 | 25.46 |
| 16 | −61.044 | 16.05 | | |
| 17 | −25.065 | 2.50 | 1.84666 | 23.78 |
| 18 | 118.919 | 8.00 | 1.77250 | 49.60 |
| *19 | −71.765 | 1.23 | | |
| 20 | −109.608 | 2.93 | 1.72916 | 54.66 |
| 21 | −45.839 | 0.20 | | |
| 22 | −156.670 | 4.67 | 1.80400 | 46.57 |
| 23 | −32.339 | (Bf) | | |
| I | ∞ | | | |

TABLE 8-continued (Lens Group Data)

| Group | ST | Focal Length |
|---|---|---|
| G1 | 1 | −240.33 |
| G2 | 10 | −152.94 |
| G3 | 13 | 41.75 |

(Aspherical Surface Data)

Surface Number = 5

κ = −0.105300    A4 = −1.44211E−06
A6 = −3.86598E−09    A8 = −6.08176E−13

Surface Number = 19

κ = 3.354500    A4 = 1.14404E−05
A6 = 2.95647E−09    A8 = −8.75837E−12

(Variable Distances)

| | INF | CLD |
|---|---|---|
| β = | 0 | −0.0333 |
| d12 = | 8.08 | 7.28 |
| Bf = | 38.20 | 39.26 |

(Values for Conditional Expressions)

(1) f/f23 = 0.672
(2) f/f1 = −0.117
(3) f/f2 = −0.18
(4) H2in/H1in = 1.525

Figure 24A:
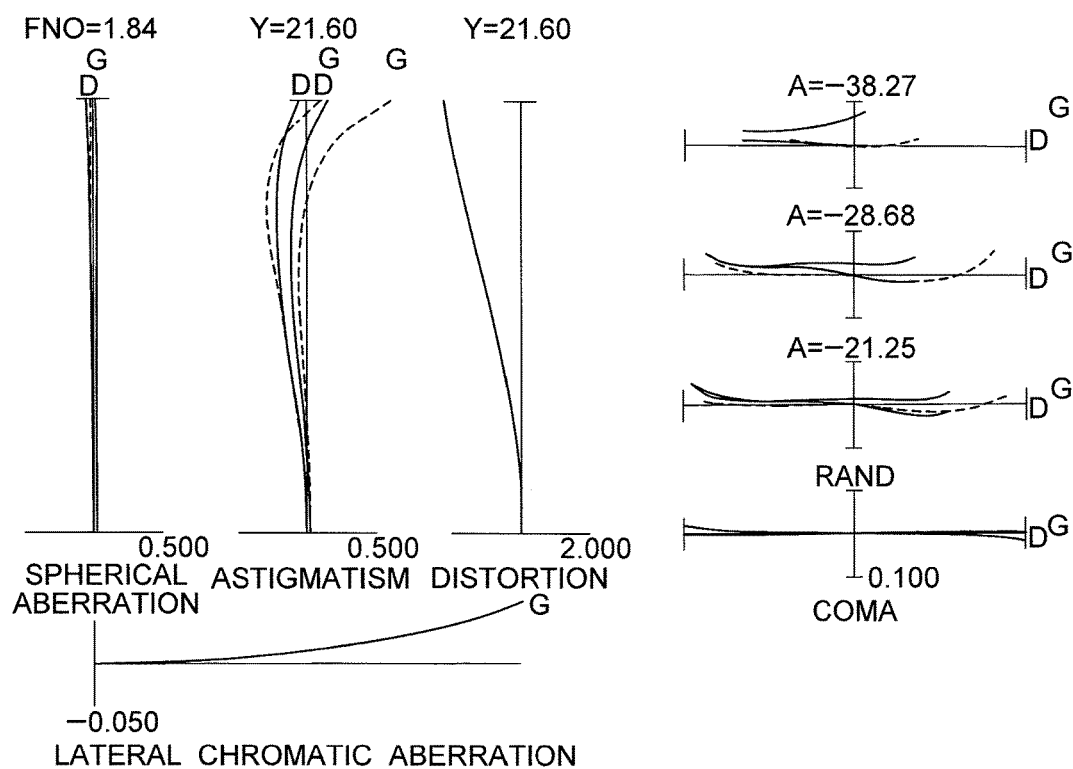
Figure 24B:
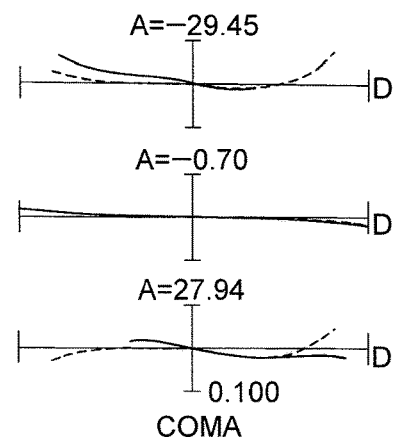
Figure 25A:
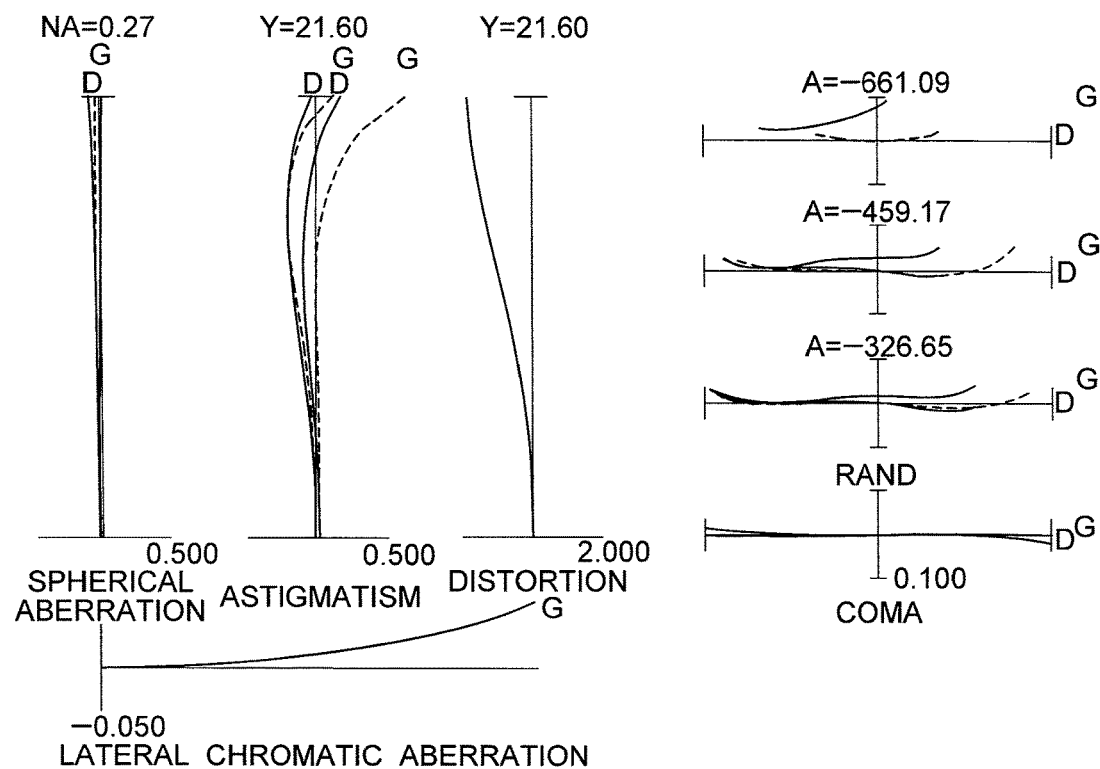
Figure 25B:
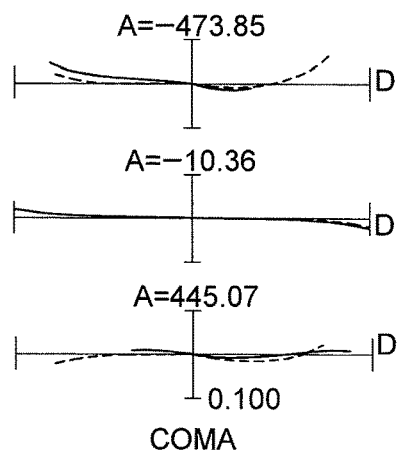

FIGS. 24A and 24B are graphs showing various aberrations of the optical system according to Example 8 upon focusing on an infinitely distant object, in which FIG. 24A shows various aberrations, and FIG. 24B shows coma upon correcting rotational camera shake of 0.7 degrees. FIGS. 25A and 25B are graphs showing various aberrations of the optical system according to Example 8 upon focusing on an intermediately distant object, in which FIG. 25A shows various aberrations, and FIG. 25B shows coma upon correcting rotational camera shake of 0.7 degrees.

As is apparent from various graphs, the optical system according to Example 8 shows superb optical performance as a result of good corrections to various aberrations.

Then, an antireflection coating used in the optical systems SL1 through SL8 (hereinafter called as SL) seen from another point of view according to each Example of the first through third embodiments of the present application is explained.

Figure 30:
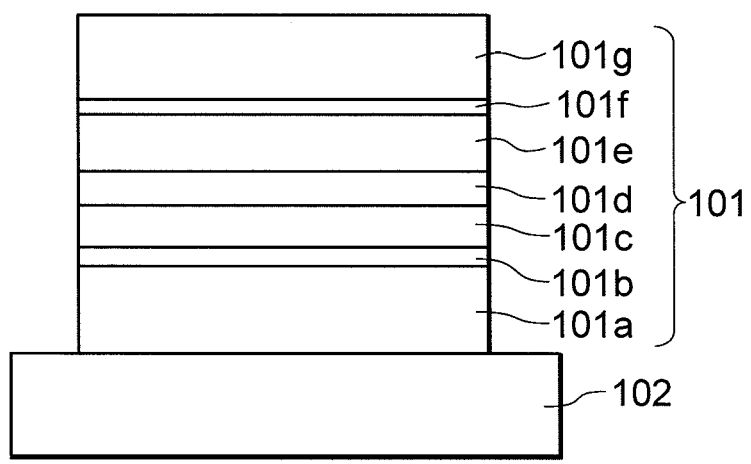
FIG. 30 is an explanatory view showing a configuration of an antireflection coating according to the present application.

FIG. 30 is an explanatory view showing a configuration of an antireflection coating (which is also referred to as a multilayer broadband antireflection coating) used in the zoom lens according to the present embodiment. The antireflection coating 101 is composed of seven layers and is formed on an optical surface of an optical member 102 such as a lens. A first layer 101a is formed with aluminum oxide by means of a vacuum evaporation method. On the first layer 101a, a second layer 101b formed with mixture of titanium oxide and zirconium oxide by means of a vacuum evaporation method is formed. Moreover, on the second layer 101b, a third layer 101c formed with aluminum oxide by means of vacuum evaporation method is formed. Moreover, on the third layer 101c, a fourth layer 101d formed with a mixture of titanium oxide and zirconium oxide by means of a vacuum evaporation method is formed. Furthermore, on the fourth layer 101d, a fifth layer 101e formed with aluminum oxide by means of vacuum evaporation method is formed. On the fifth layer 101e, a sixth layer 101f formed with mixture of titanium oxide and zirconium oxide by means of a vacuum evaporation method is formed.

Then, on the sixth layer 101f formed in this manner, a seventh layer 101g formed with a mixture of silica and magnesium fluoride is formed by means of a wet process to form the antireflection coating according to the present embodiment. In order to form the seventh layer 101g, a sol-gel process, which is a kind of wet process, is used. The sol-gel process is a process of transforming a sol acquired by mixing a material into a gel having no fluidity through hydrolyzing condensation polymerization reaction and acquiring a product by heat-decomposing this gel. In manufacturing an optical thin film, the film may be generated by coating a material sol of the optical thin film over the optical surface of the optical member and dry-solidifying the sol into a gel film. Note that the wet process may involve using, without being limited to the sol-gel process, a process of acquiring a solid-state film through none of the gel state.

In this manner, the first layer 101a through the sixth layer 101f are formed by electron beam evaporation, which is a dry process, and the seventh layer 101g, which is the uppermost layer, is formed by a following wet-process using sol liquid prepared by a hydrofluoric acid/magnesium acetate method. At first, an aluminum oxide layer, which becomes a first layer 101a, a mixture of titanium oxide and zirconium oxide layer, which becomes a second layer 101b, an aluminum oxide layer, which becomes a third layer 101c, a mixture of titanium oxide and zirconium oxide layer, which becomes a fourth layer 101d, an aluminum oxide layer, which becomes a fifth layer 101e, and a mixture of titanium oxide and zirconium oxide layer, which becomes a sixth layer 101f are formed on a film-forming surface (the above-mentioned optical surface of the optical member 102) in this order by a vacuum evaporation equipment. Then, after being took out from the vacuum evaporation equipment, the optical member 102 is applied with a sol liquid prepared by the hydrofluoric acid/magnesium acetate method added by silicon-alkoxide by means of a spin coat method, so that a layer formed by a mixture of silica and magnesium fluoride, which becomes a seventh layer 101g, is formed. A reaction formula prepared by the hydrofluoric acid/magnesium acetate method is shown by expression (b):

2HF+Mg(CH3COO)2→MgF2+2CH3COOH    (b).

The sol liquid is used for forming the film after mixing ingredients with undergoing high temperature, high pressure maturing process at 140° C., 24 hours by means of an autoclave. After completion of forming the seventh layer 101g, the optical member 102 is processed with heating treatment at 160° C. in atmospheric pressure for 1 hour to be completed. With using such a sol gel method, particles of several nanometers to several tens of nanometers are piled up with air gaps in between to form the seventh layer 101g.

Optical performance of the optical member including the thus-formed antireflection coating 101 will hereinafter be described by using spectral characteristics shown in FIG. 31.

The optical member (lens) including the antireflection coating according to each of the first through third embodiments is formed under the conditions shown in the following Table 9. Herein, the Table 9 shows respective optical film thicknesses of the layers 101a (the first layer) through 101g (the seventh layer) of the antireflection coating 101, which are obtained under such conditions that λ denotes a reference wavelength and the refractive index of the substrate (optical member) is set to 1.62, 1.74 and 1.85. Note that the Table 9 shows Al2O3 expressed as the aluminum oxide, ZrO2+TiO2 expressed as the mixture of titanium oxide and zirconium oxide and MgF2+SiO2 expressed as the mixture of magnesium fluoride and silica.

TABLE 9

| layer | material | n | thicknesses of layers | | |
|---|---|---|---|---|---|
| | medium air | 1 | | | |
| 7 | MgF2 + SiO2 | 1.26 | 0.268λ | 0.271λ | 0.269λ |
| 6 | ZrO2 + TiO2 | 2.12 | 0.057λ | 0.054λ | 0.059λ |
| 5 | Al2O3 | 1.65 | 0.171λ | 0.178λ | 0.162λ |
| 4 | ZrO2 + TiO2 | 2.12 | 0.127λ | 0.13λ | 0.158λ |
| 3 | Al2O3 | 1.65 | 0.122λ | 0.107λ | 0.08λ |
| 2 | ZrO2 + TiO2 | 2.12 | 0.059λ | 0.075λ | 0.105λ |
| 1 | Al2O3 | 1.65 | 0.257λ | 0.03λ | 0.03λ |
| | n (substrate) | | 1.62 | 1.74 | 1.85 |

Figure 31:
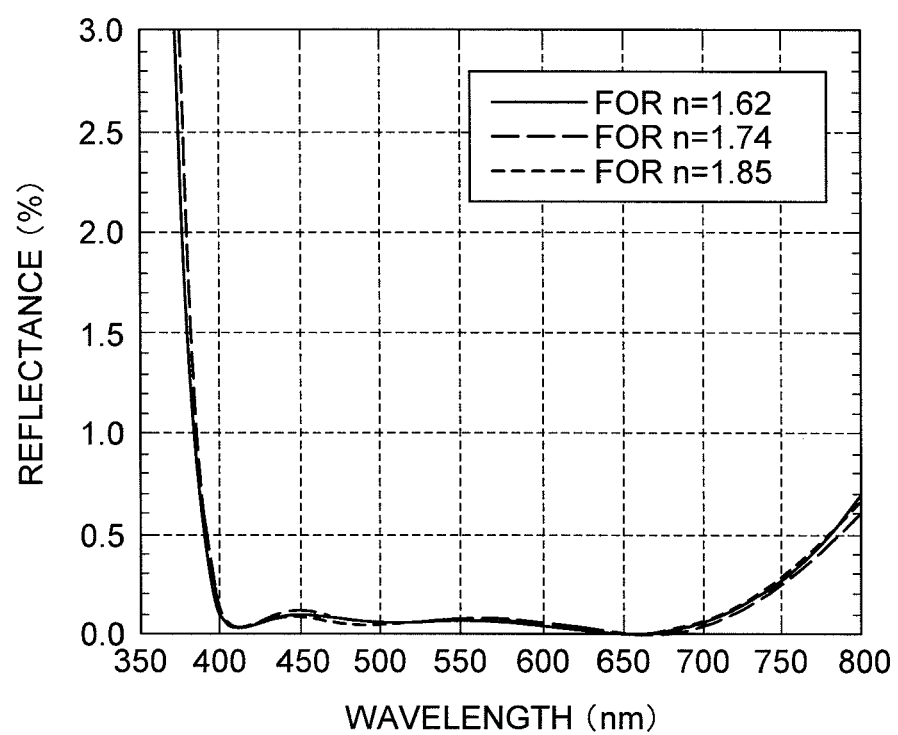
FIG. 31 is a graph showing spectral reflectance of an antireflection coating according to the present application.

FIG. 31 shows the spectral characteristics when the light beams vertically are incident on the optical member in which the optical film thickness of each of the layers of the antireflection coating 101 is designed, with the reference wavelength λ set to 550 nm in Table 9.

It is understood from FIG. 31 that the optical member including the antireflection coating 101 designed with the reference wavelength λ set to 550 nm can restrain the reflectance down to 0.2% or less over the entire range in which the wavelengths of the light beams are 420 nm through 720 nm. Further, in the Table 9, even the optical member including the antireflection coating 101, in which each optical film thickness is designed with the reference wavelength λ set to the d-line (wavelength 587.6 nm), has substantially the same spectral characteristics as in the case where the reference wavelength λ shown in FIG. 31 is 550 nm in a way that affects substantially none of the spectral characteristics thereof.

Next, a modified example of the antireflection coating will be explained. The antireflection coating is a 5-layered film, and, similarly to the Table 9, the optical film thickness of each layer with respect to the reference wavelength λ is designed under conditions shown in the following Table 10. In this modified example, the formation of the fifth layer involves using the sol-gel process described above.

TABLE 10

| layer | material | n | thicknesses of layers | |
|---|---|---|---|---|
| | medium air | 1 | | |
| 5 | MgF2 + SiO2 | 1.26 | 0.275λ | 0.269λ |
| 4 | ZrO2 + TiO2 | 2.12 | 0.045λ | 0.043λ |
| 3 | Al2O3 | 1.65 | 0.212λ | 0.217λ |
| 2 | ZrO2 + TiO2 | 2.12 | 0.077λ | 0.066λ |
| 1 | Al2O3 | 1.65 | 0.288λ | 0.290λ |
| | n (substrate) | | 1.46 | 1.52 |

Figure 32:
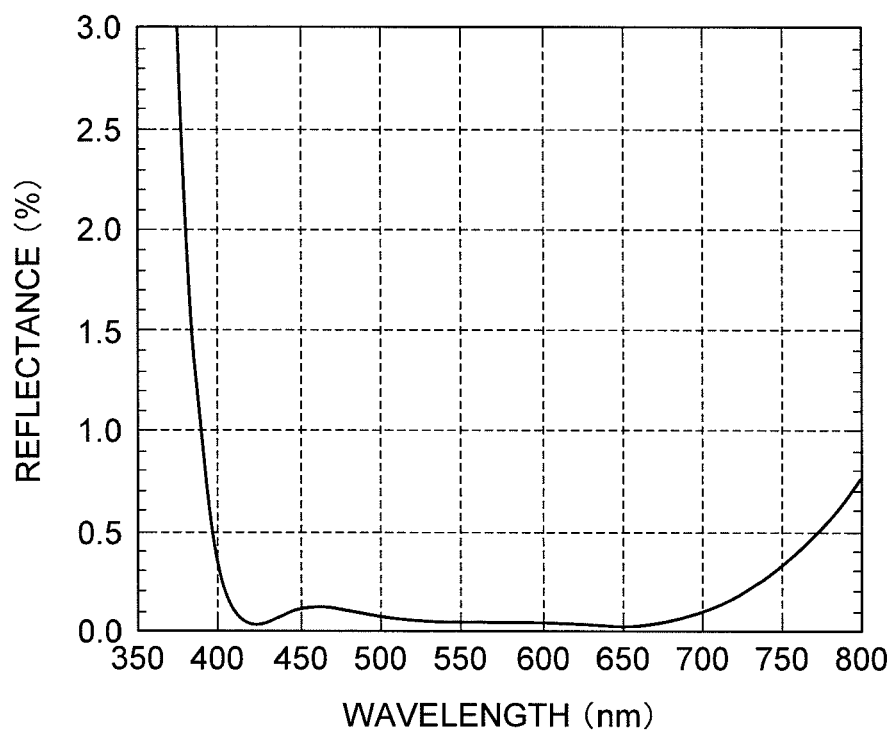
FIG. 32 is a graph showing spectral reflectance of an antireflection coating according to a variation of the present application.

FIG. 32 shows the spectral characteristics when the light beams vertically are incident on the optical member in which the optical film thickness of each of the layers is designed, with the substrate refractive index set to 1.52 and the reference wavelength λ set to 550 nm in the Table 10. It is understood from FIG. 32 that the antireflection coating in the modified example can restrain the reflectance down to 0.2% or under over the entire range in which the wavelengths of the light beams are 420 nm-720 nm. Note that in the Table 10, even the optical member including the antireflection coating, in which each optical film thickness is designed with the reference wavelength λ set to the d-line (wavelength 587.6 nm), has substantially the same spectral characteristics as the spectral characteristics shown in FIG. 32 in a way that affects substantially none of the spectral characteristics thereof.

Figure 33:
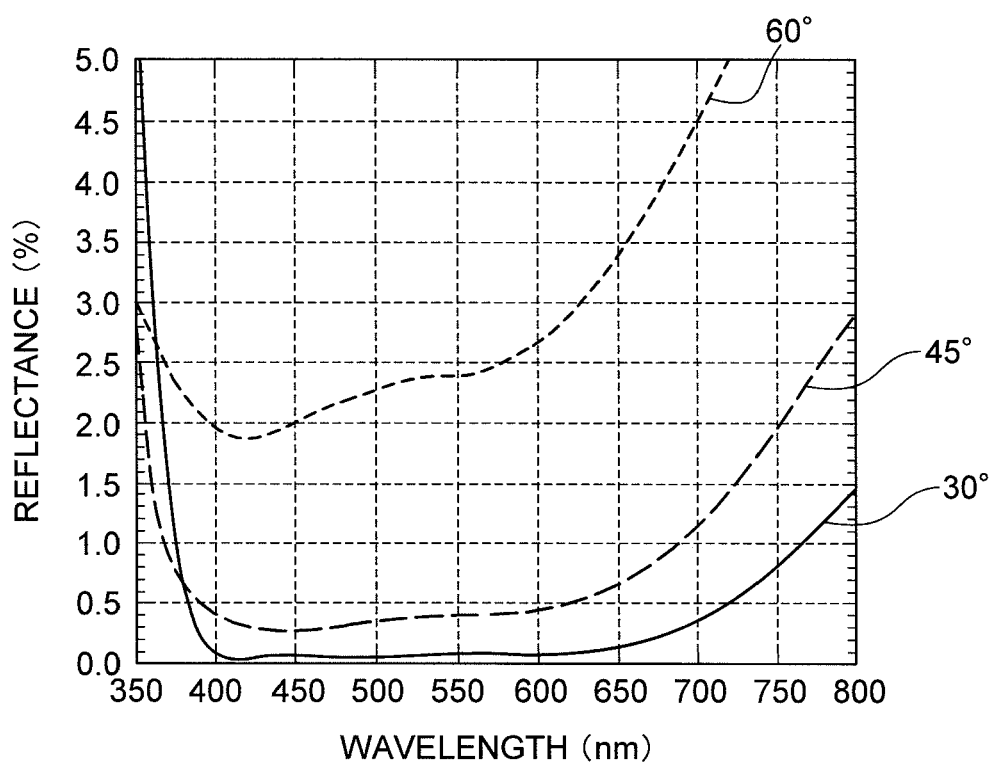
FIG. 33 is a graph showing incident angle dependency of spectral reflectance of the antireflection coating according to the variation.

FIG. 33 shows the spectral characteristics in such a case that the incident angles of the light beams upon the optical member having the spectral characteristics shown in FIG. 32 are 30 degrees, 45 degrees and 60 degrees, respectively. Note that FIGS. 32 and 33 do not illustrate the spectral characteristics of the optical member including the antireflection coating in which the substrate refractive index is 1.46 shown in Table 10, however, it is understood that the optical member has substantially the same spectral characteristics such as the substrate refractive index being 1.52.

Figure 34:
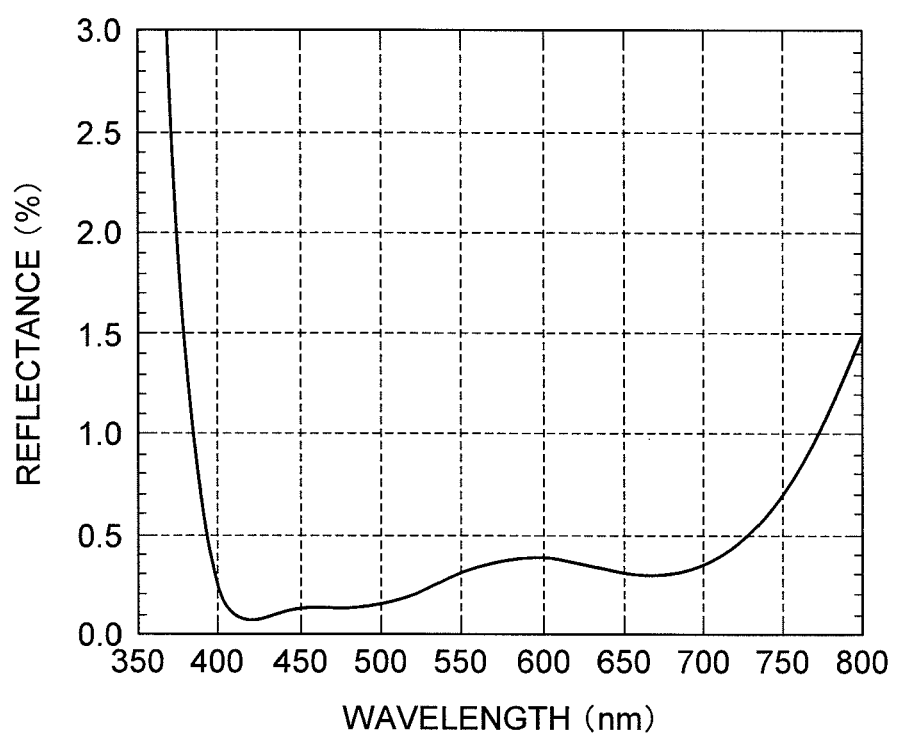
FIG. 34 is a graph showing spectral reflectance of an antireflection coating according to a conventional example.

Furthermore, FIG. 34 shows one example of the antireflection coating grown by only the dry process such as the conventional vacuum evaporation method by way of a comparison. FIG. 34 shows the spectral characteristics when the light beams are incident on the optical member in which to design the antireflection coating structured under the conditions shown in the following Table 11, with the substrate refractive index set to 1.52 in the same way as in the Table 10. Moreover, FIG. 35 shows the spectral characteristics in such a case that the incident angles of the light beams upon the optical member having the spectral characteristics shown in FIG. 34 are 30 degrees, 45 degrees and 60 degrees, respectively.

TABLE 11

| layer | material | n | thicknesses of layers |
|---|---|---|---|
|  | medium air | 1 |  |
| 7 | MgF2 | 1.39 | 0.243λ |
| 6 | ZrO2 + TiO2 | 2.12 | 0.119λ |
| 5 | Al2O3 | 1.65 | 0.057λ |
| 4 | ZrO2 + TiO2 | 2.12 | 0.220λ |
| 3 | Al2O3 | 1.65 | 0.064λ |
| 2 | ZrO2 + TiO2 | 2.12 | 0.057λ |
| 1 | Al2O3 | 1.65 | 0.193λ |
| refractive index of substrate |  |  | 1.52 |

Figure 35:
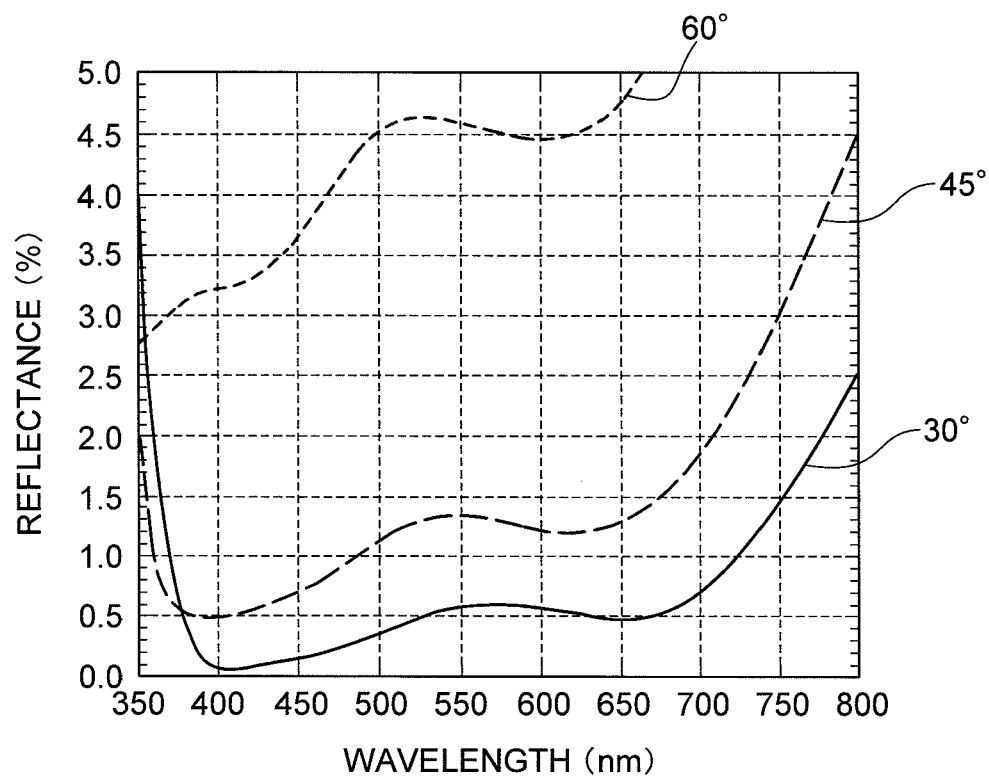
FIG. 35 is a graph showing incident angle dependency of spectral reflectance of the antireflection coating according to the conventional example.

To compare the spectral characteristics of the optical member including the antireflection coating according to the present embodiment illustrated in FIGS. 31 through 33 with the spectral characteristics in the conventional examples shown in FIGS. 34 and 35, it is well understood that the present antireflection coating has the much lower reflectance at any incident angles and, besides, has the low reflectance in the broader band.

Then, an example of applying the antireflection coating shown in the Tables 9 and 10 to Examples 1 through Example 8 of each embodiment discussed above is explained.

In the optical system SL1 according to Example 1, as shown in the Table 1, the refractive index nd of the negative meniscus lens L11 of the first lens group G1 is 1.74100 (nd=1.74100), and the refractive index nd of the double concave negative lens L21 of the second lens group G2 is 1.48749 (nd=1.48749), whereby it is feasible to reduce the reflected light from each lens surface and to reduce ghost images and flare as well by applying the antireflection coating 101 (see Table 9) corresponding to 1.74 as the substrate refractive index to the image side lens surface (surface number 2) of the negative meniscus lens L11 and applying the antireflection coating (see Table 10) corresponding to 1.46 as the substrate refractive index to the object side lens surface (surface number 11) of the double concave negative lens L21.

In the optical system SL2 according to Example 2, as shown in the Table 2, the refractive index nd of the negative meniscus lens L11 of the first lens group G1 is 1.74100 (nd=1.74100), and the refractive index nd of the double convex positive lens L16 of the first lens group G1 is 1.74806 (nd=1.74806), whereby it is feasible to reduce the reflected light from each lens surface and to reduce ghost images and flare as well by applying the antireflection coating 101 (see Table 9) corresponding to 1.74 as the substrate refractive index to the image side lens surface (surface number 2) of the negative meniscus lens L11 and applying the antireflection coating (see Table 9) corresponding to 1.74 as the substrate refractive index to the image side lens surface (surface number 10) of the double convex positive lens L16.

In the optical system SL3 according to Example 3, as shown in the Table 3, the refractive index nd of the negative meniscus lens L11 of the first lens group G1 is 1.74100 (nd=1.74100), and the refractive index nd of the double concave negative lens L21 of the second lens group G2 is 1.48749 (nd=1.48749), whereby it is feasible to reduce the reflected light from each lens surface and to reduce ghost images and flare as well by applying the antireflection coating 101 (see Table 9) corresponding to 1.74 as the substrate refractive index to the image side lens surface (surface number 2) of the negative meniscus lens L11 and applying the antireflection coating (see Table 10) corresponding to 1.46 as the substrate refractive index to the object side lens surface (surface number 10) of the double concave negative lens L21.

In the optical system SL4 according to Example 4, as shown in the Table 4, the refractive index nd of the negative meniscus lens L11 of the first lens group G1 is 1.74100 (nd=1.74100), and the refractive index nd of the double convex positive lens L16 of the first lens group G1 is 1.77250 (nd=1.77250), whereby it is feasible to reduce the reflected light from each lens surface and to reduce ghost images and flare as well by applying the antireflection coating 101 (see Table 9) corresponding to 1.74 as the substrate refractive index to the image side lens surface (surface number 2) of the negative meniscus lens L11 and applying the antireflection coating (see Table 9) corresponding to 1.74 as the substrate refractive index to the image side lens surface (surface number 10) of the double convex positive lens L16.

In the optical system SL5 according to Example 5, as shown in the Table 5, the refractive index nd of the negative meniscus lens L11 of the first lens group G1 is 1.74100 (nd=1.74100), and the refractive index nd of the double concave negative lens L21 of the second lens group G2 is 1.55857 (nd=1.55857), whereby it is feasible to reduce the reflected light from each lens surface and to reduce ghost images and flare as well by applying the antireflection coating 101 (see Table 9) corresponding to 1.74 as the substrate refractive index to the image side lens surface (surface number 2) of the negative meniscus lens L11 and applying the antireflection coating (see Table 10) corresponding to 1.52 as the substrate refractive index to the object side lens surface (surface number 8) of the double concave negative lens L21.

In the optical system SL6 according to Example 6, as shown in the Table 6, the refractive index nd of the negative meniscus lens L11 of the first lens group G1 is 1.74100 (nd=1.74100), and the refractive index nd of the positive meniscus lens L14 of the first lens group G1 is 1.74400 (nd=1.74400), whereby it is feasible to reduce the reflected light from each lens surface and to reduce ghost images and flare as well by applying the antireflection coating 101 (see Table 9) corresponding to 1.74 as the substrate refractive index to the image side lens surface (surface number 2) of the negative meniscus lens L11 and applying the antireflection coating (see Table 9) corresponding to 1.74 as the substrate refractive index to the object side lens surface (surface number 6) of the positive meniscus lens L14.

In the optical system SL7 according to Example 7, as shown in the Table 7, the refractive index nd of the negative meniscus lens L11 of the first lens group G1 is 1.74100 (nd=1.74100), and the refractive index nd of the double concave negative lens L21 of the second lens group G2 is 1.48749 (nd=1.48749), whereby it is feasible to reduce the reflected light from each lens surface and to reduce ghost images and flare as well by applying the antireflection coating 101 (see Table 9) corresponding to 1.74 as the substrate refractive index to the image side lens surface (surface number 2) of the negative meniscus lens L11 and applying the antireflection coating (see Table 10) corresponding to 1.46 as the substrate refractive index to the object side lens surface (surface number 11) of the double concave negative lens L21.

In the optical system SL8 according to Example 8, as shown in the Table 8, the refractive index nd of the negative meniscus lens L13 of the first lens group G1 is 1.55389 (nd=1.55389), and the refractive index nd of the positive meniscus lens L22 of the second lens group G2 is 1.74397 (nd=1.74397), whereby it is feasible to reduce the reflected light from each lens surface and to reduce ghost images and flare as well by applying the antireflection coating 101 (see Table 10) corresponding to 1.52 as the substrate refractive index to the image side lens surface (surface number 5) of the negative meniscus lens L13 and applying the antireflection coating (see Table 9) corresponding to 1.74 as the substrate refractive index to the image side lens surface (surface number 12) of the positive meniscus lens L22.

Figure 26:
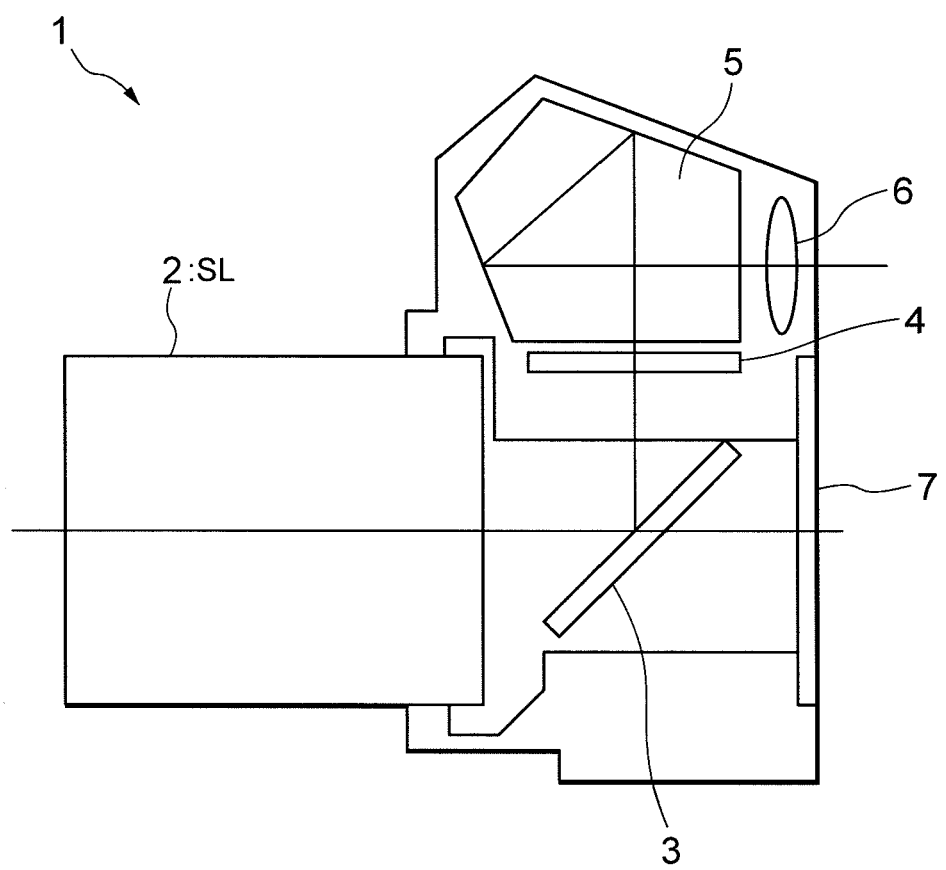
FIG. 26 is a diagram showing a construction of a camera equipped with the optical system according to a first embodiment.

FIG. 26 is a sectional view showing a single-lens reflex camera (hereinafter simply called as a camera) as an optical apparatus equipped with the optical system SL according to Example 1 of the present application.

In the camera 1, light rays emitted from an unillustrated object are converged by the imaging lens 2 (the optical system SL), reflected by a quick return mirror 3, and focused on a focusing screen 4. The light rays focused on the focusing screen 4 are reflected a plurality of times in a pentagonal roof prism 5, and led to an eyepiece 6. Accordingly, a photographer can observe the object image as an erected image through the eyepiece 6.

When the photographer presses an unillustrated release button all the way down, the quick return mirror 3 is retracted from the optical path, the light rays from the unillustrated object are formed an object image on an imaging device 7. Accordingly, the light rays emitted from the object are captured by the imaging device 7, and stored in an unillustrated memory as a photographed image of the object. In this manner, the photographer can take a picture of an object by the camera 1.

Incidentally, the camera 1 shown in FIG. 26 may be configured to hold the optical system SL in an attachable/detachable manner and may also be constructed integrally with the optical system SL. Moreover, the camera may also be a camera that does not include the quick return mirror or the like. Moreover, not only the optical system according to Example 1 but also any one of optical systems according to Examples 2 through 8 may be installed in the camera 1.

Incidentally, the following description may suitably be applied within limits that do not deteriorate optical performance.

In the above described explanations and Examples, although optical systems SL having a three-lens-group configuration have been shown, the present application can be applied to other lens configurations such as a four-lens-group configuration. Specifically, a lens configuration in which a lens or a lens group is added to the most object side, or the most image side of the optical system is possible. Incidentally, a lens group is defined as a portion including at least one lens separated by air spaces that vary upon focusing, or separated whether the portion can move or not in a direction including a component substantially perpendicular to the optical axis.

A portion of a lens group, a single lens group, or a plurality of lens groups may be moved along the optical axis thereby varying focusing on an infinitely distant object to a close object. In this case, the focusing lens group can be used for auto focus, and suitable for being driven by a motor such as an ultrasonic motor. It is particularly preferable that the third lens group G3 is moved as the focusing lens group.

Moreover, a lens group or a portion of a lens group may be moved as a vibration reduction lens group in a direction including a component perpendicular to the optical axis, or tilted (swayed) in a direction including the optical axis thereby correcting an image blur caused by a camera shake. In particular, at least a portion of the second lens group is preferably made as the vibration reduction lens group.

Moreover, any lens surface may be a spherical surface, a plane surface, or an aspherical surface.

When a lens surface is a spherical surface or a plane surface, lens processing, assembling and adjustment become easy, and deterioration in optical performance caused by lens processing, assembling and adjustment errors can be prevented, so that it is preferable. Moreover, even if the image plane is shifted, deterioration in optical performance is little, so that it is preferable.

When a lens surface is an aspherical surface, the aspherical surface may be fabricated by a fine grinding process, a glass molding process that a glass material is formed into an aspherical shape by a mold, or a compound type process that a resin material is formed into an aspherical shape on a glass lens surface. A lens surface may be a diffractive optical surface, and a lens may be a graded-index type lens (GRIN lens) or a plastic lens.

What is claimed is:

1. An image-forming lens comprising, in order from an object side:
    a first lens group;
    a second lens group having negative refractive power; and
    a third lens group having positive refractive power,
    the second lens group being disposed movably in a direction including a component perpendicular to an optical axis,
    a most object side lens in the first lens group being a negative meniscus lens having a convex surface facing the object side, and
    the following conditional expressions being satisfied:

$0.30 < f/f23 < 0.72$ $-0.4 < f/f1 < 0.30$ where f denotes a focal length of the image-forming lens upon focusing on an infinitely distant object, f1 denotes a focal length of the first lens group, and f23 denotes a combined focal length of the second lens group and the third lens group upon focusing on an infinitely distant object.

2. The image-forming lens according to claim 1, wherein the following conditional expression is satisfied:

$-0.35 < f/f2 < -0.07$ where f2 denotes a focal length of the second lens group.

3. The image-forming lens according to claim 1, wherein the following conditional expression is satisfied:

$$1.2 < H2in/H1in < 3.0$$

where H1in denotes a height of a marginal ray incident on the most object side lens surface of the first lens group, and H2in denotes a height of a marginal ray incident on the most object side lens surface of the second lens group.

4. The image-forming lens according to claim 1, wherein an aperture stop is disposed to an image side of the second lens group.

5. The image-forming lens according to claim 4, wherein the aperture stop is disposed in the third lens group.

6. The image-forming lens according to claim 1, wherein upon carrying out focusing from an infinitely distant object to a close object, the third lens group is moved to the object side.

7. The image-forming lens according to claim 1, wherein the first lens group is fixed in the optical axis direction, an antireflection coating is applied on at least one optical surface of the first lens group and the second lens group, and the antireflection coating includes at least one layer that is formed by a wet process.

8. The image-forming lens according to claim 7, wherein the antireflection coating is a multilayered film, and the layer formed by the wet process is the outermost layer among the layers composing the multilayer film.

9. The image-forming lens according to claim 7, wherein when a refractive index at d-line of the layer formed by the wet process is denoted by nd, the refractive index nd is 1.30 or less.

10. The image-forming lens according to claim 7, wherein an optical surface on which the antireflection coating is applied is concave as seen from an aperture stop.

11. The image-forming lens according to claim 10, wherein the surface that is concave as seen from the aperture stop is an image side lens surface.

12. The image-forming lens according to claim 7, wherein an optical surface on which the antireflection coating is applied is concave as seen from the object side.

13. The image-forming lens according to claim 12, wherein the surface that is concave as seen from the object side is an image side lens surface.

14. The image-forming lens according to claim 12, wherein the surface that is concave as seen from the object side is an object side lens surface.

15. An optical apparatus equipped with the image-forming lens according to claim 1.

16. The optical system according to claim 1, wherein the following conditional expression is satisfied:

$$0.15 < |Dvr/Rvr| < 1.20$$

where Dvr denotes a distance between the aperture stop and the object side lens surface of the positive lens in the second lens group upon focusing on an infinitely distant object, and Rvr denotes a radius of curvature of the object side lens surface of the positive lens in the second lens group.

17. The optical system according to claim 1, wherein the following conditional expression is satisfied:

$$0.8 < (RL+RS)/(RL-RS) < 7.0$$

where RS denotes a radius of curvature of the surface having smaller absolute value among radii of curvature of both surfaces of the positive lens in the second lens group, and RL denotes a radius of curvature of the larger absolute value among radii of curvature of the both surfaces of the positive lens in the second lens group.

18. The optical system according to claim 1, wherein the second lens group includes a negative lens disposed to the object side of the positive lens, and the following conditional expression is satisfied:

$$0.10 < Np-Nn < 0.45$$

where Np denotes a refractive index at d-line of a medium of the positive lens in the second lens group, and Nn denotes a refractive index at d-line of the medium of the negative lens in the second lens group.

19. The optical system according to claim 1, wherein the following conditional expression is satisfied:

$$2.00 < \Sigma dvr/f < 5.00$$

where $\Sigma dvr$ denotes a distance between the most image side lens surface of the second lens group and the paraxial focal plane of the optical system upon focusing on an infinitely distant object, and f denotes a focal length of the optical system upon focusing on an infinitely distant object.

20. The optical system according to claim 1, wherein the following conditional expression is satisfied:

$$0.15 < |(1-\beta vr) \times \beta 3| < 0.50$$

where $\beta vr$ denotes a lateral magnification of the second lens group upon focusing on an infinitely distant object, $\beta 3$ denotes a lateral magnification of the third lens group upon focusing on an infinitely distant object.

21. A method for manufacturing an image-forming lens including, in order from an object side, a first lens group, a second lens group having negative refractive power, and a third lens group having positive refractive power, the method comprising steps of:
    disposing the first lens group such that a most object side lens therein is a negative meniscus lens having a convex surface facing the object side,
    disposing the second lens group movably in a direction including a component perpendicular to an optical axis; and
    disposing each lens group with satisfying the following conditional expressions:

$$0.30 < f/f23 < 0.72$$

$$-0.4 < f/f1 < 0.30$$

where f denotes a focal length of the whole of the image-forming lens upon focusing on an infinitely distant object, f1 denotes a focal length of the first lens group, and f23 denotes a combined focal length of the second lens group and the third lens group upon focusing on an infinitely distant object.

22. The method according to claim 21, further comprising a step of:
    disposing each lens group with satisfying the following conditional expression:

$$-0.35 < f/f2 < -0.07$$

where f2 denotes a focal length of the second lens group.

23. The method according to claim 21, further comprising a step of:
    disposing each lens group with satisfying the following conditional expression:

$$1.2 < H2in/H1in < 3.0$$

where H1in denotes a height of a marginal ray incident on the most object side lens surface of the first lens group, and H2in denotes a height of a marginal ray incident on the most object side lens surface of the second lens group.

24. The method according to claim 21, further comprising steps of:
  disposing the first lens group with fixing in the optical axis direction with respect to an image plane;
  applying an antireflection coating on at least one optical surface of the first lens group and the second lens group, and the antireflection coating including at least one layer that is formed by a wet process.

25. The method according to claim 24, wherein when a refractive index at d-line of the layer formed by the wet process is denoted by nd, the refractive index nd is 1.30 or less.

26. The method according to claim 24, further comprising a step of:
  applying the antireflection coating on a surface that is concave as seen from an aperture stop side.

27. The method according to claim 24, further comprising a step of:
  applying the antireflection coating on a surface that is concave as seen from the object side.

* * * * *